United States Patent
Yamashita

(10) Patent No.: US 9,479,789 B2
(45) Date of Patent: Oct. 25, 2016

(54) SIGNAL PROCESSING APPARATUS, SIGNAL PROCESSING METHOD, PROGRAM, AND SIGNAL TRANSMISSION SYSTEM

(71) Applicant: Sony Corporation, Tokyo (JP)

(72) Inventor: Shigeyuki Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 253 days.

(21) Appl. No.: 14/289,286

(22) Filed: May 28, 2014

(65) Prior Publication Data

US 2015/0016538 A1    Jan. 15, 2015

(30) Foreign Application Priority Data

Jul. 10, 2013   (JP) .................................. 2013-144086

(51) Int. Cl.
| | |
|---|---|
| H04N 19/40 | (2014.01) |
| H04N 1/56 | (2006.01) |
| H04N 7/015 | (2006.01) |
| H04N 7/12 | (2006.01) |
| H04N 9/00 | (2006.01) |

(52) U.S. Cl.
CPC ................ *H04N 19/40* (2014.11); *H04N 1/56* (2013.01); *H04N 7/015* (2013.01); *H04N 7/12* (2013.01); *H04N 9/00* (2013.01)

(58) Field of Classification Search
CPC .. H04L 5/003; H04W 72/04; H04N 21/2368
See application file for complete search history.

(56) References Cited

U.S. PATENT DOCUMENTS

| | | | | |
|---|---|---|---|---|
| 4,355,324 A * | 10/1982 | Reitmeier | ............. | H04N 9/808 348/493 |
| 5,673,378 A * | 9/1997 | Chaney | ................ | G06T 11/001 345/601 |
| 7,477,778 B2 * | 1/2009 | Ramanath | ................ | G09G 5/02 345/604 |
| 8,251,516 B2 * | 8/2012 | Yoshimura | ........... | H04N 9/3105 348/752 |
| 8,384,765 B2 * | 2/2013 | Takahashi | .......... | H04N 13/0022 348/43 |
| 8,908,980 B2 * | 12/2014 | Hong | ...................... | G06T 9/005 382/166 |
| 2005/0069167 A1 * | 3/2005 | Zarrabizadeh | .......... | G06T 1/005 382/100 |
| 2008/0152219 A1 * | 6/2008 | Ramanath | ................ | G09G 5/02 382/162 |

FOREIGN PATENT DOCUMENTS

JP   4645638   12/2010

* cited by examiner

*Primary Examiner* — Hassan Phillips
*Assistant Examiner* — Prenell Jones
(74) *Attorney, Agent, or Firm* — Michael Best & Friedrich LLP

(57) ABSTRACT

A signal processing apparatus includes a mapping unit configured to multiplex first to fourth pixel data with respect to areas of first to fourth signals of a data stream prescribed in a predetermined SDI (Serial Digital Interface) format, respectively. The first to fourth pixel data respectively correspond to first to fourth colors of video data in which pixels are arranged on a block basis with 2×2 pixels as the block, and the 2×2 pixels respectively correspond to the first to fourth colors.

20 Claims, 46 Drawing Sheets

| Format | Frame rate | Total word count per line (bit) | Active video data space (bit) | Horizontal ancillary data space and SAV/EAV/LN/OPC (bit) | | Added data (bit) |
|---|---|---|---|---|---|---|
| 1920x1080 | 23.98P, 24P or 23.98PsF, 24PsF | 396000 | 276480 | Ch1, 2, 3, 5, 7 | 103978 | 15542 |
| | 25P or 25PsF | 380160 | 276480 | Ch1, 2, 3, 5, 7 | 90228 | 13452 |
| | 29.97P, 30P or 29.97PsF, 30PsF or 59.94I, 60I | 316800 | 276480 | Ch1, 2, 3, 5, 7 | 35228 | 5092 |
| 2048x1080 | 23.98P, 24P or 23.98PsF, 24PsF | 396000 | 294912 | Ch1, 2, 3, 5, 7 | 87978 | 13110 |
| | 25P or 25PsF | 380160 | 294912 | Ch1, 2, 3, 5, 7 | 74228 | 11020 |
| | 29.97P, 30P or 29.97PsF, 30PsF or 59.94I, 60I | 316800 | 294912 | Ch1, 2, 3, 5, 7 | 19228 | 2660 |

FIG.30

| Format | Frame rate | Total word count per line (bit) | Active video data space (bit) | Horizontal ancillary data space and SAV/EAV/LN/CRC (bit) | | Added data (bit) |
|---|---|---|---|---|---|---|
| 1920x1080 | 23.98P, 24P or 23.98PsF, 24PsF | 396000 | 286080 | Ch 1, 3, 5, 7 | 83588 | 26332 |
| | 25P or 25PsF | 380160 | 286080 | Ch 1, 3, 5, 7 | 72588 | 21492 |
| | 29.97P, 30P or 29.97PsF, 30PsF or 59.94I, 60I | 316800 | 286080 | Ch 1, 3, 5, 7 | 28588 | 2132 |
| 2048x1080 | 23.98P, 24P or 23.98PsF, 24PsF | 396000 | 305152 | Ch 1, 7 | 36288 | 54610 |
| | 25P or 25PsF | 380160 | 305152 | Ch 1, 7 | 30788 | 44220 |
| | 29.97P, 30P or 29.97PsF, 30PsF or 59.94I, 60I | 316800 | 305152 | Ch 1, 7 | 8788 | 2860 |

FIG.38

SIGNAL PROCESSING APPARATUS, SIGNAL PROCESSING METHOD, PROGRAM, AND SIGNAL TRANSMISSION SYSTEM

CROSS REFERENCE TO RELATED APPLICATIONS

This application claims the benefit of Japanese Priority Patent Application JP 2013-144086 filed Jul. 10, 2013, the entire contents of which are incorporated herein by reference.

BACKGROUND

The present technology relates to a signal processing apparatus, a signal processing method, a program, and a signal transmission system. For example, the present technology relates to a signal processing apparatus, a signal processing method, a program, and a signal transmission system, that are desirably applied to the case where video data with a Bayer arrangement or the like is transmitted by using an SDI (Serial Digital Interface).

In related art, there has been proposed a technology for transmitting ultrahigh-definition video data (4K video data) superior to HD (High Definition) video data (2K video data) by using an HD-SDI (High Definition-Serial Digital Interface) or the like (see, for example, Japanese Patent No. 4645638).

SUMMARY

However, in related art, such a technology that video data with the Bayer arrangement or the like in which pixels are arranged on a block (2×2 pixels) basis is transmitted by using the SDI is not established.

In view of this, the present technology makes it possible to transmit the video data with the Bayer arrangement or the like in which pixels are arranged on a block (2×2 pixels) basis by using the SDI.

According to an embodiment of the present disclosure, there is provided a signal processing apparatus including a mapping unit. The mapping unit is configured to multiplex first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

When the data stream is formed with N bits (N≥10) as a unit, and data in which upper m (8≤m≤N−2) bits out of the N bits are the same value is set to a forbidden code, the mapping unit may multiplex the pixel data of the video data with respect to upper m−2 bits and lower N-m bits out of the N bits of the data stream and sets lower 2 bits out of the upper m bits of the data stream to different values.

When the pixel data of the video data has a data length of more than N−2 bits and equal to or less than 2N−4 bits, the mapping unit may multiplex upper N−2 bits and remaining bits of the pixel data with respect to different data streams.

The mapping unit may multiplex the upper N−2 bits of the pixel data of the video data separately with respect to a first data stream and a second data stream on a pixel basis, and multiplex the remaining bits of the pixel data of the video data separately with respect to a third data stream and a fourth data stream on a pixel basis.

The signal processing apparatus may further include a multiplexing unit. The multiplexing unit is configured to multiplex the first data stream and the second data stream, thereby generating a first 3G-SDI data stream prescribed in a 3G-SDI (3G-Serial Digital Interface) format, and multiplex the third data stream and the fourth data stream, thereby generating a second 3G-SDI data stream.

The mapping unit may multiplex, out of a first video data and a second video data generated by alternately thinning the pixel of the video data horizontally on the block basis, upper N−2 bits of pixel data of the first video data with respect to the first data stream, multiplex remaining bits of the pixel data of the first video data with respect to the third data stream, multiplex upper N−2 bits of pixel data of the second video data with respect to the second data stream, and multiplex remaining bits of the pixel data of the second video data with respect to the fourth data stream.

The signal processing apparatus may further include a separation unit. The separation unit is configured to alternately thin a line in a horizontal direction on the block basis of the video data, thereby separating the data into a first video data and a second video data. In the signal processing apparatus, the mapping unit may multiplex upper N−2 bits of pixel data of the first video data separately with respect to a first data stream and a second data stream on a pixel basis, multiplex remaining bits of the pixel data of the first video data separately with respect to a third data stream and a fourth data stream on the pixel basis, multiplex upper N−2 bits of pixel data of the second video data separately with respect to a fifth data stream and a sixth data stream on the pixel basis, and multiplex remaining bits of the pixel data of the second video data separately with respect to a seventh data stream and an eighth data stream on the pixel basis.

The signal processing apparatus may further include a first multiplexing unit. The first multiplexing unit is configured to multiplex the first data stream and the second data stream, thereby generating a first 3G-SDI data stream prescribed in a 3G-SDI (3G-Serial Digital Interface) format, multiplex the third data stream and the fourth data stream, thereby generating a second 3G-SDI data stream, multiplex the fifth data stream and the sixth data stream, thereby generating a third 3G-SDI data stream, and multiplex the seventh data stream and the eighth data stream, thereby generating a fourth 3G-SDI data stream.

The signal processing apparatus may further include a second multiplexing unit. The second multiplexing unit is configured to multiplex the first to fourth 3G-SDI data streams, thereby generating a data stream prescribed in an SDI format of 10.692 Gbps.

The signal processing apparatus may further include a multiplexing unit. The multiplexing unit is configured to multiplex the first to eighth data streams, thereby generating a data stream prescribed in an SDI format of 10.692 Gbps.

The mapping unit may multiplex the pixel data of the video data separately with respect to a first data stream and a second data stream on a pixel basis.

The signal processing apparatus may further include a separation unit. The separation unit is configured to alternately thin a line in a horizontal direction on the block basis of the video data, thereby separating the data into a first video data and a second video data. In the signal processing apparatus, the mapping unit may multiplex pixel data of the first video data separately with respect to a first data stream and a second data stream on a pixel basis, and multiplex pixel data of the second video data separately with respect to a third data stream and a fourth data stream on the pixel basis.

When the video data has pixels arranged in accordance with a Bayer arrangement, and when the first color and the second color are green, the third color is blue, and the fourth color is red, the first to fourth signals may be determined in such a manner that the first signal and the second signal are Y signals, the third signal is a Cb signal, and the fourth signal is a Cr signal, or that the first signal is a G signal, the second signal is an A (Auxiliary) signal, the third signal is a B signal, and the fourth signal is an R signal.

When the video data has pixels arranged in accordance with an RGBW arrangement, and when the first color is red, the second color is green, the third color is blue, and the fourth color is white, the first signal may be an R signal, the second signal may be a G signal, the third signal may be a B signal, and the fourth signal may be an A (Auxiliary) signal.

According to the first embodiment of the present technology, there is provided a signal processing method including multiplexing, by a signal processing apparatus, first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

According to the first embodiment of the present technology, there is provided a program for causing a computer to execute a process including multiplexing first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

According to a second embodiment of the present technology, there is provided a signal processing apparatus including a reproduction unit. The reproduction unit is configured to extract first to fourth pixel data from a data stream in which the first to fourth pixel data are multiplexed with respect to areas of first to fourth signals of the data stream prescribed in a predetermined SDI (Serial Digital Interface) format, respectively, and restore video data in which pixels are arranged on a block basis with 2×2 pixels as the block, the first to fourth pixel data respectively corresponding to first to fourth colors of the video data, the 2×2 pixels respectively corresponding to the first to fourth colors.

According to the second embodiment of the present technology, there is provided a signal processing method including extracting, by a signal processing apparatus, first to fourth pixel data from a data stream in which the first to fourth pixel data are multiplexed with respect to areas of first to fourth signals of the data stream prescribed in a predetermined SDI (Serial Digital Interface) format, respectively, and restoring video data in which pixels are arranged on a block basis with 2×2 pixels as the block, the first to fourth pixel data respectively corresponding to first to fourth colors of the video data, the 2×2 pixels respectively corresponding to the first to fourth colors.

According to the second embodiment of the present technology, there is provided a program for causing a computer to execute a process including extracting first to fourth pixel data from a data stream in which the first to fourth pixel data are multiplexed with respect to areas of first to fourth signals of the data stream prescribed in a predetermined SDI (Serial Digital Interface) format, respectively, and restoring video data in which pixels are arranged on a block basis with 2×2 pixels as the block, the first to fourth pixel data respectively corresponding to first to fourth colors of the video data, the 2×2 pixels respectively corresponding to the first to fourth colors.

According to a third embodiment of the present technology, there is provided a signal transmission system including a signal transmission apparatus and a signal reception apparatus. The signal transmission apparatus includes a mapping unit and a transmission control unit. The mapping unit multiplexes first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors. The transmission control unit controls transmission of the data stream. The signal reception apparatus includes a reception control unit and a reproduction unit. The reception control unit controls reception of the data stream. The reproduction unit extracts the first to fourth pixel data from the data stream and restores the video data.

In the first embodiment of the present technology, the first to fourth pixel data respectively corresponding to the first to fourth colors of the video data, in which the pixels are arranged on the block (2×2 pixels) basis with the 2×2 pixels respectively corresponded to the first to fourth colors, are multiplexed with respect to the areas of the first to fourth signals of the data stream prescribed in the predetermined SDI (Serial Digital Interface) format.

In the second embodiment of the present technology, from the data stream in which the first to fourth pixel data respectively corresponding to the first to fourth colors of the video data, in which the pixels are arranged on the block (2×2 pixels) basis with the 2×2 pixels respectively corresponded to the first to fourth colors, are multiplexed with respect to the areas of the first to fourth signals of the data stream prescribed in the predetermined SDI (Serial Digital Interface) format, the first to fourth pixel data are extracted, and the video data is restored.

In the third embodiment of the present technology, the first to fourth pixel data respectively corresponding to the first to fourth colors of the video data, in which the pixels are arranged on the block (2×2 pixels) basis with the 2×2 pixels respectively corresponded to the first to fourth colors, are multiplexed with respect to the areas of the first to fourth signals of the data stream prescribed in the predetermined SDI (Serial Digital Interface) format, transmission of the data stream is controlled, reception of the data stream is controlled, the first to fourth pixel data is extracted from the data stream, and the video data is restored.

According to the first to third embodiments of the present technology, it is possible to transmit the video data with the Bayer arrangement or the like, in which the pixels are arranged on the block (2×2 pixels) basis, by using SDI.

These and other objects, features and advantages of the present disclosure will become more apparent in light of the following detailed description of best mode embodiments thereof, as illustrated in the accompanying drawings.

BRIEF DESCRIPTION OF DRAWINGS

FIG. 8 is a diagram for explaining a method of multiplexing the pixel data to a data stream;

FIG. 10 is a diagram showing a structure example of the data stream;

FIG. 18 is a diagram showing a structure example of a data stream;

FIG. 19 is a diagram showing a structure example of a data stream;

FIG. 30 is a table showing an example of the data size of the data stream of 10G-SDI;

FIG. 38 is a table showing an example of the data size of the data stream of 10G-SDI;

DETAILED DESCRIPTION OF EMBODIMENTS

Figure 1:
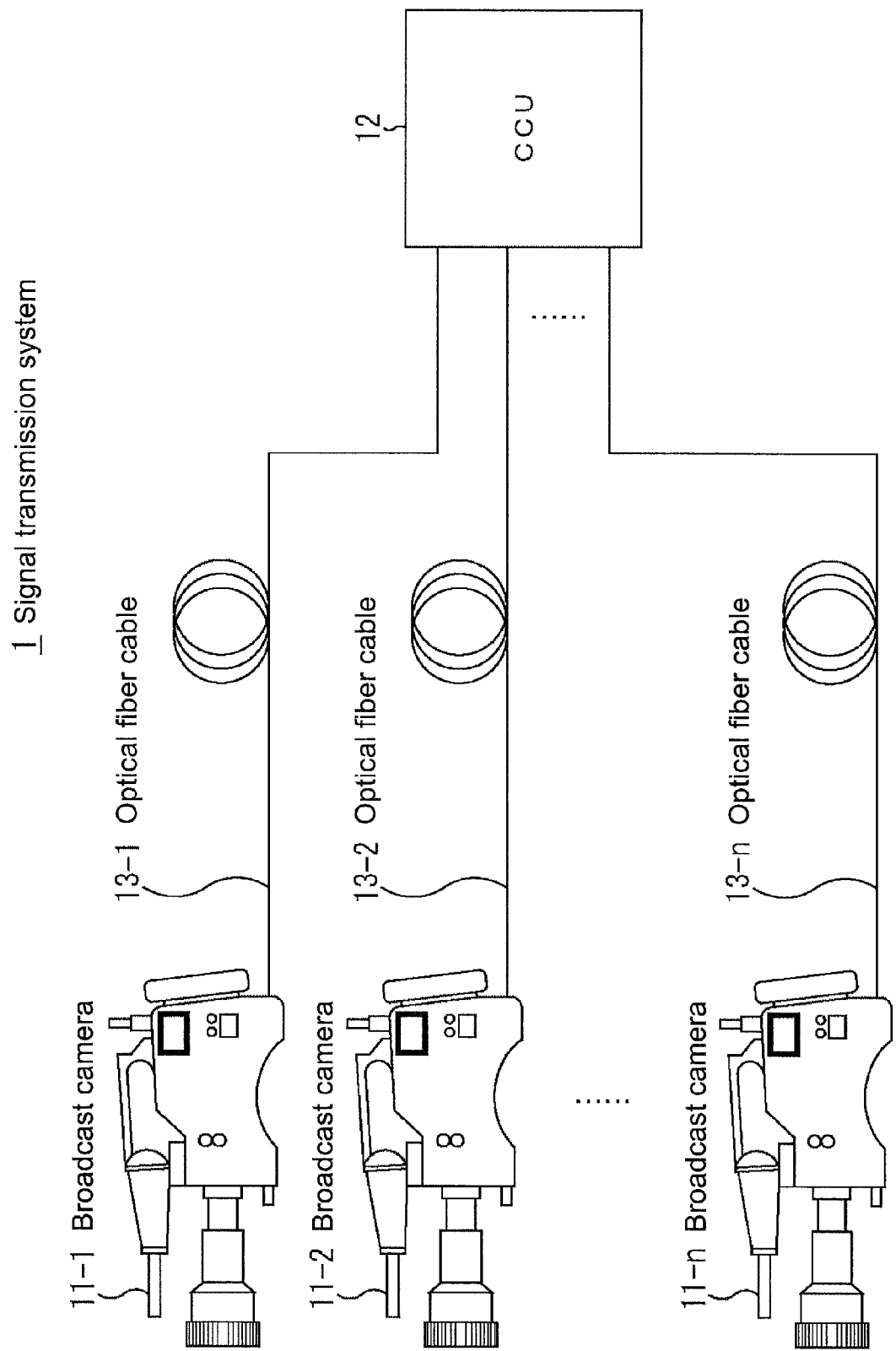
FIG. 1 is a diagram showing an entire structure of a signal transmission system.

Hereinafter, embodiments of the present disclosure will be described. It should be noted that the description will be given in the following order.
1. Structure example of signal transmission system
2. Structure example of RAW data
3. First embodiment (case where 4K RAW data of 23.98P-30P is transmitted by using level B or the like of 3G-SDI)
4. Modified example of first embodiment
5. Second embodiment (case where 4K RAW data of 47.95P-60P is transmitted by using level B or the like of 3G-SDI)
6. Modified example of second embodiment
7. Third embodiment (case where transmission is performed by using 10G-SDI)
8. Modified example of third embodiment
9. Fourth embodiment (case where trunk line is transmitted along with RAW data)
10. Modified example of fourth embodiment
11. Fifth embodiment (case where 4K RAW data of 23.98P-30P is transmitted by using level A of 3G-SDI)
12. Sixth embodiment (case where 4K RAW data of 47.95P-60P is transmitted by using level A of 3G-SDI)
13. Other modified examples 1. Structure Example of Signal Transmission System 1

First, with reference to FIG. 1, a description will be given on a structure example of a signal transmission system 1 which is used commonly in first to sixth embodiments of the present technology to be described later.

The signal transmission system 1 includes n broadcast cameras 11-1 to 11-*n* and a CCU (camera control unit) 12. The broadcast cameras 11-1 to 11-*n* are connected to the CCU 12 via optical fiber cables 13-1 to 13-*n*.

It should be noted that, hereinafter, in the case where there is no need to identify each of the broadcast cameras 11-1 to 11-*n*, those are simply referred to as the broadcast camera 11. Further, hereinafter, in the case where there is no need to identify each of the optical fiber cables 13-1 to 13-*n*, those are simply referred to as the optical fiber cable 13.

The broadcast camera 11 is used as a signal transmission apparatus to which a signal transmission method of transmitting RAW data with a Bayer arrangement by using SDI. Further, the CCU 12 is used as a signal reception apparatus to which a signal reception method of receiving the RAW data with the Bayer arrangement by using the SDI. The signal transmission system 1 in which the broadcast camera 11 and the CCU 12 are combined is used as a signal transmission system that performs transmission and reception of the RAW data with the Bayer arrangement by using the SDI.

The broadcast cameras 11 transmit the RAW data with the Bayer arrangement obtained by photographing to the CCU 12 via the optical fiber cables 13.

The CCU 12 controls the broadcast cameras 11, receives the RAW data from the broadcast cameras 11, and transmits a video signal (return video) for causing a monitor of the broadcast camera 11 to display a video which is being shot by another broadcast camera 11.

2. Structure Example of RAW Data

Figure 2:
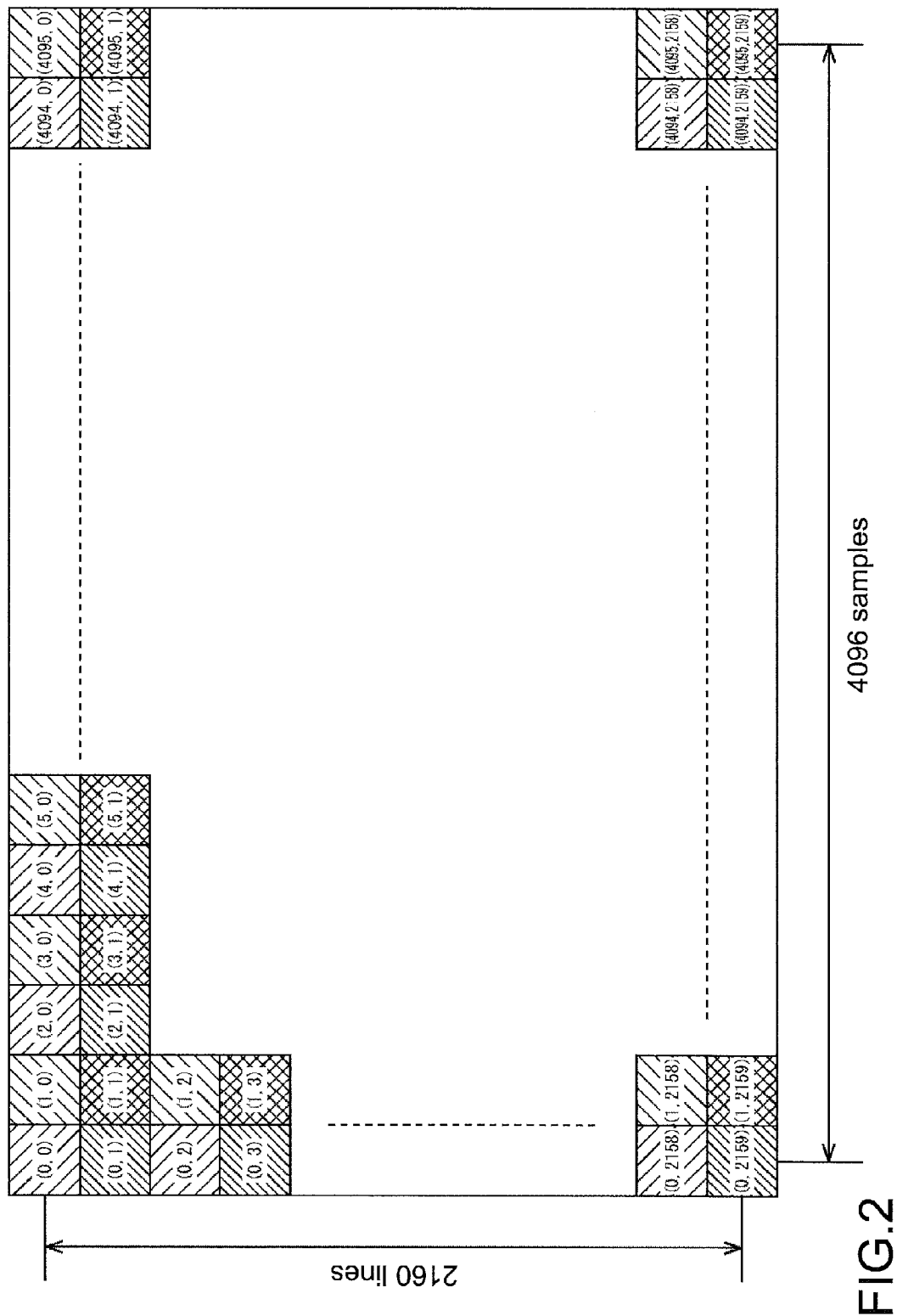
FIG. 2 is a diagram showing a data structure example of one frame of 4K RAW data.

FIG. 2 is a diagram showing a data structure example of one frame of 4K RAW data, which is to be a target to be transmitted in first to sixth embodiments of the present technology to be described later. Squares shown in FIG. 2 each represent one pixel, and numerals in the pixels represent coordinates thereof. It should be noted that, hereinafter, a pixel at the coordinates (x, y) is represented by a pixel (x, y).

Figure 3:
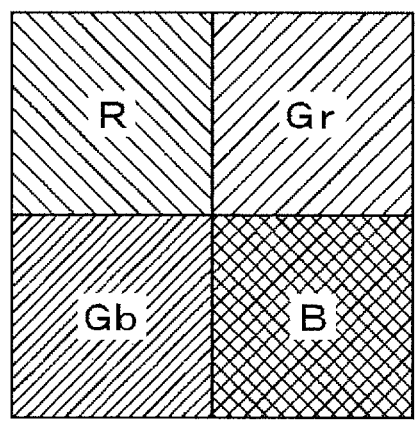
FIG. 3 is a diagram showing a structure of a Bayer arrangement.

In the RAW data, pixels of 4096 samples×2160 lines are arranged in accordance with the Bayer arrangement. That is, as shown in FIG. 3, a block formed of 2×2 pixels which correspond to Gr (green adjacent to R), Gb (green adjacent to B), R (red), and B (blue) is used as a unit (hereinafter, referred to as Bayer arrangement unit), and the pixels are arranged for each block unit. For example, four pixels of a pixel (0, 0) corresponding to R, a pixel (1, 0) corresponding to Gr, a pixel (0, 1) corresponding to Gb, and a pixel (1, 1) corresponding to B constitute one Bayer arrangement unit.

It should be noted that, on a background of the pixels shown in FIG. 2, different patterns are applied for each corresponding color in accordance with background patterns of the pixels corresponding to the colors shown in FIG. 3.

Further, hereinafter, in some cases, the pixels are represented by colors and coordinates corresponding thereto, for example, R (0, 0), Gr (1, 0), Gb (0, 1), and B (1, 1). Further, hereinafter, the pixels corresponding to Gr, Gb, R, and B may also be referred to as a Gr sample, a Gb sample, an R sample, and a B sample. Further, in the case where the RAW data is handled in the Bayer arrangement unit hereinafter, a left-end Bayer arrangement unit is set as a zeroth sample, and a first sample, a second sample, . . . are set in a rightward direction. Therefore, for example, in the zeroth sample on the first line in the Bayer arrangement unit, R (0, 0), Gr (1, 0), Gb (0, 1), and B (1, 1) are included, and in the first sample, R (2, 0), Gr (3, 0), Gb (2, 1), and B (3, 1) are included. Further, hereinafter, even-numbered samples in the Bayer arrangement unit are referred to as even samples, and odd-numbered samples are referred to as odd samples. Thus, in the Bayer arrangement unit, the zero-th, second, fourth . . . samples are the even samples, and the first, third, fifth, . . . samples are odd samples.

Pixel values of the pixels of the RAW data are each expressed by unprocessed value obtained by only quantizing a light reception level with a predetermined bit count P. It should be noted that the bit count P of the RAW data is set to a predetermined value of 16 bits or less (for example, 16 bits, 14 bits, 12 bits, or the like), for example.

It should be noted that, in the following, bits of the pixel values of the video data such as the RAW data are represented by b15, b14, b13, b12, b11, b10, b9, b8, b7, b6, b5, b4, b3, b2, b1, and b0 from the highest order. It should be noted that in the case where the pixel value is less than the 16 bits, similarly, the bits are represented by b15, b14, b13, . . . from the highest order of the pixel value. For example, in the case where the pixel value is the 10 bits, the bits are represented by b15, b14, b13, b12, b11, b10, b9, b8, b7, and b6 from the highest order.

Further, in the following, 10-bit data of a data stream on a 10-bit basis (word length: 10 bits) prescribed in an SDI format is represented by B9, B8, B7, B6, B5, B4, B3, B2, B1, B0 from the highest order.

Further, in the following, video data represented by m samples (pixels)×n lines is abbreviated as m×n. Further, in the following, video data having a frame count f per second in the sample count m in a horizontal direction× the line count n in a vertical direction is abbreviated as m×n/f. Further, in the following, a range of a frame rate is represented by f1-f2. For example, when a description of "23.98P-60P" is given, video data of a progressive system with the frame rates of 23.98 Hz, 24 Hz, 25 Hz, 29.97 Hz, 30 Hz, 50 Hz, 59.94 Hz, and 60 Hz is included therein.

Further, in the following, a ratio of a red signal R:a green signal G:a blue signal B in a primary-color signal transmission system, or a ratio of a brightness signal Y:a first color difference signal Cb:a second color difference signal Cr in a color difference signal transmission system is represented by x:y:z. Further, in the following, the video data in which R:G:B=x:y:z is established is abbreviated as video data of x:y:z (RGB), and the video data in which Y:Cb:Cr=x:y:z is established is abbreviated as video data of x:y:z (YCbCr).

Further, in the following, in some cases, a data stream prescribed by an HD-SDI format is referred to as HD-SDI data stream or simply referred to as HD-SDI. Further, in the following, data stream prescribed by a 3G-SDI format is referred to as 3G-SDI data stream or simply referred to as 3G-SDI in some cases.

3. First Embodiment

Subsequently, with reference to FIG. 4 to FIG. 13, the first embodiment of the present technology will be described. According to the first embodiment of the present technology, 4K RAW data with the Bayer arrangement of 23.98P-30P can be transmitted by data streams of two channels, in accordance with the requirements of level B of 3G-SDI prescribed in SMPTE 425-1.

(Circuit Structure Example of Broadcast Camera 11*a*)

Figure 4:
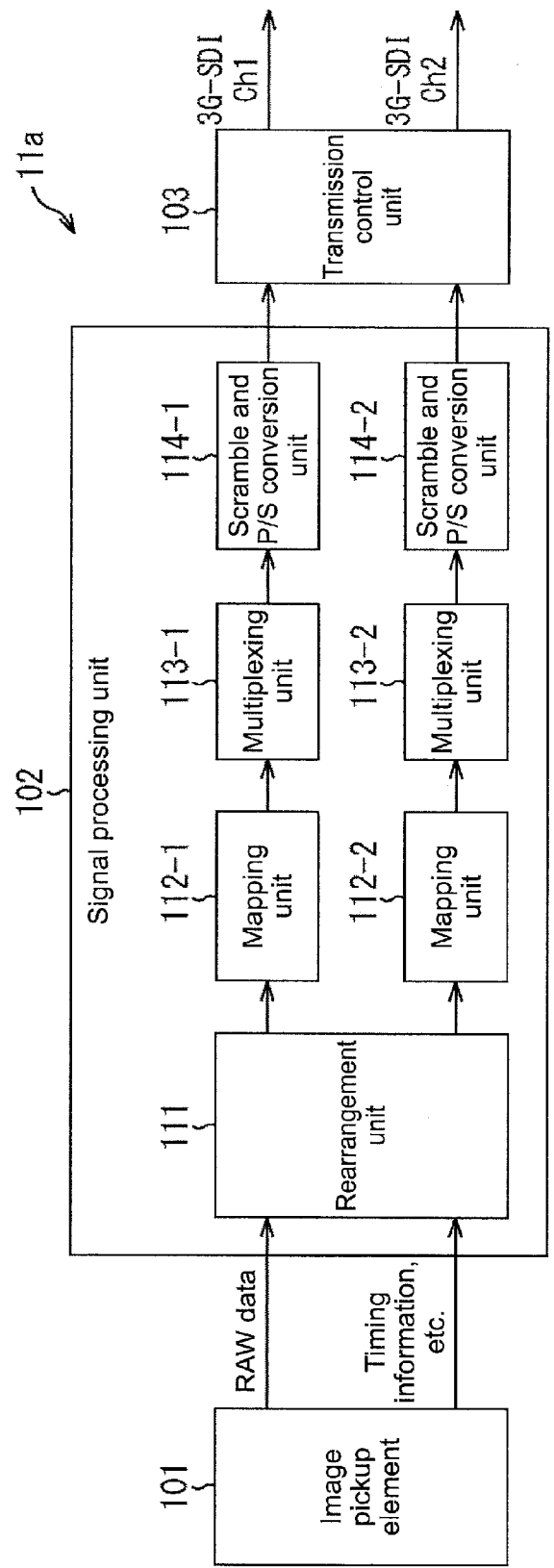
FIG. 4 is a block diagram showing a structure example of a function of a broadcast camera according to a first embodiment of the present technology.

FIG. 4 is a block diagram showing a structure example of a function of a part of a broadcast camera 11*a* according to the first embodiment.

The broadcast camera 11*a* includes an image pickup element 101, a signal processing unit 102, and a transmission control unit 103. Further, the signal processing unit 102 includes a rearrangement unit 111, mapping units 112-1 and 112-2, multiplexing units 113-1 and 113-2, and a scramble and P/S (parallel/serial) conversion unit 114-1 and 114-2.

The image pickup element 101 is formed of, for example, a CMOS image sensor, a CCD image sensor, or the like. The image pickup element 101 supplies 4K RAW data of 23.98P-30P obtained as a result of photographing to the rearrangement unit 111 of the signal processing unit 102. Further, the image pickup element 101 supplies timing information or the like necessary for processing by the signal processing unit 102 to the rearrangement unit 111.

The rearrangement unit 111 divides pixel data of the RAW data into upper 8 bits and lower 8 bits and rearranges the pixel data, as will be described later with reference to FIG. 7 or the like. The rearrangement unit 111 supplies a data column of the pixel data of the upper 8 bits after the rearrangement to the mapping unit 112-1 and supplies a data column of the pixel data of the lower 8 bits to the mapping unit 112-2.

As will be described later, the mapping unit 112-1 generates a plurality of data streams obtained by multiplexing pixel data supplied from the rearrangement unit 111 and supplies the data streams to the multiplexing unit 113-1. In the same way, the mapping unit 112-2 generates a plurality of data streams obtained by multiplexing pixel data supplied from the rearrangement unit 111 and supplies the data streams to the multiplexing unit 113-2.

As will be described later, the multiplexing unit 113-1 multiplexes the plurality of data streams supplied from the mapping unit 112-1, thereby generating a data stream of Ch1 of 3G-SDI, and supplies the data stream to the scramble and P/S conversion unit 114-1. In the same way, the multiplexing unit 113-2 multiplexes the plurality of data streams supplied from the mapping unit 112-2, thereby generating the data stream of Ch2 of 3G-SDI, and supplies the data stream to the scramble and P/S conversion unit 114-2.

As will be described later, the scramble and P/S conversion unit 114-1 performs scramble and P/S (parallel/serial) conversion for the data stream of ch1 of 3G-SDI and supplies the data stream processed to the transmission control unit 103. In the same way, the scramble and P/S conversion unit 114-2 performs scramble and P/S (parallel/serial) conversion for the data stream of ch2 of 3G-SDI and supplies the data stream processed to the transmission control unit 103.

The transmission control unit 103 controls transmission of the data streams of Ch1 and Ch2 of 3G-SDI to a CCU 12a.

(Circuit Structure Example of CCU 12a)

Figure 5:
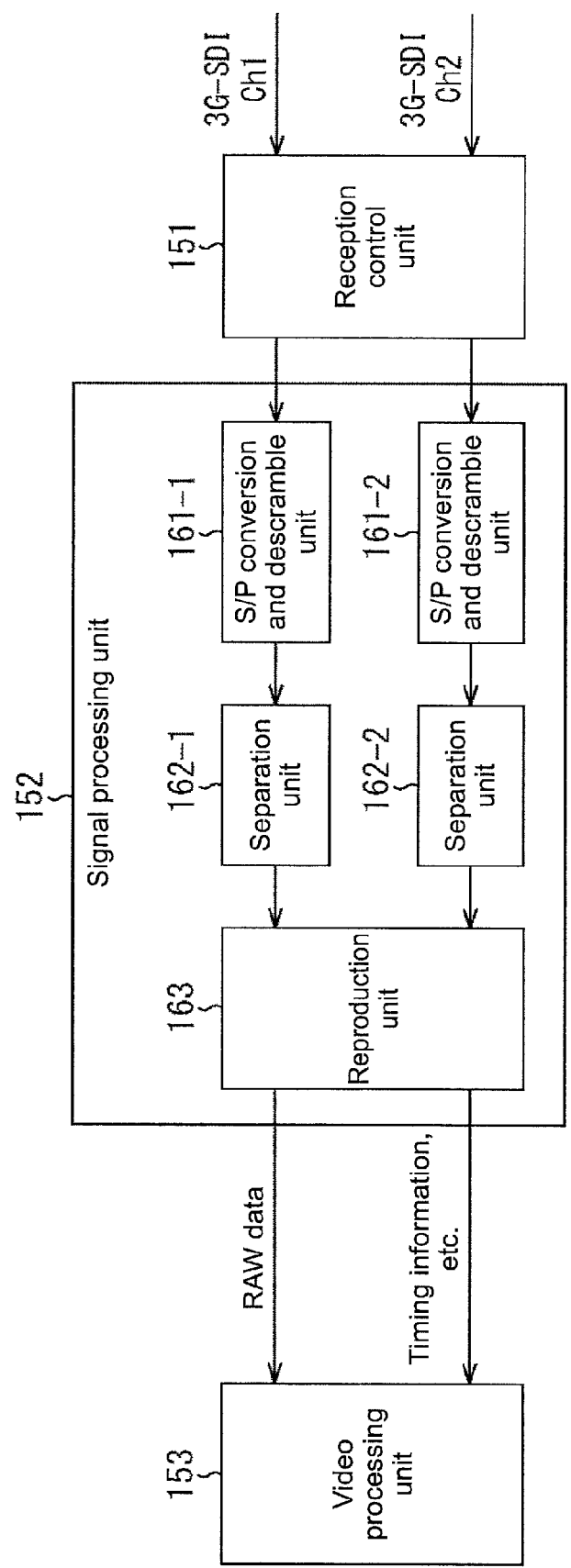
FIG. 5 is a block diagram showing a structure example of a function of a CCU according to the first embodiment of the present technology.

FIG. 5 is a block diagram showing a structure example of a function of a part of the CCU 12a according to the first embodiment.

The CCU 12a includes a reception control unit 151, a signal processing unit 152, and a video processing unit 153. Further, the reception control unit 151 includes S/P (serial/parallel) conversion and descramble units 161-1 and 161-2, separation units 162-1 and 162-2, and a reproduction unit 163.

The reception control unit 151 controls reception of the data streams of Ch1 and Ch2 of 3G-SDI from the broadcast camera 11a. The reception control unit 151 supplies the received data stream of Ch1 of 3G-SDI to the S/P conversion and descramble unit 161-1 and supplies the data stream of Ch2 of 3G-SDI to the S/P conversion and descramble unit 161-2.

The S/P conversion and descramble unit 161-1 performs the S/P (serial/parallel) conversion and descramble for the data stream of Ch1 of 3G-SDI and supplies the processed data stream to the separation unit 162-1. In the same way, the S/P conversion and descramble unit 161-2 performs the S/P conversion and the descramble for the data stream of Ch2 of 3G-SDI, and supplies the processed data stream to the separation unit 162-2.

The separation unit 162-1 separates the data stream of Ch1 of 3G-SDI into a plurality of data streams and supplies the data streams to the reproduction unit 163. In the same way, the separation unit 162-2 separates the data stream of Ch2 of 3G-SDI into a plurality of data streams and supplies the data streams to the reproduction unit 163.

The reproduction unit 163 restores the original RAW data from the data streams supplied from the separation unit 162-1 and the separation unit 162-2 and supplies the data to the video processing unit 153. Further, the reproduction unit 163 supplies timing information or the like necessary for processing by the video processing unit 153 to the video processing unit 153.

The video processing unit 153 is formed of an apparatus for performing various processes with respect to the RAW data and performs a predetermined process with respect to the RAW data supplied from the reproduction unit 163. For example, the video processing unit 153 is formed of a display that displays a video based on the RAW data, a storage apparatus that stores the RAW data, and the like.

(RAW Data Transmission Process)

Subsequently, with reference to flowchart shown in FIG. 6, a description will be given on a RAW data transmission process performed by the broadcast camera 11a. It should be noted that the process indicates a process in the case where the RAW data of one frame is transmitted. In the case where the RAW data with a plurality of frames is transmitted, the process is repeatedly performed.

The RAW data shown in FIG. 2 has a ratio of the sample counts for the colors is G:B:R=2:1:1, and thus can be assumed to have the same data structure as the video data of 4:2:2 (YCbCr). That is, it is possible to make an assumption that one Bayer arrangement unit of the RAW data has the same data structure of 2 pixels which are adjacent in the horizontal direction to the video data of 4:2:2 (YCbCr). When a Bayer arrangement unit conversion is made, it is possible to make an assumption that the RAW data shown in FIG. 2 has the same data structure as the video data of 4:2:2 (YCbCr) of 2048 samples×1080 lines.

In view of this, by alternately thinning a pixel of the RAW data by one sample in a horizontal direction in the Bayer arrangement unit, the broadcast camera 11a performs separation into two pieces of RAW data and transmits the data. As a result, it is possible to transmit the RAW data by the same process as in the case where two pieces of 2K video data of 4:2:2 (YCbCr) of the 2048 samples×1080 lines are transmitted in parallel.

In Step S1, the rearrangement unit 111 rearranges the pixel data. That is, the rearrangement unit 111 rearranges the pixel data of the RAW data into data columns shown on the left side of FIG. 7.

Figure 7:
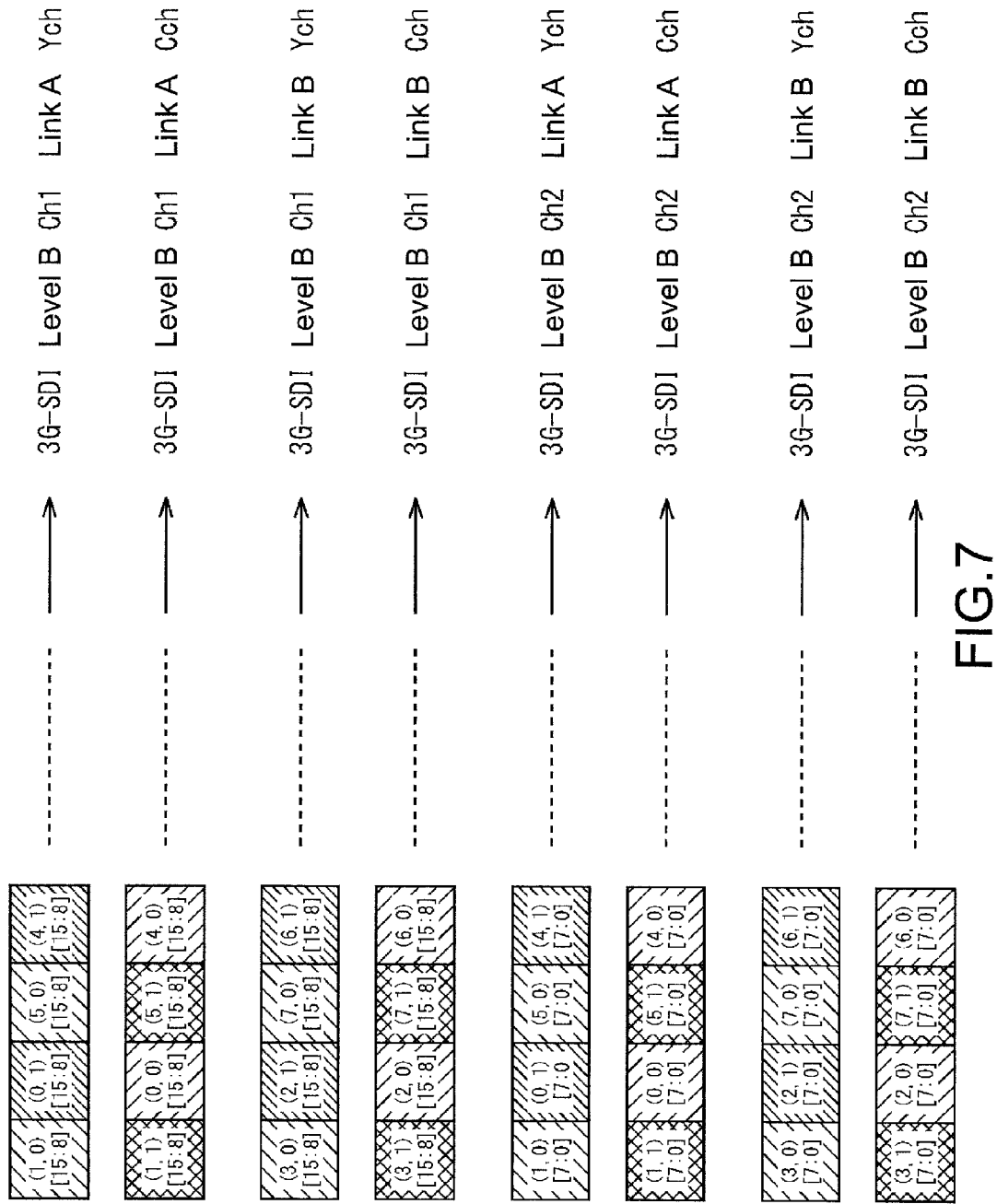
FIG. 7 is a diagram showing an example of rearrangement of pixel data.

Specifically, the first data column shown in FIG. 7 is obtained by arranging upper 8 bits (b15-b9) of the pixel data of the Gr sample and the Gb sample included in the even samples in the Bayer arrangement unit into the order of Gr, Gb, Gr, Gb, . . . in accordance with the order (raster scanning order) from left to right and from up to bottom of the RAW data.

The second data column is obtained by arranging upper 8 bits of the pixel data of the B sample and the R sample included in the even samples in the Bayer arrangement unit into the order of B, R, B, R, . . . in accordance with the order from left to right and from up to bottom of the RAW data.

The third data column is obtained by arranging upper 8 bits of the pixel data of the Gr sample and the Gb sample included in the odd samples in the Bayer arrangement unit into the order of Gr, Gb, Gr, Gb, . . . in accordance with the order from left to right and from up to bottom of the RAW data.

The fourth data column is obtained by arranging upper 8 bits of the pixel data of the B sample and the R sample included in the odd samples in the Bayer arrangement unit into the order of B, R, B, R, . . . in accordance with the order from left to right and from up to bottom of the RAW data.

The fifth data column is obtained by arranging lower 8 bits of the pixel data of the Gr sample and the Gb sample included in the even samples in the Bayer arrangement unit into the order of Gr, Gb, Gr, Gb, . . . in accordance with the order from left to right and from up to bottom of the RAW data.

The sixth data column is obtained by arranging lower 8 bits of the pixel data of the B sample and the R sample included in the odd samples in the Bayer arrangement unit into the order of B, R, B, R, . . . in accordance with the order from left to right and from up to bottom of the RAW data.

The seventh data column is obtained by arranging lower 8 bits of the pixel data of the Gr sample and the Gb sample included in the odd samples in the Bayer arrangement unit into the order of Gr, Gb, Gr, Gb, . . . in accordance with the order from left to right and from up to bottom of the RAW data.

The eighth data column is obtained by arranging lower 8 bits of the pixel data of the B sample and the R sample included in the odd samples in the Bayer arrangement unit into the order of B, R, B, R, . . . in accordance with the order from left to right and from up to bottom of the RAW data.

Then, the rearrangement unit 111 supplies the first to fourth data columns shown in FIG. 7 to the mapping unit 112-1 and supplies the fifth to eighth data columns to the mapping unit 112-2.

In Step S2, the mapping units 112-1 and 112-2 perform mapping of the pixel data. Specifically, the mapping unit 112-1 multiplexes the first pixel data of FIG. 7 with the data stream (hereinafter, referred to as Y channel data stream) of a Y channel (Y signal) of HD-SDI prescribed in SMPTE 274M or the like, as shown in the upper side of FIG. 8. That is, out of the upper 8 bits (b15-b8) of the pixel data of the G sample included in the even samples in the Bayer arrangement unit of the RAW data, upper 6 bits (b15-b10) are multiplexed with respect to upper 6 bits (B9-B4) of an active video data space of the Y channel data stream. Further, out of the upper 8 bits (b15-b9) of the pixel data of the G sample included in the even samples in the Bayer arrangement unit of the RAW data, lower 2 bits (b9-b8) are multiplexed with respect to lower 2 bits (B1-B0) of an active video data space of the Y channel data stream.

Figure 8:
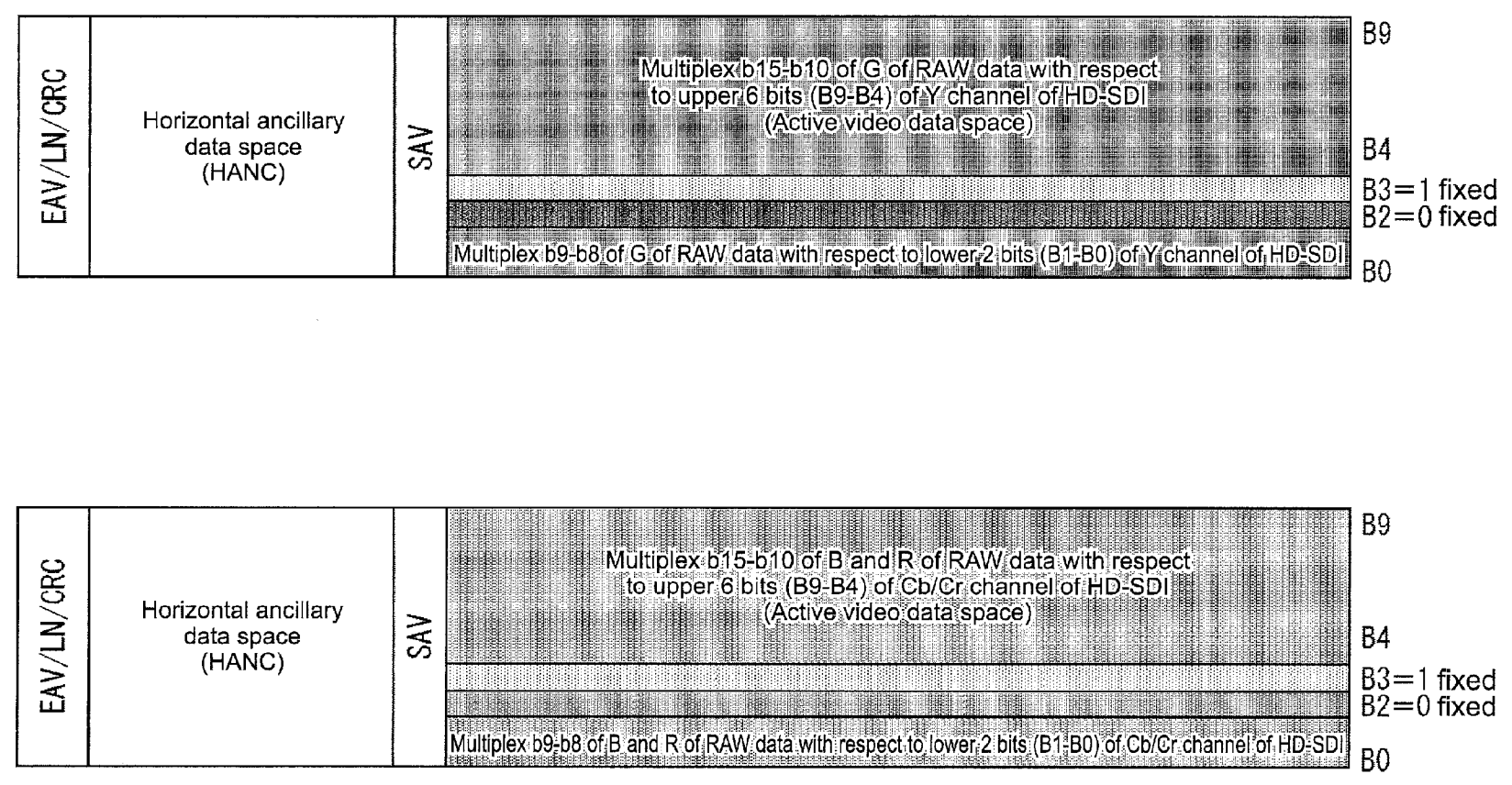

Further, the mapping unit 112-1 multiplexes the second pixel data shown in FIG. 7 with respect to a data stream (hereinafter, referred to as C channel data stream) of a Cb/Cr channel (Cb/Cr signal) of the HD-SDI prescribed in SMPTE 274M or the like, as shown in the lower side of FIG. 8. That is, out of the upper 8 bits (b15-b8) of the pixel data of the B sample and the R sample included in the even samples in the Bayer arrangement unit of the RAW data, upper 6 bits (b15-b10) are multiplexed with respect to upper 6 bits (B9-B4) of an active video data space of the C channel data stream. Further, out of the upper 8 bits (b15-b9) of the pixel data of the B sample and the R sample included in the Bayer arrangement unit of the RAW data, lower 2 bits (b9-b8) are multiplexed with lower 2 bits (B1-B0) of the active video data space of the C channel data stream. It should be noted that the pixel data of the B sample is multiplexed with a Cb channel are of the C channel data stream, and the pixel data of the R sample is multiplexed with the Cr channel of the C channel data stream.

Further, the mapping unit 112-1 multiplexes the third pixel data of FIG. 7 with the Y channel data stream, like the first pixel data. Further, the mapping unit 112-1 multiplexes the fourth pixel data of FIG. 7 with the C channel data stream, like the second pixel data.

Figure 9:
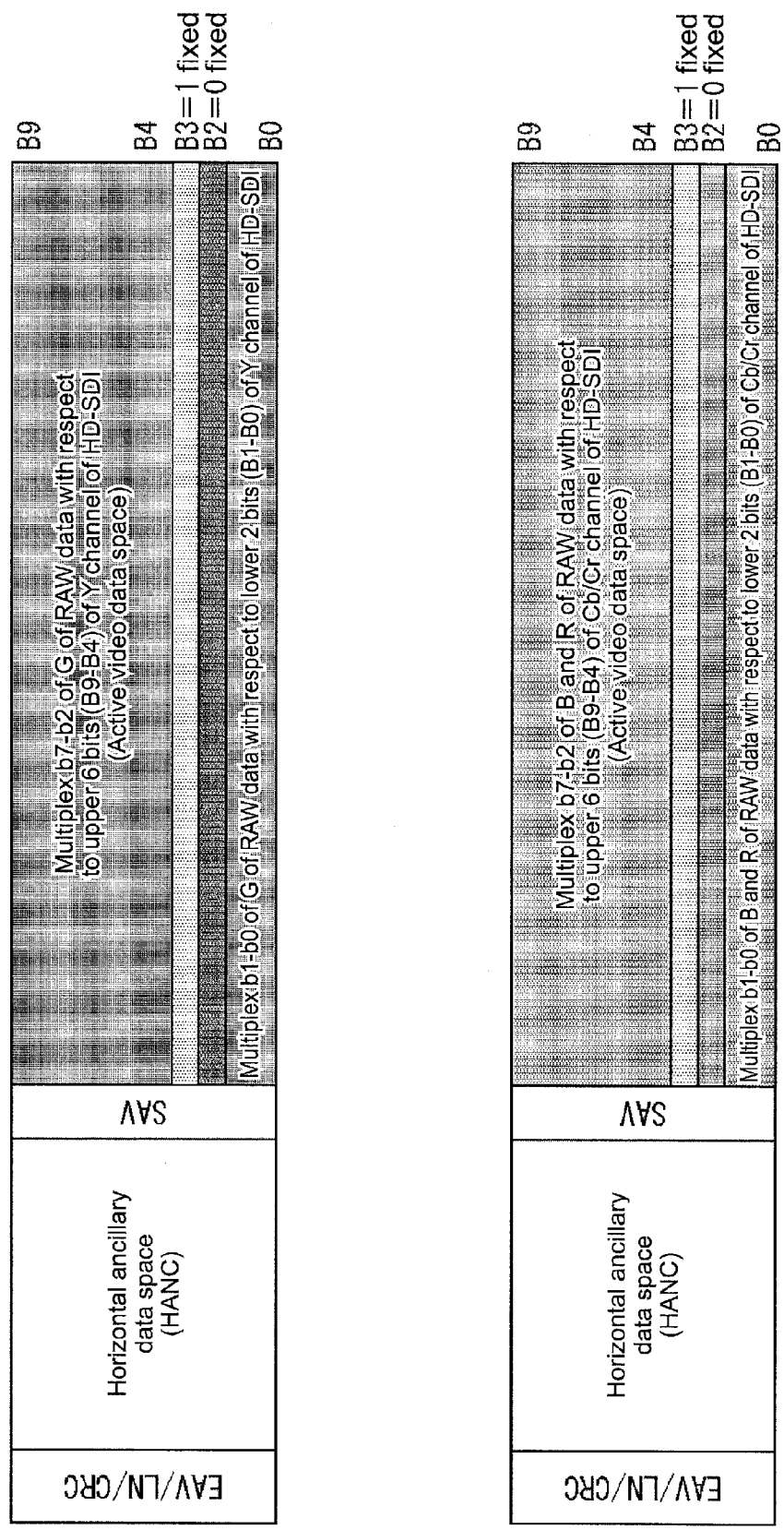
FIG. 9 is a diagram for explaining a method of multiplexing the pixel data to a data stream.

The mapping unit 112-2 multiplexes the fifth pixel data shown in FIG. 7 with the Y channel data stream as shown in the upper side of FIG. 9. That is, out of lower 8 bits (b7-b0) of the pixel data of the G sample included in the even samples in the Bayer arrangement unit of the RAW data, upper 6 bits (b7-b2) are multiplexed with an active video data space of the Y channel data stream. Further, out of the lower 8 bits (b7-b0) of the pixel data of the G sample included in the even samples in the Bayer arrangement unit of the RAW data, the lower 2 bits (b1-b0) are multiplexed with lower 2 bits (B1-B0) of an active video data space of the Y channel data stream. It should be noted that when the pixel data of the RAW data is less than 16 bits, the active video data space includes bits with respect to which the pixel data is not multiplexed, but any value can be set to the bits.

Further, as shown in the lower side of FIG. 9, the mapping unit 112-2 multiplexes the sixth pixel data of FIG. 7 with respect to the C channel data stream. That is, out of lower 8 bits (b7-b0) of the pixel data of the B sample and the R sample included in the even samples in the Bayer arrangement unit of the RAW data, the upper 6 bits (b7-b2) are multiplexed with respect to upper 6 bits (B9-B4) of the active video data space of the C channel data stream. Further, out of lower 8 bits (b7-b0) of the pixel data of the B sample and the R sample included in the even samples in the Bayer arrangement unit of the RAW data, lower 2 bits (b1-b0) are multiplexed with respect to lower 2 bits (B1-B0) of the active video data space of the C channel data stream. It should be noted that the pixel data of the B sample is multiplexed with respect to the Cb channel area of the C channel data stream, and the pixel data of the R sample is multiplexed with respect to the Cr channel area of the C channel data stream. Further, in the case where the pixel data of the RAW data is less than 16 bits, the active video data space includes bits with respect to which the pixel data is not multiplexed, any value can be set to the bits.

Further, the mapping unit 112-2 multiplexes the seventh pixel data shown in FIG. 7 with respect to Y channel data stream like the fifth pixel data. Further, the mapping unit 112-2 multiplexes the eighth pixel data of FIG. 7 with respect to the C channel data stream like the sixth pixel data.

As described above, the pixel data of the RAW data is multiplexed with respect to the four Y channel data streams and the four C channel data streams.

Further, the mapping unit 112-1 and the mapping unit 112-2 set, to different values, the two bits of B3 and B2, with respect to which the pixel data of the active video data space and a horizontal ancillary data space (HANC) of each data stream is not multiplexed. For example, as shown in FIG. 8 and FIG. 9, fixed values of B3=1 and B2=0 are set. Alternatively, the fixed values of B3=0 and B2=1 are set, or either one of B3=1, B2=0 and B3=0, B2=1 may be variably set for each word.

As a result, it is possible to prevent forbidden codes of 000h to 003h and 3FCh to 3FFh which are forbidden in HD-SDI and 3G-SDI from being set to the horizontal ancillary data space and the active video data space of the data stream. That is, in those forbidden codes, upper 8 bits of the 10 bits are the same value. By setting different values for the two bits of B3 and B2 of the active video data space and the horizontal ancillary data space, the same value is prevented from being set to the upper 8 bits. It should be noted that h indicates the hexadecimal notation.

It should be noted that, hereinafter, the data streams with respect to which the first, third, fifth, and seventh pixel data of FIG. 7 are multiplexed are referred to as Y channel data streams 1, 2, 3, and 4, respectively. Further, hereinafter, the data streams with respect to which the second, fourth, sixth, and eighth pixel data of FIG. 7 are multiplexed are referred to as C channel data streams 1, 2, 3, and 4, respectively.

In Step S3, the mapping unit 112-1 and the mapping unit 112-2 generate a data stream corresponding to HD-SDI. Specifically, the mapping unit 112-1 and the mapping unit 112-2 add horizontal blanking data (H-Blank), vertical blanking data (V-Blank), SAV (Start of Active Video), EAV (End of Active Video), LN (Line Number), and CRCC (Cyclic Redundancy Check) to the data streams in accordance with the requirements of SMPTE 274, SMPTE 292-1, or SMPTE 424M/425-1.

Figure 10:
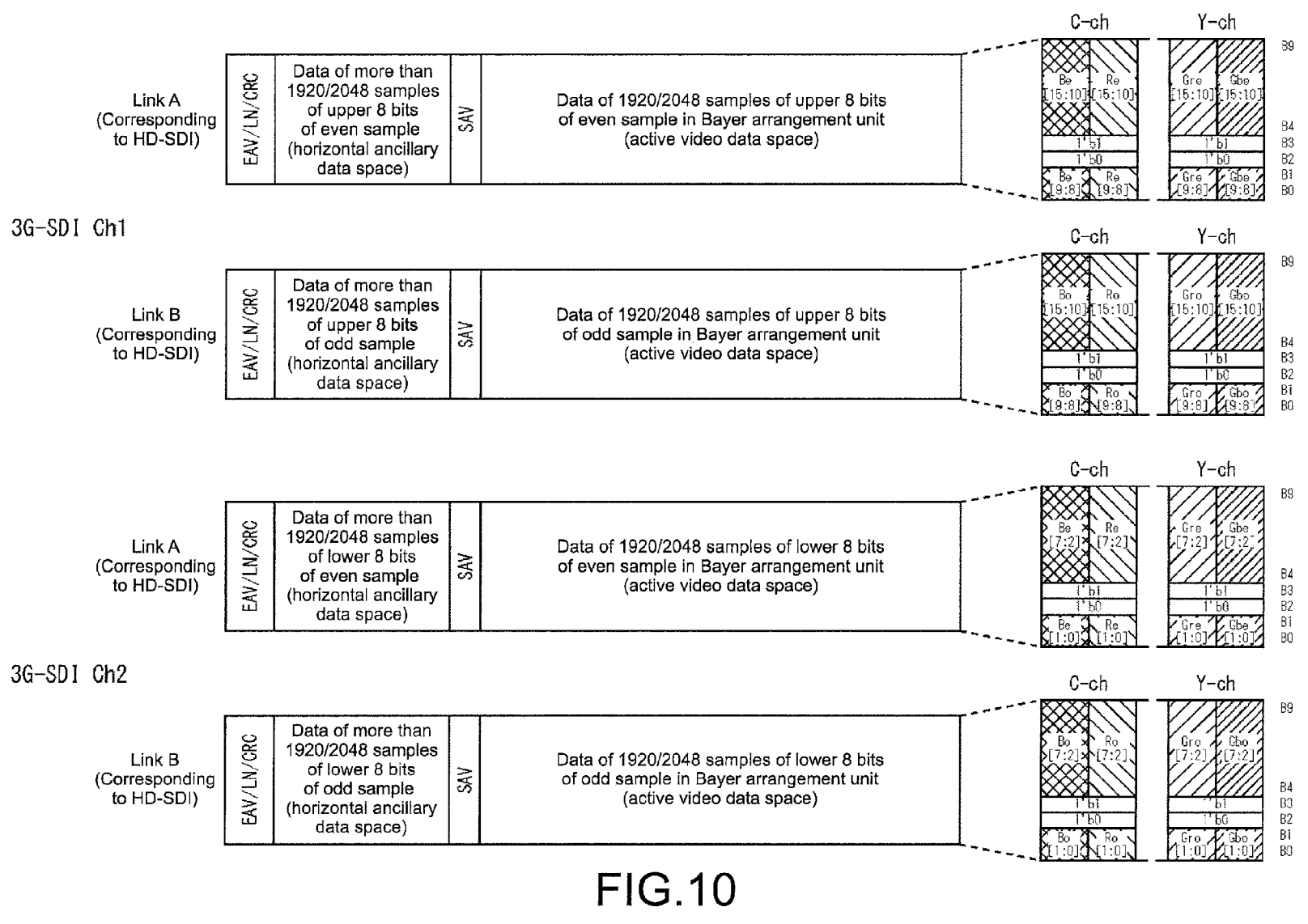

Further, the mapping unit 112-1 performs byte-interleave and multiplexing for a Y channel data stream 1 and a C channel data stream 1 on a word basis, thereby generating the data stream of a link A of Ch1 of 3G-SDI shown in FIG. 10. The data stream is a data stream corresponding to HD-SDI and has the same data structure as the data stream of the link A of FIG. 5 in SMPTE 425-1. Further, the data stream is obtained by multiplexing upper 8 bits of the pixel data of the samples of Gr, Gb, B, and R included in the even samples in the Bayer arrangement unit of the RAW data. In other words, the data stream is obtained by multiplexing upper 8 bits of the pixel data of the RAW data generated by extracting the even samples in the Bayer arrangement unit of the RAW data.

In the same way, the mapping unit 112-1 performs byte-interleave and multiplexing for a Y channel data stream 2 and a C channel data stream 2 on a word basis, thereby generating the data stream of a link B of Ch1 of 3G-SDI shown in FIG. 10. The data stream is a data stream corresponding to HD-SDI and has the same data structure as the data stream of the link B of FIG. 5 in SMPTE 425-1. Further, the data stream is obtained by multiplexing upper 8 bits of the pixel data of the samples of Gr, Gb, B, and R included in the odd samples in the Bayer arrangement unit of the RAW data. In other words, the data stream is obtained by multiplexing upper 8 bits of the pixel data of the RAW data generated by extracting the odd samples in the Bayer arrangement unit of the RAW data.

In this way, the upper 8 bits of the pixel data of the samples of Gr, Gb, B, and R of the RAW data are separated into two data streams and multiplexed on the pixel (sample) basis (more exactly, Bayer arrangement unit).

Further, the mapping unit 112-2 performs byte-interleave and multiplexes a Y channel data stream 3 and a C channel data stream 3 on the word basis, thereby generating the data stream of the link A of Ch2 of 3G-SDI shown in FIG. 10. The data stream is a data stream corresponding to HD-SDI and has the same data structure as the data stream of the link A of FIG. 5 in SMPTE 425-1. Further, the data stream is obtained by multiplexing lower 8 bits of the pixel data of the samples of Gr, Gb, B, and R included in the even samples in the Bayer arrangement unit of the RAW data. In other words, the data stream is obtained by multiplexing lower 8 bits of the pixel data of the RAW data generated by extracting the even samples in the Bayer arrangement unit of the RAW data.

In the same way, the mapping unit 112-2 performs byte-interleave and multiplexes a Y channel data stream 4 and a C channel data stream 4 on the word basis, thereby generating the data stream of the link B of Ch2 of 3G-SDI shown in FIG. 10. The data stream is a data stream corresponding to HD-SDI and has the same data structure as the data stream of the link B of FIG. 5 in SMPTE 425-1. Further, the data stream is obtained by multiplexing lower 8 bits of the pixel data of the samples of Gr, Gb, B, and R included in the odd samples in the Bayer arrangement unit of the RAW data. The data stream is obtained by multiplexing lower 8 bits of the pixel data of the RAW data generated by extracting the odd samples in the Bayer arrangement unit of the RAW data.

In this way, the lower 8 bits of the pixel data of the samples of Gr, Gb, B, and R of the RAW data are separated into two data streams and multiplexed on the pixel (sample) basis (more exactly, Bayer arrangement unit).

Then, the mapping unit 112-1 supplies the data streams of a link A and a link B of Ch1 in 3G-SDI to the multiplexing unit 113-1. The mapping unit 112-2 supplies the data streams of the link A and the link B of Ch2 in 3G-SDI to the multiplexing unit 113-2.

In Step S4, the multiplexing unit 113-1 and the multiplexing unit 113-2 each generate a data stream of 3G-SDI. Specifically, the multiplexing unit 113-1 performs byte-interleave and multiplexes the data streams of the link A and the link B of Ch1 of 3G-SDI on the word basis, thereby generating the data stream of Ch1 of 3G-SDI. The data stream is obtained by multiplexing the upper 8 bits of the pixel data of the samples of Gr, Gb, B, and R of the RAW data. The multiplexing unit 113-1 supplies the generated data stream of Ch1 of 3G-SDI to the scramble and P/S conversion unit 114-1.

The multiplexing unit 113-2 performs byte-interleave and multiplexes the data streams of the link A and the link B of Ch2 of 3G-SDI on the word basis, thereby generating the data stream of Ch2 of 3G-SDI. The data stream is obtained by multiplexing the lower 8 bits of the pixel data of the samples of Gr, Gb, B, and R of the RAW data. The multiplexing unit 113-2 supplies the generated data stream of Ch2 of 3G-SDI to the scramble and P/S conversion unit 114-2.

It should be noted that the active video data space of the data stream of 3G-SDI (or HD-SDI) has 1920 or 2048 samples. On the other hand, as described above, the RAW data of FIG. 2 is thinned alternately one by one sample in the horizontal direction in the Bayer arrangement unit and separated into two pieces of RAW data, with the result that the sample count of the G sample per line of the separated RAW data and the total sample count of the B sample and the R sample each become 2048 samples.

Therefore, for example, it is possible to multiplex all the pixel data of the separated RAW data with respect to the active video data space of the 2048 samples of 3G-SDI (or HD-SDI). Alternatively, with respect to the active video data space of 1920 samples of 3G-SDI (or HD-SDI), all the pixel data of the separated RAW data may be multiplexed, and the pixel data of 2048−1920=128 samples, which is difficult to be multiplexed with respect to the active video data space, may be multiplexed with respect to the horizontal ancillary data space. Further, in the case where ancillary data or the like is multiplexed with the horizontal blanking area of the RAW data, the data can be multiplexed with respect to the horizontal ancillary data space.

In Step S5, the scramble and P/S conversion units 114-1 and 114-2 perform scramble and P/S conversion for the data stream of 3G-SDI. Specifically, the scramble and P/S conversion unit 114-1 performs scramble for the data stream of Ch1 of 3G-SDI by the same method as in the requirements of SMPTE 424M. Further, the scramble and P/S conversion unit 114-1 performs P/S conversion for the data stream of Ch1 of 3G-SDI and supplies the data stream to the transmission control unit 103.

In the same way, the scramble and P/S conversion unit 114-2 performs scramble for the data stream of Ch2 of 3G-SDI by the same method as in the requirements of SMPTE 424M. Further, the scramble and P/S conversion unit 114-2 performs P/S conversion for the data stream of Ch2 of 3G-SDI and supplies the data stream to the transmission control unit 103.

In Step S6, the transmission control unit 103 transmits the data stream of 3G-SDI. That is, the transmission control unit 103 transmits the data stream of a serial series of 3G-SDI of the two channels of Ch1 and Ch2, thereby transmitting the RAW data to the CCU 12a.

After that, the signal transmission process is terminated.
(RAW Data Reception Process)

Figure 11:
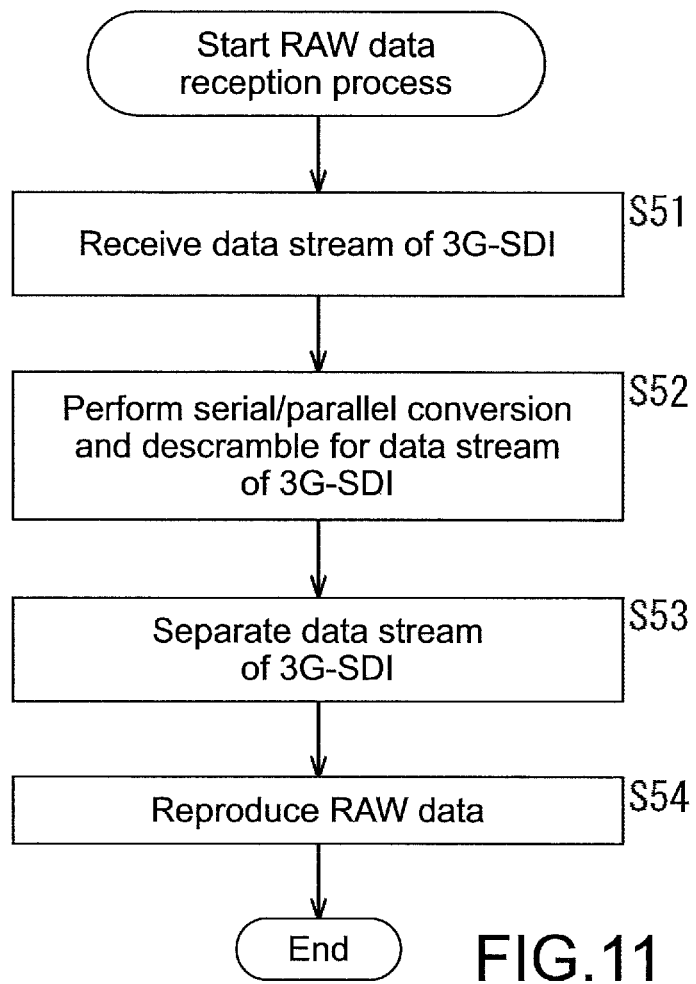
FIG. 11 is a flowchart for explaining the first embodiment of a RAW data reception process.

Next, with reference to flowchart shown in FIG. 11, a description will be given on a RAW data reception process performed by the CCU 12a so as to correspond to the RAW data transmission process performed by the broadcast camera 11a shown in FIG. 6.

In Step S51, the reception control unit 151 receives the data stream of 3G-SDI. That is, the reception control unit 151 receives the data streams of Ch1 and Ch2 of 3G-SDI transmitted from the broadcast camera 11a. The reception control unit 151 supplies the data stream of Ch1 to the S/P conversion and descramble unit 161-1, and supplies the data stream of Ch2 to the S/P conversion and descramble unit 161-2.

In Step S52, the S/P conversion and descramble units 161-1 and 161-2 performs S/P conversion and descramble for the data stream of 3G-SDI. Specifically, the S/P conversion and descramble unit 161-1 performs S/P conversion and descramble for the data stream of Ch1 by a process opposite to the process performed by the scramble and P/S conversion unit 114-1 of the broadcast camera 11a. The S/P conversion and descramble unit 161-1 supplies the processed data stream of Ch1 to the separation unit 162-1.

In the same way, the S/P conversion and descramble unit 161-2 performs S/P conversion and descramble for the data stream of Ch2 and supplies the processed data stream of Ch2 to the separation unit 162-2.

In Step S53, the separation units 162-1 and 162-2 separate the data streams of 3G-SDI. Specifically, the separation unit 162-1 performs word synchronization detection for the data stream of Ch1, separates the data stream of Ch1 into the link A and the link B of FIG. 10, and supplies these to the reproduction unit 163. In the same way, the separation unit 162-2 separates the data stream of Ch2 into the link A and the link B shown in FIG. 10 and supplies the links to the reproduction unit 163.

In Step S54, the reproduction unit 163 reproduces the RAW data. Specifically, the reproduction unit 163 extracts, from the link A and the link B of the data stream of Ch1, upper 8 bits of the pixel data of the samples of Gr, Gb, B, and R of the RAW data. Further, the reproduction unit 163 extracts, from the link A and the link B of the data stream of Ch2, lower 8 bits of the pixel data of the samples of Gr, Gb, B, and R of the RAW data.

Then, the reproduction unit 163 restores the original pixel data from the upper 8 bits and the lower 8 bits of the pixel data extracted, and rearranges the data in accordance with the Bayer arrangement, thereby restoring the original RAW data. Then, the reproduction unit 163 supplies the restored RAW data to the video processing unit 153.

It should be noted that, at this time, the data may be converted into video data with a format different from the RAW data and supplied to the video processing unit 153.

After that, the RAW data reception process is terminated.

In this way, in accordance with the requirements of level B of 3G-SDI, for example, by using an existing IC or apparatus for 3G-SDI, it is possible to transmit 4K RAW data with the Bayer arrangement of 23.98P-30P. Further, with respect to the data stream of Ch1, upper 8 bits of the pixel data of the RAW data are multiplexed. Accordingly, for example, by using an observation apparatus for 3G-SDI, it is possible to visually confirm a video of the RAW data by the data stream of Ch1. Further, by using CRCC added to the data streams, it is possible to monitor an error of a transmission system by the observation apparatus for 3G-SDI.

4. Modified Example of First Embodiment

Hereinafter, a modified example of the first embodiment described above will be described.
(Modified Example of RAW Data Multiplexing Method)

The method of multiplexing the RAW data with respect to the channels of the data stream of 3G-SDI is not limited to the methods described above with reference to FIG. 7 and the like, and another method can be used.

Figure 12:
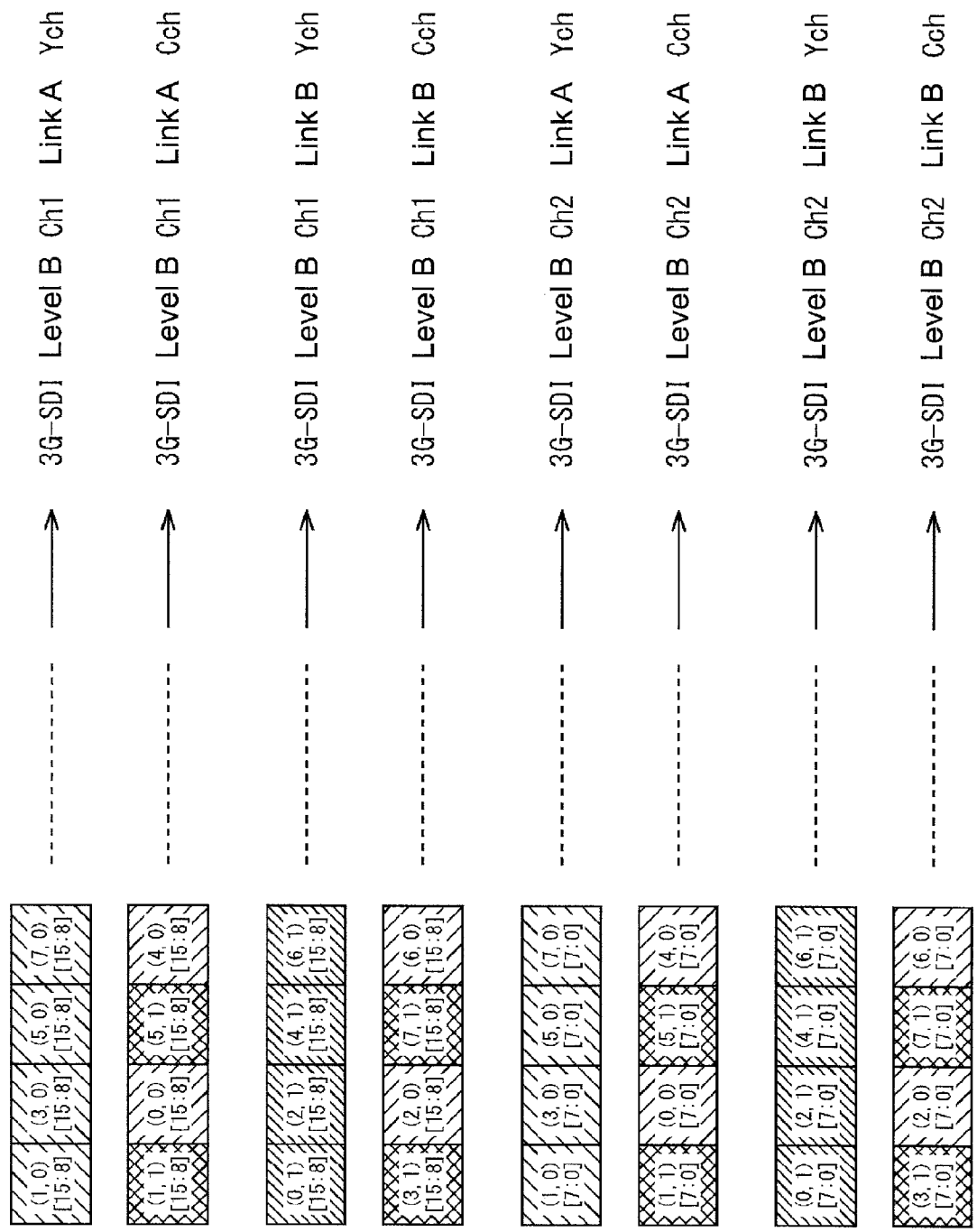
FIG. 12 is a diagram showing a first modified example of a rearrangement of the pixel data.

For example, as shown in FIG. 12, the RAW data may be multiplexed with respect to the channels of 3G-SDI. Specifically, comparing FIG. 12 and FIG. 7 with each other, the methods of multiplexing the pixel data of the B and R samples are the same, while the methods of multiplexing the pixel data of the Gr and Gb samples are different. That is, upper 8 bits of the pixel data of the Gr sample are multiplexed with respect to the Y channel of the data stream of the link A of Ch1 of 3G-SDI, and lower 8 bits are multiplexed with respect to the Y channel of the data stream of the link A of Ch2 of 3G-SDI. Further, upper 8 bits of the pixel data of the Gb sample are multiplexed with respect to the Y channel of the data stream of the link B of Ch1 of 3G-SDI, and lower 8 bits are multiplexed with respect to the Y channel of the data stream of the link B of Ch2 of 3G-SDI.

Figure 13:
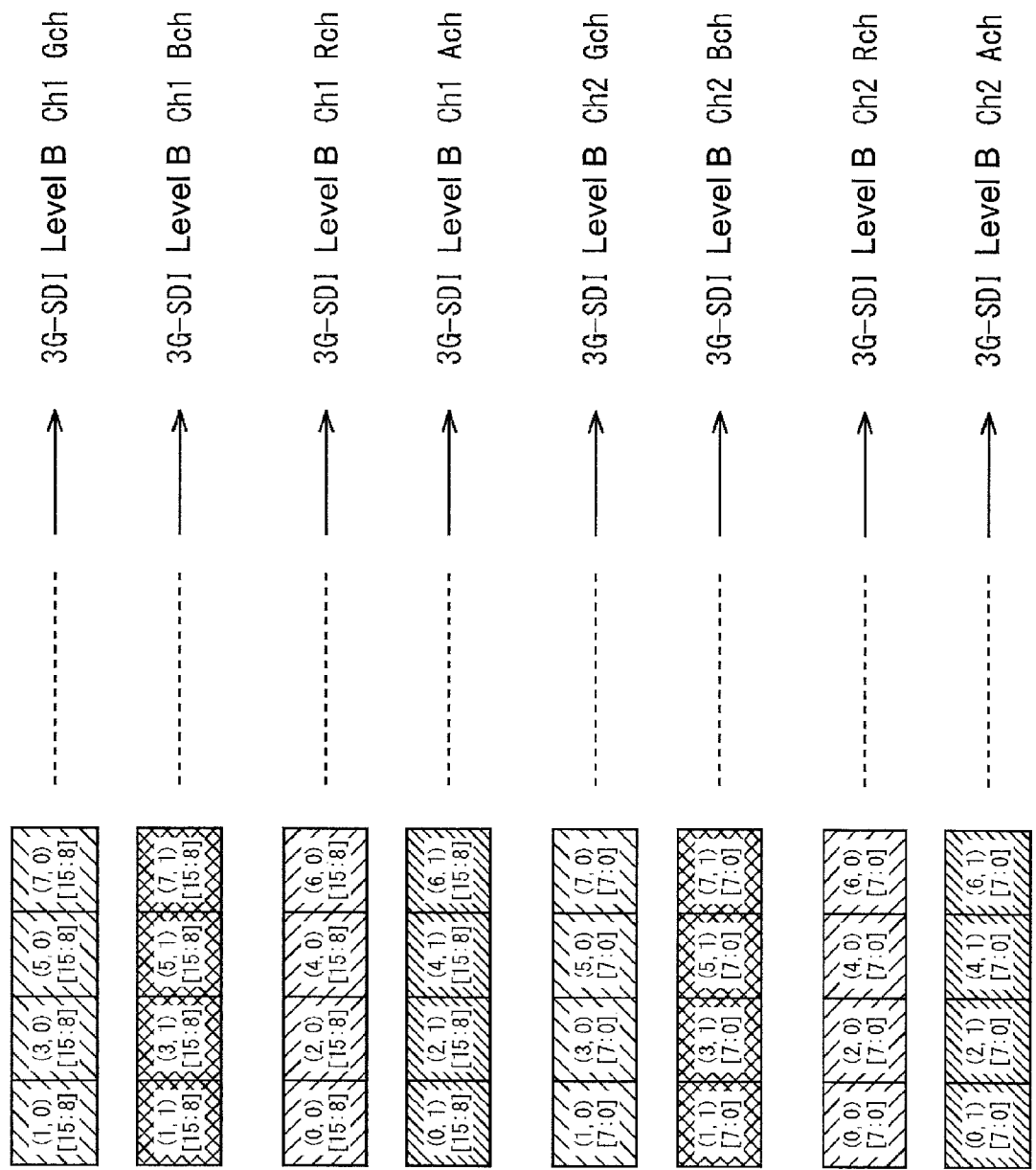
FIG. 13 is a diagram showing a second modified example of a rearrangement of the pixel data.

Further, the RAW data of FIG. 2 has the same number of samples of Gb, Gr, B, and R. When the Bayer arrangement unit conversion is made, the data can be assumed to be video data of 2048 samples×1080 lines. Therefore, as shown in FIG. 13, the RAW data can be multiplexed with respect to the data stream of 3G-SDI and transmitted in accordance with the requirements in the case where video data of 4:4:4:4 (RGB+A) shown in FIG. 3 and FIG. 4 or the like of SMPTE 372.

Specifically, as in the case of FIG. 7 and FIG. 12, upper 8 bits of the pixel data of the RAW data are multiplexed with respect to the data stream of Ch1 of 3G-SDI, and lower 8 bits are multiplexed with respect to the data stream of Ch2. Further, the data streams of the two channels follows a format of level B of 3G-SDI in the case where RGBA is multiplexed with respect to the Y channel and C channel of the data stream of HDI-SDI of the two channel, by the method as shown in FIG. 3 and FIG. 4 of SMPTE 372.

More specifically, upper 8 bits of the pixel data of the Gr sample of the RAW data are multiplexed with respect to the G channel of the data stream of Ch1 of the level B of 3G-SDI, and lower 8 bits are multiplexed with respect to the G channel of the data stream of Ch2 of the level B of 3G-SDI.

Upper 8 bits of the pixel data of the B sample of the RAW data are multiplexed with respect to the B channel of the data stream of Ch1 of the level B of 3G-SDI, and lower 8 bits are multiplexed with respect to the B channel of the data stream of Ch2 of the level B of 3G-SDI.

Upper 8 bits of the pixel data of the R sample of the RAW data are multiplexed with respect to the R channel of the data stream of Ch1 of the level B of 3G-SDI, and lower 8 bits are multiplexed with respect to the R channel of the data stream of Ch2 of the level B of 3G-SDI.

Upper 8 bits of the pixel data of the Gr sample of the RAW data are multiplexed with respect to an A (Auxiliary) channel of the data stream of Ch1 of the level B of 3G-SDI, and lower 8 bits are multiplexed with respect to the A channel of the data stream of Ch2 of the level B of 3G-SDI.

It should be noted that the channels with respect to which the Gr sample and the Gb sample are multiplexed may be interchanged. That is, the pixel data of the Gr sample may be multiplexed with respect to the A channel of the data stream of level B of 3G-SDI, the pixel data of the Gb sample may be multiplexed with respect to the G channel of the data stream of level B of 3G-SDI.

Further, in both cases of FIG. 12 and FIG. 13, the bit multiplexing method for the pixel data of the RAW data is the same as the method described above with reference to FIG. 8 and FIG. 9.

(Case where Transmission is Performed by Using HD-SDI)

In the above description, the example in which the RAW data is transmitted by using 3G-SDI is given, but the RAW data can also be transmitted by using HD-SDI. Specifically, the data streams of the link A and the link B of Ch1 and Ch2 of 3G-SDI shown in FIG. 10 have the same structure as the data streams of HD-SDI, respectively. Accordingly, the data streams are individually scrambled and subjected to the P/S conversion to be transmitted, with the result that 4K RAW data of 23.98P-30P can be transmitted by the data streams of HD-SDI of 4 channels.

Also in this case, as in the case of using 3G-SDI, for example, an existing IC or apparatus for HD-SDI is used, thereby making it possible to transmit 4K RAW data of 23.98P-30P with the Bayer arrangement. Further, by using an observation apparatus for HD-SDI, it is possible to visually confirm a video of the RAW data by the data stream with which upper 8 bits of the pixel data of the RAW data are multiplexed. Further, by using CRCC added to the data streams, it is possible to monitor an error of the transmission system by the observation apparatus for HD-SDI.

(Transmission Method in Case where Pixel Data of RAW Data is Equal to or Less than 8 Bits)

In the case where the pixel data of the RAW data is equal to or less than 8 bits, the fifth to eighth data columns of FIG. 7, FIG. 12, and FIG. 13 become unnecessary to be transmitted. Therefore, it is possible to transmit the RAW data by the data stream of 3G-SDI of 1 channel or the data stream of HD-SDI of 2 channels.

5. Second Embodiment

Subsequently, with reference to FIG. 14 to FIG. 20, a description will be given on a second embodiment of the present technology. According to the second embodiment of the present technology, it is possible to transmit 4K RAW data with the Bayer arrangement of 47.95P-60P by the data stream of 4 channels in accordance with the requirements of the level B of 3G-SDI prescribed in SMPTE 372 and SMPTE 425-1.

(Circuit Structure Example of Broadcast Camera 11*b*)

Figure 14:
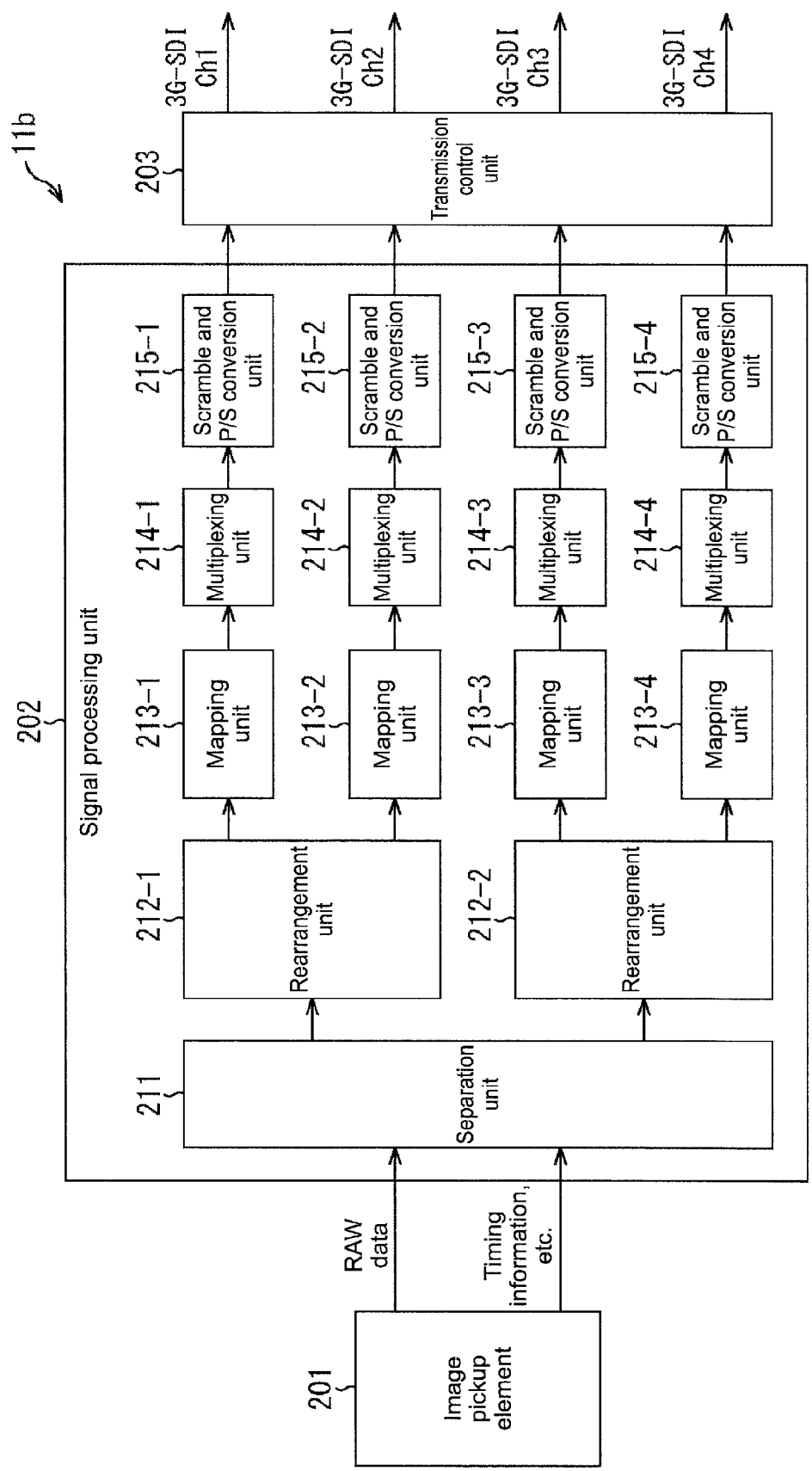
FIG. 14 is a block diagram showing a structure example of a function of a broadcast camera according to a second embodiment of the present technology.

FIG. 14 is a block diagram showing a structure example of a function of a part of a broadcast camera 11*b* according to the second embodiment.

The broadcast camera 11*b* includes an image pickup element 201, a signal processing unit 202, and a transmission control unit 203. Further, the signal processing unit 202 includes a separation unit 211, rearrangement units 212-1 and 212-2, mapping units 213-1 to 213-4, multiplexing units 214-1 to 214-4, and scramble and P/S conversion units 215-1 to 215-4.

The image pickup element 201 is formed of, for example, a CMOS image sensor, a CCD image sensor, or the like. The image pickup element 201 supplies 4K RAW data of 47.95P-60P obtained as a result of photographing to the separation unit 211 of the signal processing unit 202. Further, the image pickup element 201 supplies timing information or the like necessary for a process by the signal processing unit 202 to the separation unit 211.

The separation unit 211 separates the RAW data into video data of 2 channels of link A and link B, as will be described later with reference to FIG. 17. The separation unit 211 supplies the video data of the link A to the rearrangement unit 212-1 and supplies the video data of the link B to the rearrangement unit 212-2.

Like the rearrangement unit 111 of the broadcast camera 11*a* shown in FIG. 4, the rearrangement unit 212-1 separates the pixel data of the video data of link A into upper 8 bits and lower 8 bits and rearranges the pixel data. The rearrangement unit 212-1 supplies the data columns of the rearranged pixel data of the upper 8 bits to the mapping unit 213-1 and supplies the data columns of the pixel data of the lower 8 bits to the mapping unit 213-2.

In the same way, the rearrangement unit 212-2 separates the pixel data of the video data of the link B into upper 8 bits and lower 8 bits and rearranges the pixel data. The rearrangement unit 212-2 supplies the data columns of the rearranged pixel data of the upper 8 bits to the mapping unit 213-3 and supplies the data columns of the pixel data of the lower 8 bits to the mapping unit 213-4.

Like the mapping units 112-1 and 112-2 of the broadcast camera 11*a* of FIG. 4, the mapping units 213-1 and 213-2 generate a plurality of data streams with respect to which the pixel data supplied from the rearrangement unit 212-1 is multiplexed. Then, the mapping units 213-1 and 213-2 supply the generated plurality of data streams to the multiplexing units 214-1 and 214-2, respectively. In the same way, the mapping units 213-3 and 213-4 generate a plurality of data streams with respect to which the pixel data supplied from the rearrangement unit 212-2 is multiplexed, and supply the data streams to the multiplexing units 214-3 and 214-4, respectively.

Like the multiplexing units 113-1 and 113-2 of the broadcast camera 11*a* shown in FIG. 4, the multiplexing units 214-1 to 214-4 perform multiplexing for the plurality of data streams supplied from the mapping units 213-1 to 213-4, thereby generating the data streams of Ch1 to Ch4 of 3G-SDI. Then, the multiplexing units 214-1 to 214-4 supply the generated data streams of Ch1 to Ch4 of 3G-SDI to the scramble and P/S conversion units 215-1 to 215-4, respectively.

Like the scramble and P/S conversion units 215-1 to 215-4, the scramble and P/S conversion units 114-1 and 114-2 of broadcast camera 11a of FIG. 4 perform scramble and P/S conversion of the data streams of Ch1 to Ch4 of 3G-SDI. Then, the scramble and P/S conversion units 215-1 to 215-4 respectively supply the processed data streams to the transmission control unit 203.

The transmission control unit 203 controls the transmission of the data streams of Ch1 to Ch4 of 3G-SDI to the CCU 12b.

(Circuit Structure Example of CCU 12b)

Figure 15:
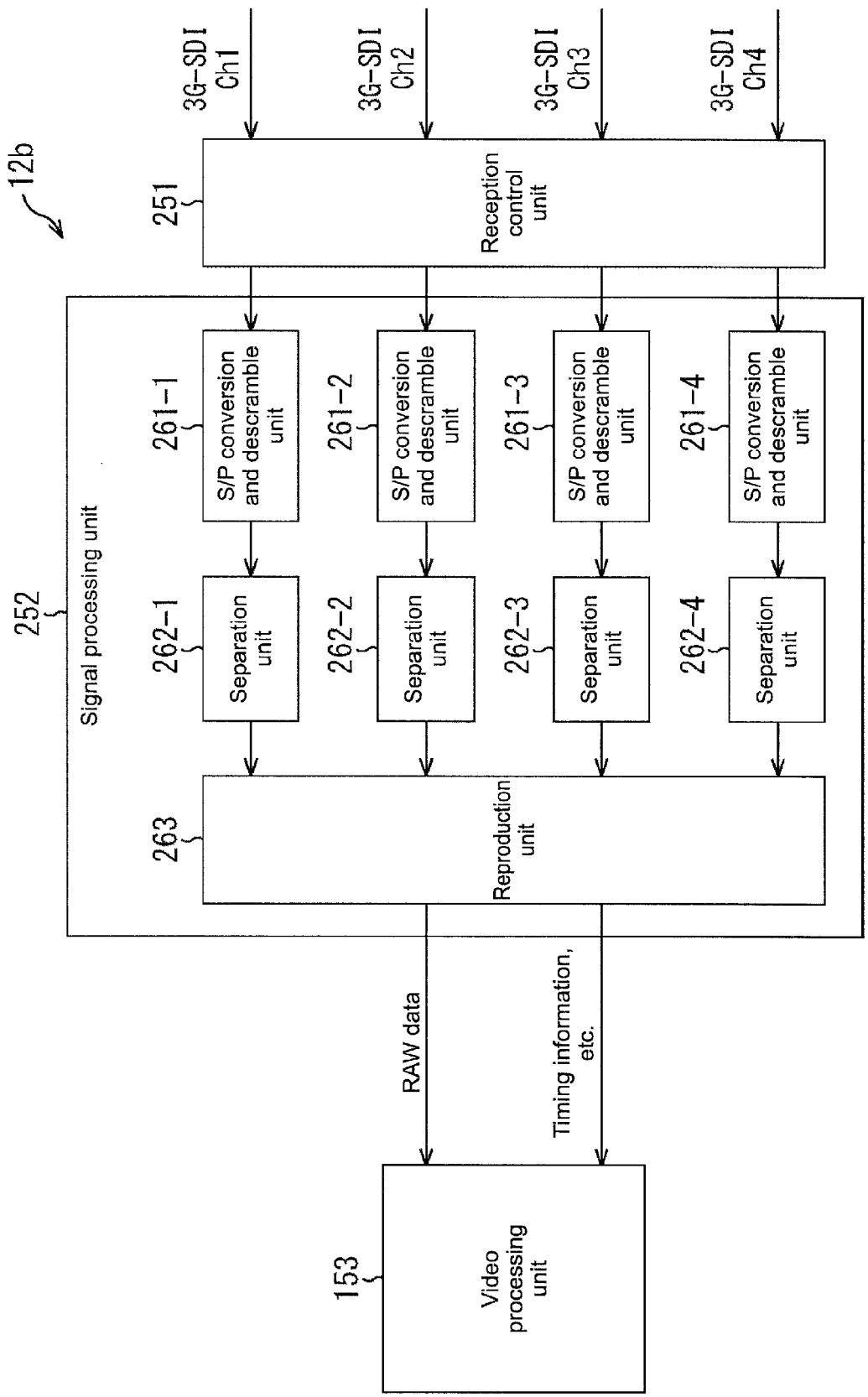
FIG. 15 is a block diagram showing a structure example of a function of a CCU according to the second embodiment of the present technology.

FIG. 15 is a block diagram showing a structure example of a function of a part of the CCU 12b according to the second embodiment. It should be noted that in the figure, parts corresponding to FIG. 5 are denoted by the same symbols, and a description on the same processes will be omitted as appropriate.

The CCU 12b includes a reception control unit 251, a signal processing unit 252, and a video processing unit 153. Further, the signal processing unit 252 includes S/P conversion and descramble units 261-1 to 261-4, separation units 262-1 to 261-4, and a reproduction unit 263.

The reception control unit 251 controls reception of the data streams of Ch1 to Ch4 of 3G-SDI from the broadcast cameras 11b. The reception control unit 251 supplies the received data streams of Ch1 to Ch4 of 3G-SDI to the S/P conversion and descramble units 261-1 to 261-4.

The S/P conversion and descramble units 261-1 to 261-4 respectively perform S/P conversion and descramble for the data streams of Ch1 to Ch4 of 3G-SDI and supply the processed data streams to the separation units 262-1 to 262-4.

The separation units 262-1 to 262-4 respectively separate the data streams of Ch1 to Ch4 of 3G-SDI into a plurality of data streams and supply the data streams to the reproduction unit 263.

The reproduction unit 263 restores the original RAW data from the data streams supplied from the separation unit 262-1 to the separation unit 262-4 and supplies the data to the video processing unit 153. Further, the reproduction unit 263 supplies timing information or the like necessary for a process by the video processing unit 153 to the video processing unit 153.

(RAW Data Transmission Process)

Subsequently, with reference to a flowchart shown in FIG. 16, a description will be given on a RAW data transmission process performed by the broadcast camera 11b. It should be noted that the process indicates a process in the case where the RAW data of 2 frames is transmitted. In the case where the RAW data of 3 frames or more is transmitted, the process is repeatedly performed.

In Step S101, the separation unit 211 separates the RAW data into video data of 2 channels.

A frame rate of the RAW data in the second embodiment is twice the frame rate of the RAW data in the first embodiment. In view of this, in accordance with the requirements in FIG. 2 of SMPTE 372, as shown in FIG. 17, the separation unit 211 alternately thins a line of the Bayer arrangement unit of the RAW data in a horizontal direction so as to include the horizontal blanking area, thereby separating the RAW data into the video data of 2 channels corresponding to 23.98P-30P (47.95I-60I).

Figure 17:
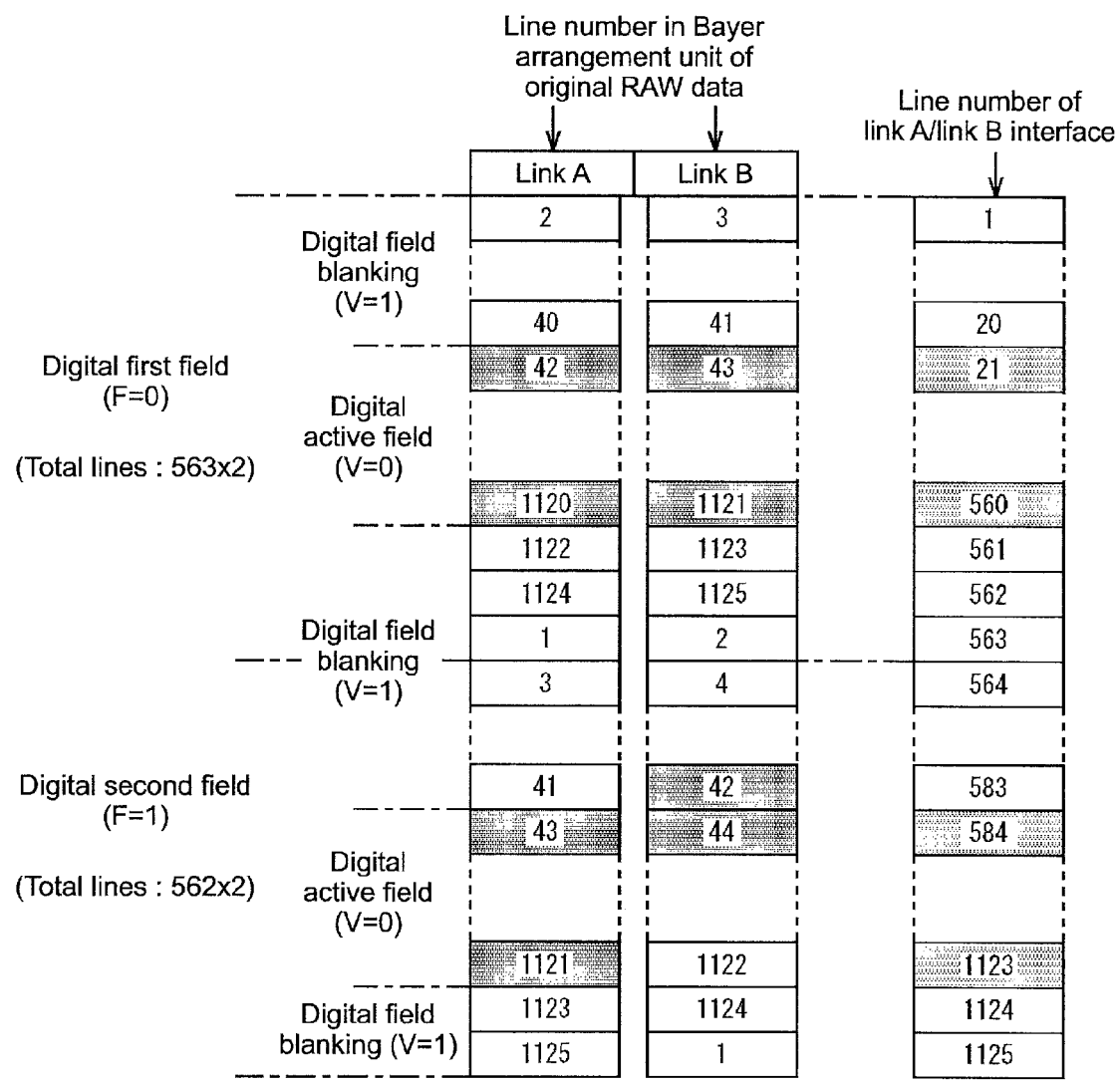
FIG. 17 is a diagram for explaining an RAW data division method.

Specifically, as shown in FIG. 17, the RAW data is separated into the video data of 2 channels of link A and link B on a two-frame basis. It should be noted that numbers indicated in the link A and the link B are indicate line numbers of the Bayer arrangement unit that includes the horizontal blanking area of the RAW data. It should be noted that, for example, a line obtained by combining the uppermost line and the next line of the RAW data shown in FIG. 2 is converted as one line in the Bayer arrangement unit.

For example, a description will be given on the case where continuous frames of a frame i and a frame i+1 of the RAW data are separated into the video data of 2 channels of the link A and the link B.

To a range from a 1 line to a 562 line of the link A, even lines of the Bayer arrangement unit of the frame i of the RAW data are assigned. Out of those lines, to a range from the 1 line to a 20 line and a range from 561 line to the 562 line, even lines of the Bayer arrangement unit in the horizontal blanking area of the frame i of the RAW data, which is not shown in FIG. 2, are assigned. To a range from the 21 line to the 560 line, even lines of the Bayer arrangement unit in the active video data space of the frame i of the RAW data are assigned.

Further, to a range from a 563 line to a 1125 line of the link A, odd lines of the Bayer arrangement unit of the frame i+1 of the RAW data are assigned. Out of those lines, to a range from the 563 line to a 583 line and a range from 1124 line to the 1125 line, odd lines of the Bayer arrangement unit in the horizontal blanking area of the frame i+1 of the RAW data which is not shown in FIG. 2 are assigned. To a range from a 584 line to a 1123 line, odd lines of the Bayer arrangement unit in the active video data space of the frame i+1 of the RAW data are assigned.

On the other hand, to a range from a 1 line to a 562 line of the link B, odd lines of the Bayer arrangement unit of the frame i of the RAW data are assigned. Out of those lines, to a range from the 1 line to a 20 line and a range from 561 line to the 562 line, odd lines of the Bayer arrangement unit in the horizontal blanking area of the frame i of the RAW data which is not shown in FIG. 2 are assigned. To a range from a 21 line to a 560 line, odd lines of the Bayer arrangement unit in the active video data space of the frame i of the RAW data are assigned.

Further, to a range from a 563 line to a 1124 line of the link B, even lines of the Bayer arrangement unit of the frame i+1 of the RAW data are assigned. Out of those lines, to a range from the 563 line to a 582 line and a range from a 1123 line to the 1124 line, even lines of the Bayer arrangement unit in the horizontal blanking area of the frame i+1 of the RAW data which is not shown in FIG. 1 are assigned. To a range from a 583 line to a 1122 line, even lines of the Bayer arrangement unit in the active video data space of the frame i+1 of the RAW data are assigned. It should be noted that to a 1125 line of the link B, the first line of the Bayer arrangement unit of a frame i+2 of the RAW data is assigned.

In this way, the RAW data is separated into the video data of 2 channels of the link A and the link B on the two-frame basis. Then, the separation unit 211 supplies the video data of the link A to the rearrangement unit 212-1 and supplies the video data of the link B to the rearrangement unit 212-2.

Figure 6:
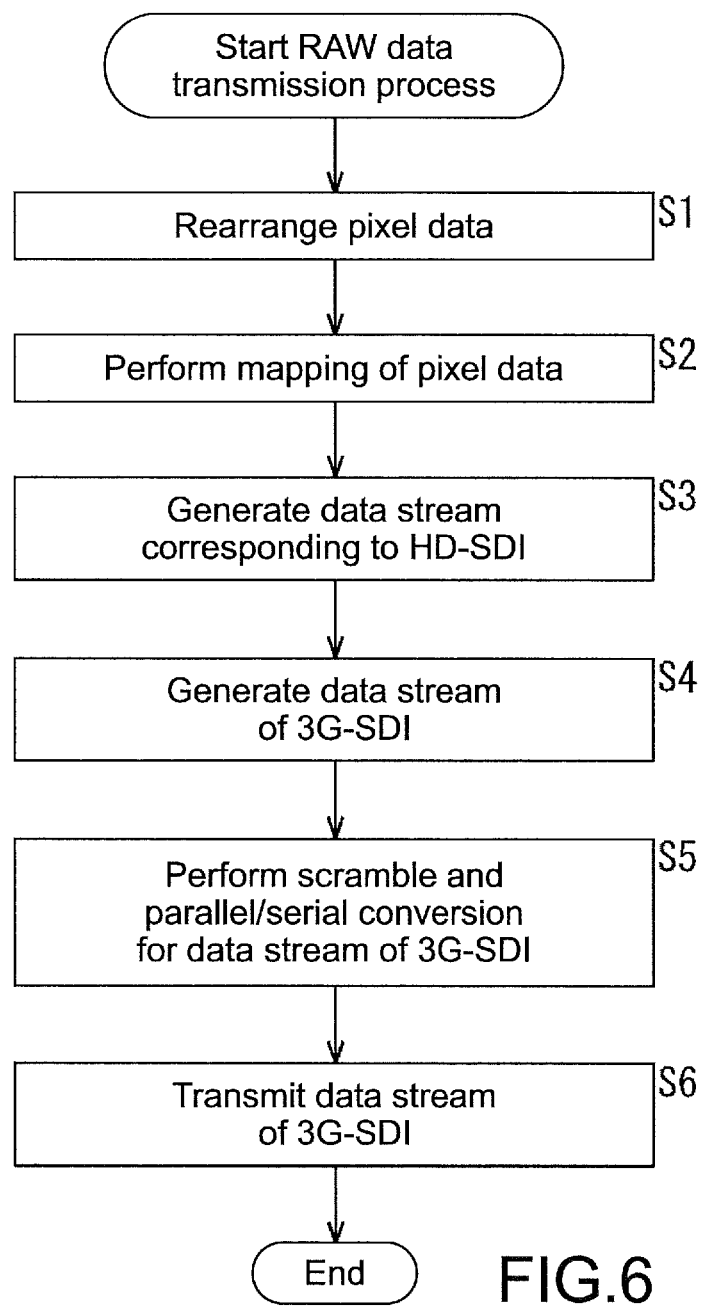
FIG. 6 is a flowchart for explaining the first embodiment of a RAW data transmission process.
Figure 18:
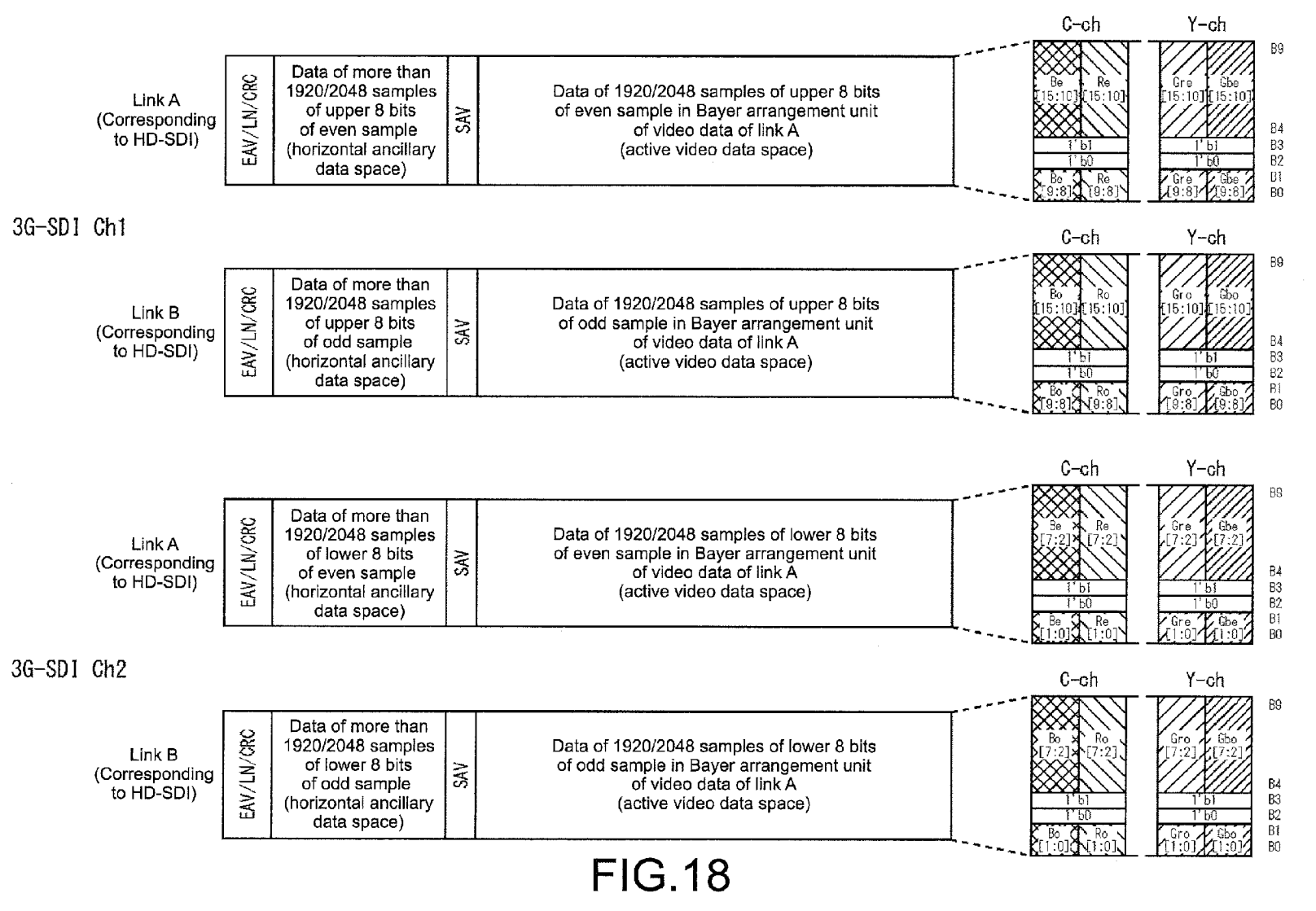
Figure 19:
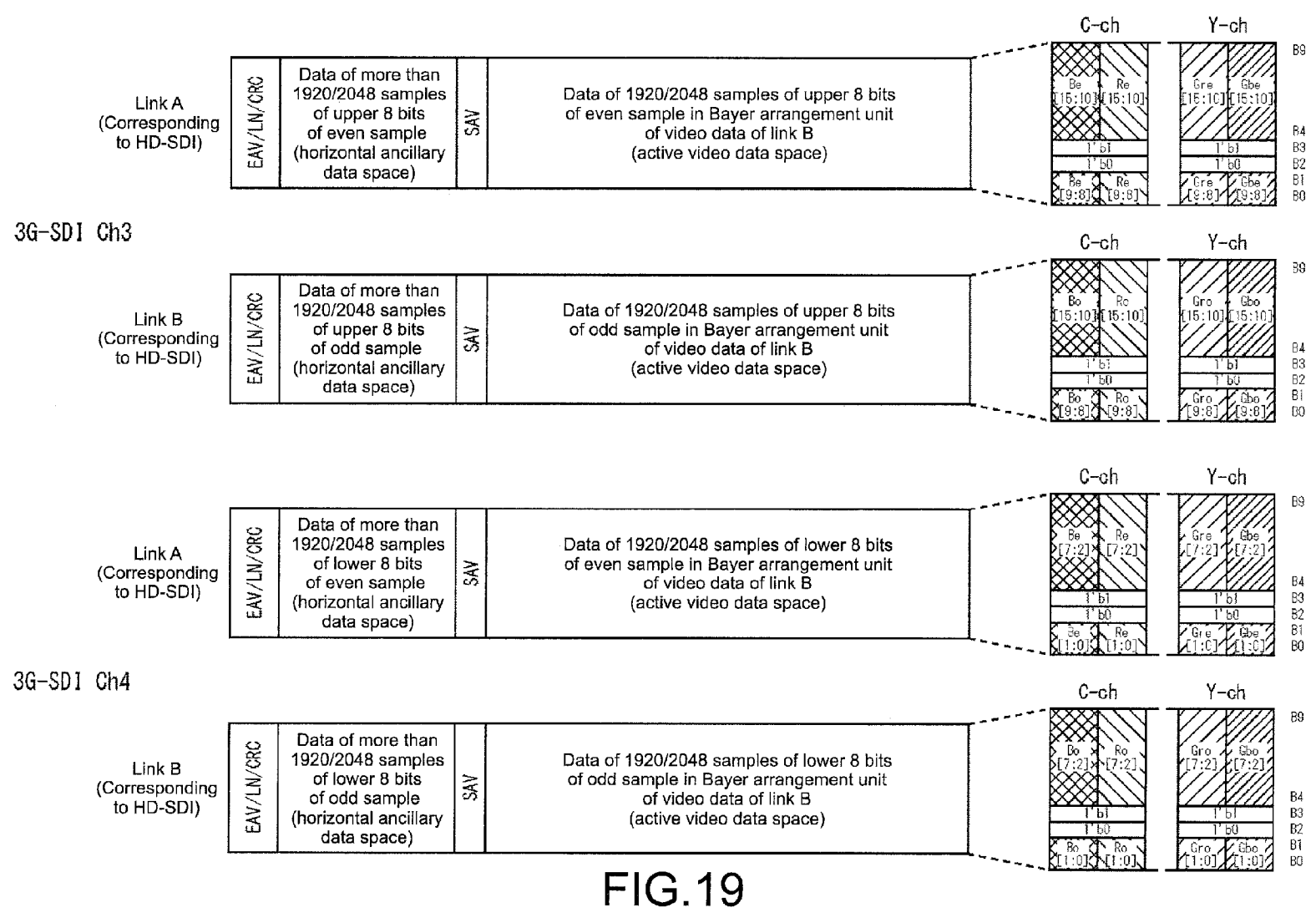

Then, in Steps S102 to S104, with respect to the video data of the link A and the link B, the same processes as Steps S1 to S3 shown in FIG. 6 are performed. As a result, from the video data of the link A, four data streams corresponding to HD-SDI of the link A and the link B of Ch1 and Ch2 shown in FIG. 18 are generated. Further, from the video data of the link B, four data streams corresponding to HD-SDI of the link A and the link B of Ch3 and Ch4 of 3G-SDI shown in FIG. 19 are generated.

The data stream of the link A of Ch1 is obtained by multiplexing upper 8 bits of the pixel data of the samples of Gr, Gb, B, and R included in the even samples of the Bayer arrangement unit of the video data of the link A shown in FIG. 17. In other words, the data stream is obtained by multiplexing upper 8 bits of the pixel data of the video data generated by extracting the even samples of the Bayer arrangement unit of the video data of the link A.

The data stream of the link B of Ch1 is obtained by multiplexing the upper 8 bits of the pixel data of the samples of Gr, Gb, B, and R included in the odd samples of the Bayer arrangement unit of the video data of the link A shown in FIG. 17. In other words, the data stream is obtained by multiplexing upper 8 bits of the pixel data of the video data generated by extracting the odd samples of the Bayer arrangement unit of the video data of the link A.

The data stream of the link A of Ch2 is obtained by multiplexing lower 8 bits of the pixel data of the samples of Gr, Gb, B, and R included in the even samples of the Bayer arrangement unit of the video data of the link A shown in FIG. 17. In other words, the data stream is obtained by multiplexing lower 8 bits of the pixel data of the video data generated by extracting the even samples of the Bayer arrangement unit of the video data of the link A.

The data stream of the link B of Ch2 is obtained by multiplexing the lower 8 bits of the pixel data of the samples of Gr, Gb, B, and R included in the odd samples of the Bayer arrangement unit of the video data of the link A shown in FIG. 17. In other words, the data stream is obtained by multiplexing lower 8 bits of the pixel data of the video data generated by extracting the odd samples of the Bayer arrangement unit of the video data of the link A.

The data stream of the link A of Ch3 is obtained by multiplexing upper 8 bits of the pixel data of the samples of Gr, Gb, B, and R included in the even samples of the Bayer arrangement unit of the video data of the link B shown in FIG. 17. In other words, the data stream is obtained by multiplexing upper 8 bits of the pixel data of the video data generated by extracting the even samples of the Bayer arrangement unit of the video data of the link B.

The data stream of the link B of Ch3 is obtained by multiplexing the upper 8 bits of the pixel data of the samples of Gr, Gb, B, and R included in the odd samples of the Bayer arrangement unit of the video data of the link B shown in FIG. 17. In other words, the data stream is obtained by multiplexing upper 8 bits of the pixel data of the video data generated by extracting the odd samples of the Bayer arrangement unit of the video data of the link B.

The data stream of the link A of Ch4 is obtained by multiplexing lower 8 bits of the pixel data of the samples of Gr, Gb, B, and R included in the even samples of the Bayer arrangement unit of the video data of the link B shown in FIG. 17. In other words, the data stream is obtained by multiplexing lower 8 bits of the pixel data of the video data generated by extracting the even samples of the Bayer arrangement unit of the video data of the link B.

The data stream of the link B of Ch4 is obtained by multiplexing the lower 8 bits of the pixel data of the samples of Gr, Gb, B, and R included in the odd samples of the Bayer arrangement unit of the video data of the link B shown in FIG. 17. In other words, the data stream is obtained by multiplexing lower 8 bits of the pixel data of the video data generated by extracting the odd samples of the Bayer arrangement unit of the video data of the link B.

It should be noted that the bits of the pixel data are multiplexed with respect to the data streams by the method described above with reference to FIG. 9.

In Step S105, the multiplexing units 214-1 to 214-4 generate the data stream of 3G-SDI. Specifically, the multiplexing unit 214-1 generates the data stream of Ch1 of 3G-SDI by performing byte-interleave and multiplexing the data stream of the link A and the link B of Ch1 of 3G-SDI shown in FIG. 18 on a word basis. The data stream is obtained by multiplexing upper 8 bits of the pixel data of the samples of Gr, Gb, B, and R of the video data of the link A shown in FIG. 17. The multiplexing unit 214-1 supplies the generated data stream of Ch1 of 3G-SDI to the scramble and P/S conversion unit 215-1.

The multiplexing unit 214-2 generates the data stream of Ch2 of 3G-SDI by performing byte-interleave and multiplexing the data stream of the link A and the link B of Ch2 of 3G-SDI shown in FIG. 18 on a word basis. The data stream is obtained by multiplexing lower 8 bits of the pixel data of the samples of Gr, Gb, B, and R of the video data of the link A shown in FIG. 17. The multiplexing unit 214-2 supplies the generated data stream of Ch2 of 3G-SDI to the scramble and P/S conversion unit 215-2.

The multiplexing unit 214-3 generates the data stream of Ch3 of 3G-SDI by performing byte-interleave and multiplexing the data stream of the link A and the link B of Ch3 of 3G-SDI shown in FIG. 19 on a word basis. The data stream is obtained by multiplexing upper 8 bits of the pixel data of the samples of Gr, Gb, B, and R of the video data of the link B shown in FIG. 17. The multiplexing unit 214-3 supplies the generated data stream of Ch3 of 3G-SDI to the scramble and P/S conversion unit 215-3.

The multiplexing unit 214-4 generates the data stream of Ch4 of 3G-SDI by performing byte-interleave and multiplexing the data stream of the link A and the link B of Ch4 of 3G-SDI shown in FIG. 19 on a word basis. The data stream is obtained by multiplexing lower 8 bits of the pixel data of the samples of Gr, Gb, B, and R of the video data of the link B shown in FIG. 17. The multiplexing unit 214-4 supplies the generated data stream of Ch4 of 3G-SDI to the scramble and P/S conversion unit 215-4.

In Step S106, the scramble and P/S conversion units 215-1 to 215-4 performs scramble and P/S conversion for the data stream of 3G-SDI. That is, the scramble and P/S conversion units 215-1 to 215-4 perform, in the same way as the process of Step S5 shown in FIG. 6, scramble and P/S conversion for the data streams of Ch1 to Ch4 of 3G-SDI. The scramble and P/S conversion units 215-1 to 215-4 supply the processed data streams of Ch1 to Ch4 of 3G-SDI to the transmission control unit 203.

In Step S107, the transmission control unit 203 transmits the data stream of 3G-SDI. That is, the transmission control unit 203 transmits the RAW data to the CCU 12*b* by transmitting the data streams of the serial series of 3G-SDI of the 4 channels of Ch1 to Ch4.

After that, the RAW data transmission process is terminated.

(RAW Data Reception Process)

Subsequently, with reference to a flowchart shown in FIG. 20, a description will be given on the RAW data reception process performed by the CCU 12*b* so as to correspond to the RAW data transmission process by the broadcast camera 11*b* shown in FIG. 16.

In Step S151, the reception control unit 251 receives the data stream of 3G-SDI. That is, the reception control unit 251 receives the data streams of Ch1 to Ch4 of 3G-SDI transmitted from the broadcast camera 11*b*. The reception control unit 251 supplies the data streams of Ch1 to Ch4 to the S/P conversion and descramble units 261-1 to 261-4, respectively.

In Step S152, the S/P conversion and descramble units 261-1 to 261-4 perform S/P conversion and descramble for the data stream of 3G-SDI. Specifically, the S/P conversion and descramble units 261-1 to 261-4 perform S/P conversion and descramble for the data streams of Ch1 to Ch4 shown in FIG. 11 by the same process as Step S51. Then, the S/P conversion and descramble units 261-1 to 261-4 supply the processed data streams of Ch1 to Ch4 to the separation units 262-1 to 262-4.

In Step S153, the separation units 262-1 to 262-4 separate the data stream of 3G-SDI. Specifically, the separation unit 262-1 performs word synchronization detection for the data stream of Ch1, separates the data stream of Ch1 into the link A and the link B of FIG. 18, and supplies those to the reproduction unit 263. Similarly, the separation units 262-2 to 262-4 respectively separate the data streams of Ch2 to Ch4 into the link A and the link B of FIG. 18 or FIG. 19 and supply those to the reproduction unit 263.

In Step S154, the reproduction unit 263 reproduces the RAW data. Specifically, the reproduction unit 263 extracts, from the data streams of the link A and the link B of Ch1 and Ch3, upper 8 bits of the pixel data of the samples of Gr, Gb, B, and R of the RAW data. Further, reproduction unit 263 extracts, from the data streams of the link A and the link B of Ch2 and Ch4, lower 8 bits of the pixel data of the samples of Gr, Gb, B, and R of the RAW data.

Then, the reproduction unit 263 restores, from the extracted upper 8 bits and lower 8 bits of the pixel data, the original pixel data, and performs rearrangement in accordance with the Bayer arrangement, thereby restoring the original RAW data of the two frames. Then, the reproduction unit 263 supplies the restored RAW data to the video processing unit 153.

It should be noted that, at this time, the data may be converted into video data with a format different from the RAW data and may be supplied to the video processing unit 153.

After that, the RAW data reception process is terminated.

In this way, in accordance with the requirements of level B of 3G-SDI, for example, by using the existing IC or apparatus for 3G-SDI, 4K RAW data with the Bayer arrangement of 47.95P-60P can be transmitted. Further, with respect to the data streams of Ch1 and Ch3, upper 8 bits of the pixel data of the RAW data are multiplexed. Therefore, for example, by using the observation apparatus for 3G-SDI, it is possible to visually confirm the video of the RAW data by the data stream of Ch1 or Ch3. Further, by using the CRCC added to the data streams, it is possible to monitor an error of the transmission system by the observation apparatus for 3G-SDI.

6. Modified Example of Second Embodiment

Hereinafter, a modified example of the second embodiment will be described.

(Modified Example of RAW Data Multiplexing Method)

As in the first embodiment, as a method of multiplexing the pixel data of the samples of the RAW data with respect to the channels of 3G-SDI, it is possible to apply a method shown in FIG. 7, FIG. 12, or FIG. 13.

(Case where Transmission is Performed by Using HD-SDI)

In the above description, the example in which the RAW data is transmitted by using 3G-SDI is given. It is also possible to transmit the data by using HD-SDI. Specifically, the data streams of the link A and the link B of Ch1 to Ch4 of 3G-SDI shown in FIG. 18 and FIG. 19 have the same data structure as that of the data stream of HD-SDI. Therefore, by individually performing scramble and P/S conversion with respect to the data streams and transmitting the data streams, it is possible to transmit the 4K RAW data of 47.95P-60P by the data streams of HD-SDI of 8 channels.

In this case, as in the case of using 3G-SDI, for example, by using the existing IC or apparatus for HD-SDI, it is possible to transmit the 4K RAW data with the Bayer arrangement of 47.95P-60P. Further, by using the observation apparatus for HD-SDI, it is possible to visually confirm the video of the RAW data by the data streams with which upper 8 bits of the pixel data of RAW data are multiplexed. Further, by using the CRCC added to the data streams, it is possible to monitor an error of a transmission system by the observation apparatus for HD-SDI.

(Transmission Method in Case where Pixel Data of RAW Data is Equal to or Less than 8 Bits)

In the case where the pixel data of the RAW data is equal to or less than 8 bits, it becomes unnecessary to transmit the fifth to eight data columns shown in FIG. 7, FIG. 12, and FIG. 13. Therefore, it is possible to transmit the RAW data with the data streams of 3G-SDI of 2 channels or with the data streams of HD-SDI of 4 channels.

7. Third Embodiment

Subsequently, with reference to FIG. 21 to FIG. 31, a third embodiment of the present technology will be described. According to the third embodiment of the present technology, it is possible to transmit the RAW data with the Bayer arrangement by using 10.692 Gbps serial digital interface (hereinafter, also referred to as 10G-SDI).

(Circuit Structure Example of Broadcast Camera 11c)

Figure 21:
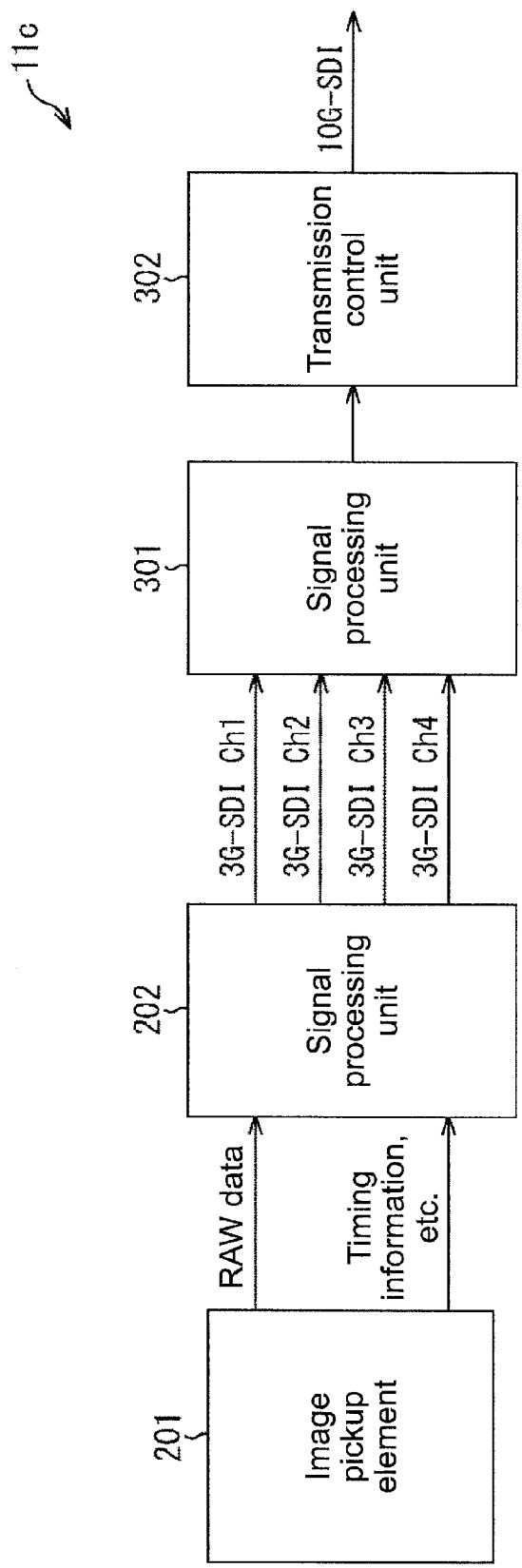
FIG. 21 is a block diagram showing a structure example of a function of a broadcast camera according to a third embodiment of the present technology.

FIG. 21 is a block diagram showing a structure example of a function of a part of a broadcast camera 11c according to a third embodiment. It should be noted that in the figure, parts corresponding to those in FIG. 14 are denoted by the same symbols, and a description on parts of the same process will be omitted as appropriated to avoid a repetition.

The broadcast camera 11c includes an image pickup element 201, a signal processing unit 202, a signal processing unit 301, and a transmission control unit 302.

The signal processing unit 301 generates the data stream of 10G-SDI from the data streams of Ch1 to Ch4 of 3G-SDI supplied from the signal processing unit 202, and supplies the generated data stream of 10G-SDI to the transmission control unit 302.

The transmission control unit 302 controls transmission of the data stream of 10G-SDI to the CCU 12c.

(Structure Example of Signal Processing Unit 301)

Figure 22:
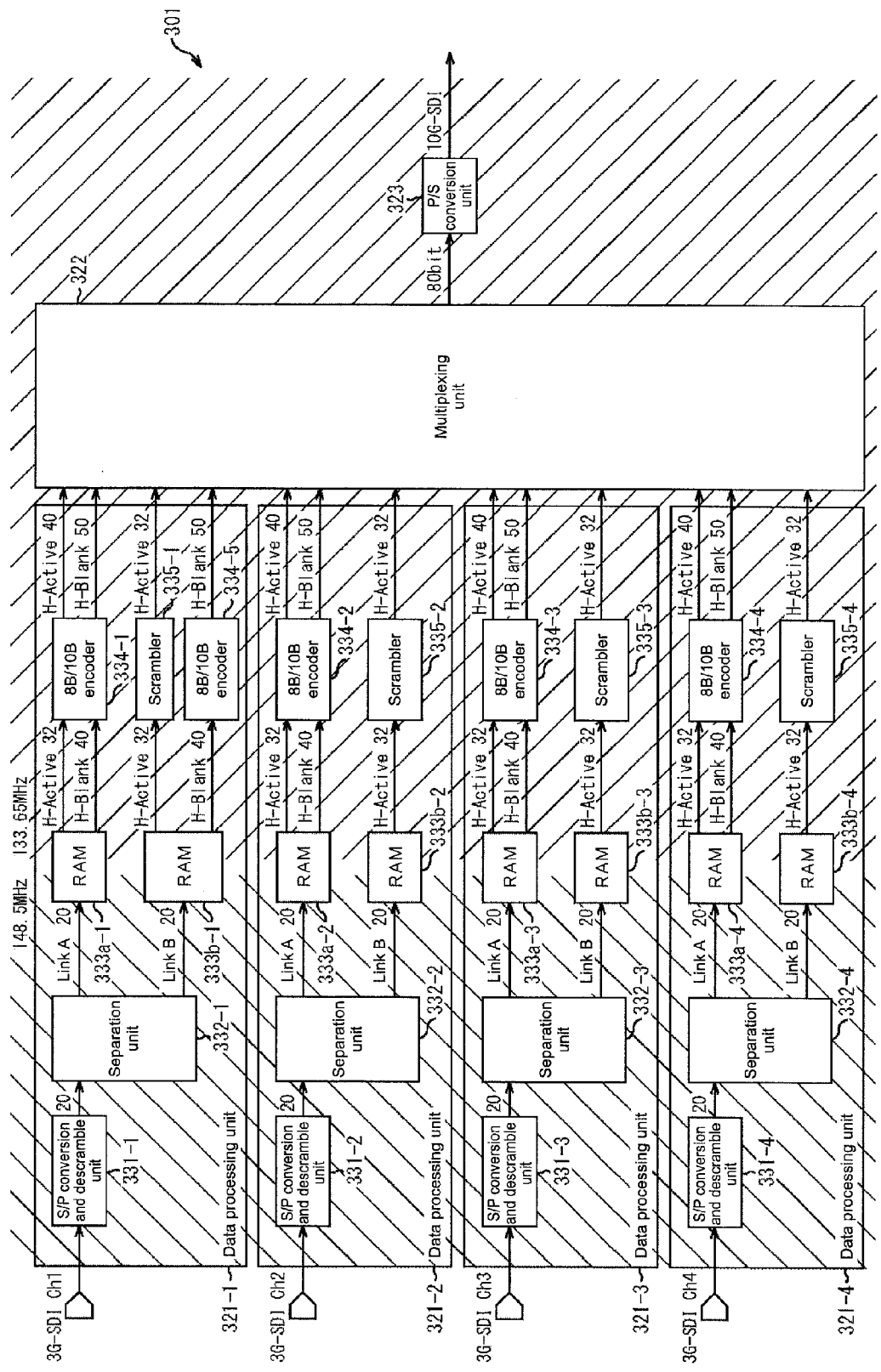
FIG. 22 is a block diagram showing a detailed structure example of functions of a signal processing unit of the broadcast camera.

FIG. 22 is a block diagram showing a structure example of the signal processing unit 301. The signal processing unit 301 includes data processing units 321-1 to 321-4, a multiplexing unit 322, and a P/S conversion unit 323. Further, a data processing unit 321-i (i=1, 2, 3, and 4) includes a S/P conversion and descramble unit 331-i, a separation unit 332-i, RAMs 333a-i and 333b-i, an 8B/10B encoder 334-i, and a scrambler 335-i. Further, the data processing unit 321-1 includes an 8B/10B encoder 334-5.

The S/P conversion and descramble units 331-1 to 331-4 respectively perform S/P conversion and descramble with respect to the data streams of Ch1 to Ch4 of 3G-SDI supplied from the signal processing unit 202. Then, the S/P conversion and descramble units 331-1 to 331-4 respectively supply the processed data streams of Ch1 to Ch4 of 3G-SDI to the separation units 332-1 to 332-4.

The separation units 332-1 to 332-4 respectively separate the data streams of Ch1 to Ch4 into the data streams of 2 channels of the link A and the link B shown in FIG. 18 or FIG. 19. Then, the separation units 332-1 to 332-4 respectively cause the data streams of the link A of Ch1 to Ch4 of 3G-SDI to be stored in the RAMs 333a-1 to 333a-4. Further, the separation units 332-1 to 332-4 respectively cause the data streams of the link B of Ch1 to Ch4 of 3G-SDI to be stored in the RAMs 333b-1 to 333b-4.

As will be described later, the 8B/10B encoders 334-1 to 334-4 respectively perform 8B/10B (8 bits/10 bits) conversion with respect to the data streams of the link A of Ch1 to Ch4 of 3G-SDI stored in the RAMs 333a-1 to 333a-4 for each predetermined unit. Then, the 8B/10B encoders 334-1 to 334-4 respectively supply data blocked obtained as a result of the process to the multiplexing unit 322.

As will be described later, the 8B/10B encoder 334-5 performs 8B/10B conversion with respect to a part of the data stream of the link B of Ch1 of 3G-SDI stored in the RAM 333b-1 for each predetermined unit and supplies data blocks obtained as a result of the process to the multiplexing unit 322.

As will be described later, the scramblers 335-1 to 335-4 respectively perform scramble with respect to a part of the data stream of the link B of Ch1 to Ch4 of 3G-SDI stored in the RAMs 333b-1 to 333b-4 for each predetermined unit. Then, the scramblers 335-1 to 335-4 respectively supply data blocks obtained as a result of the process to the multiplexing unit 322.

As will be described later, the multiplexing unit 322 multiplexing the data blocks supplied from the 8B/10B encoders 334-1 to 334-5 and the scramblers 335-1 to 335-4, thereby generating the data streams of 10G-SDI. The multiplexing unit 322 supplies the generated data stream of 10G-SDI to the P/S conversion unit 323.

The P/S conversion unit 323 performs P/S conversion with respect to the data stream of 10G-SDI and supplies the data stream to the transmission control unit 302.

It should be noted that a former part from the RAMs 333a-1 to 333a-4 and the RAMs 333b-1 to 333b-4 of the signal processing unit 301 operates in synchronization with a clock signal of 148.5 MHz. On the other hand, a latter part from the RAMs 333a-1 to 333a-4 and the RAMs 333b-1 to 333b-4 of the signal processing unit 301 operates in synchronization with a clock signal of 133.65 MHz.

Further, hereinafter, in the case where it is unnecessary to identify the data processing units 321-1 to 321-4 individually, the units are simply referred to as data processing unit 321. Further, hereinafter, in the case where it is unnecessary to individually identify the S/P conversion and descramble units 331-1 to 331-4, the separation units 332-1 to 332-2, the RAMs 333a-1 to 333a-4, the RAMs 333b-1 to 333b-4, the 8B/10B encoders 334-1 to 334-5, and the scramblers 335-1 to 335-4, respectively, those are simply referred to as S/P conversion and descramble unit 331, separation unit 332, RAM 333a, RAM 333b, 8B/10B encoder 334, and scrambler 335, respectively.

(Circuit Structure Example of CCU 12c)

Figure 23:
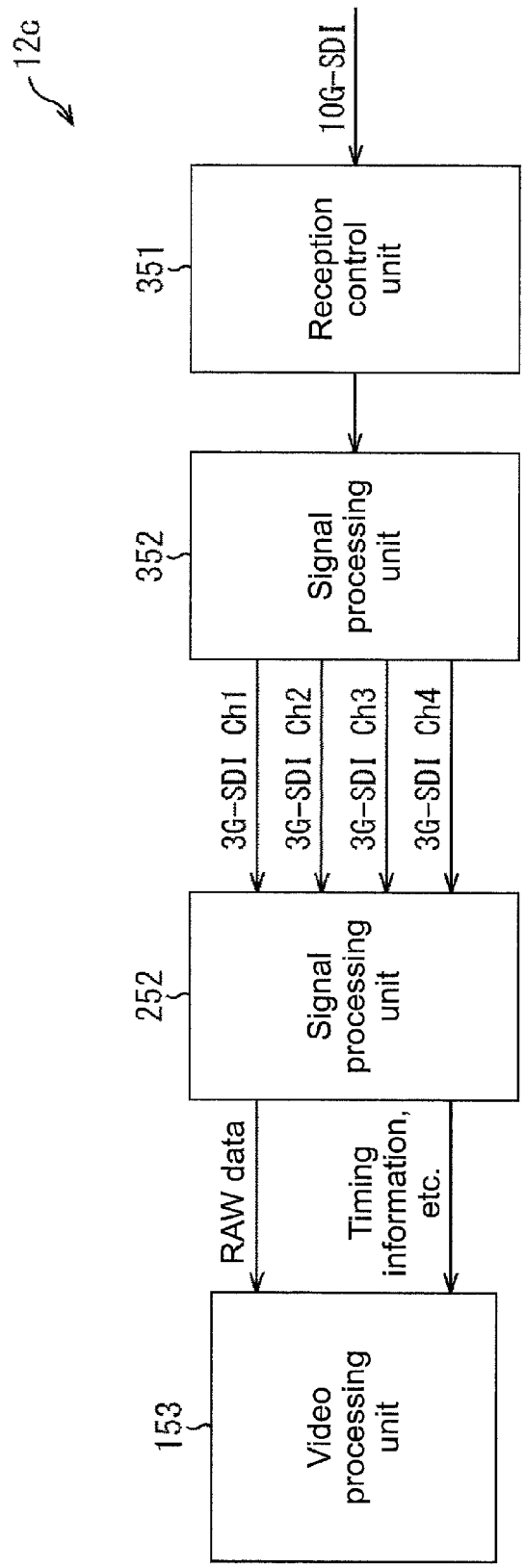
FIG. 23 is a block diagram showing a structure example of a function of a CCU according to the third embodiment of the present technology.

FIG. 23 is a block diagram showing a structure example of a function of a part of the CCU 12c according to the third embodiment. It should be noted that in the figure, parts corresponding to those of FIG. 15 are denoted by the same symbols, and a description on parts of the same process will be omitted as appropriated to avoid a repetition.

The CCU 12c includes a reception control unit 351, a signal processing unit 352, a signal processing unit 252, and a video processing unit 153.

The reception control unit 351 controls reception of the data stream of 10G-SDI from each broadcast camera 11c. The reception control unit 351 supplies the received data stream of 10G-SDI to the signal processing unit 352.

The signal processing unit 352 separates the data stream of 10G-SDI to the data streams of Ch1 to Ch4 of 3G-SDI and supplies these to the signal processing unit 252.

(Structure Example of Signal Processing Unit 352)

Figure 24:
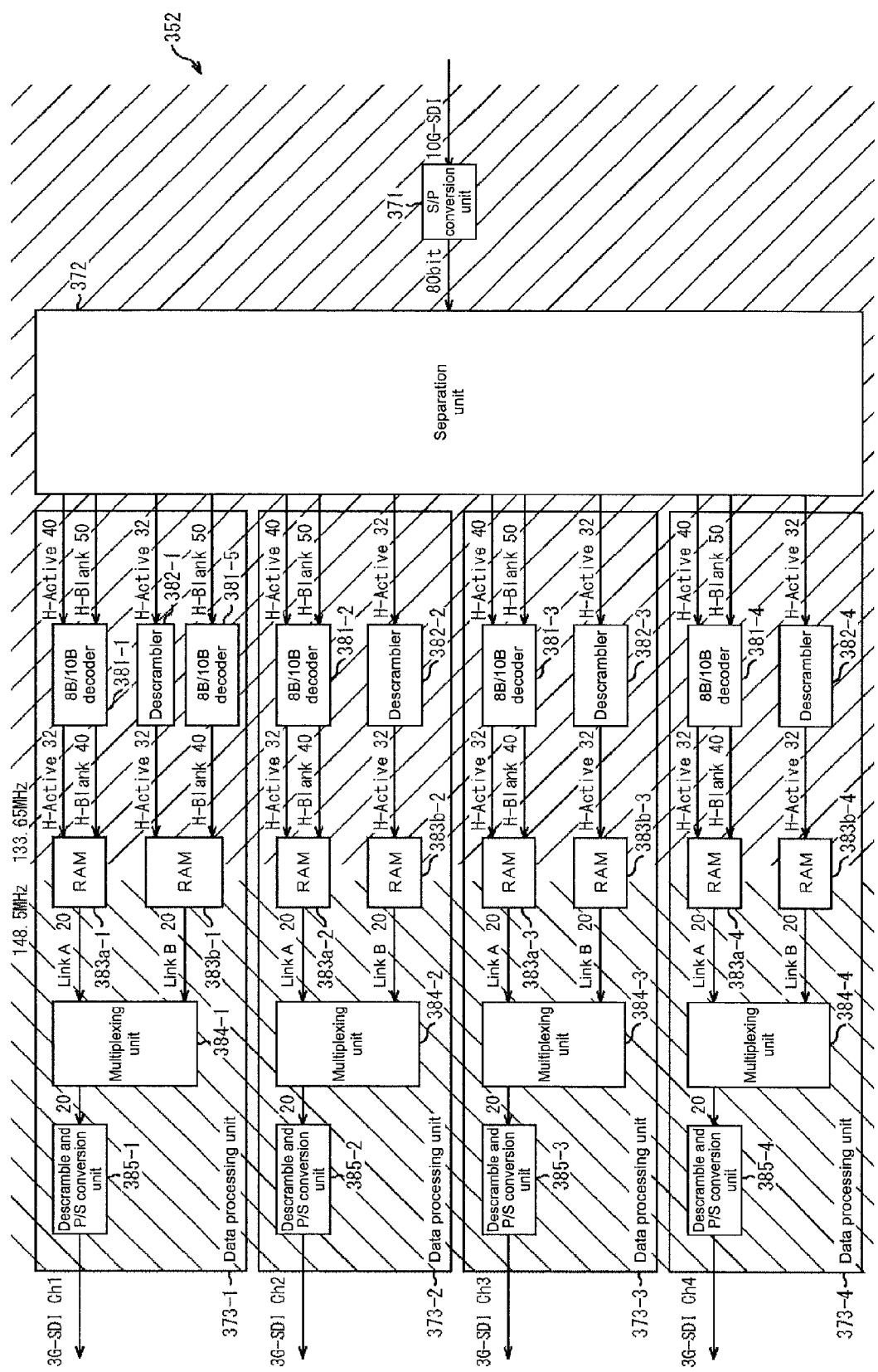
FIG. 24 is a block diagram showing a detailed structure example of functions of a signal processing unit of the CCU.

FIG. 24 is a block diagram showing a structure example of the signal processing unit 352. The signal processing unit 352 includes a S/P conversion unit 371, a separation unit 372, and data processing units 373-1 to 373-4. Further, the data processing unit 373-i (i=1, 2, 3, and 4) includes an 8B/10B decoder 381-i, a descrambler 382-i, RAMs 383a-i and 383b-i, a multiplexing unit 384-i, and a scramble and P/S conversion unit 385-i. Further, the data processing unit 373-1 includes an 8B/10B decoder 381-5.

The S/P conversion unit 371 performs S/P conversion for the data stream of 10G-SDI and supplies the data stream to the separation unit 372.

The separation unit 372 performs an opposite process to the process by the multiplexing unit 322 of the signal processing unit 301 shown in FIG. 22, thereby separating the data stream of 10G-SDI into predetermined data blocks. Then, the separation unit 372 supplies the separated data blocks to the 8B/10B decoders 381-1 to 381-5 and the descramblers 382-1 to 382-4.

As will be described later, the 8B/10B decoders 381-1 to 381-4 respectively perform 10 bits/8 bits (10B/8B) conversion with respect to the data blocks supplied from the separation unit 372 and cause the data blocks to be stored in the RAMs 383a-1 to 383a-4.

As will be described later, the 8B/10B decoder 381-5 performs 10B/8B conversion with respect to the data blocks supplied from the separation unit 372 and causes the data blocks to be stored in the RAM 383b-1.

As will be described later, the descramblers 382-1 to 382-4 respectively perform descramble with respect to the data blocks supplied from the separation unit 372 and cause the data blocks to be stored in the RAMs 383b-1 to 383b-4.

As will be described later, the multiplexing unit 384-1 to 384-4 respectively use the data blocks stored in the RAMs 383a-1 to 383a-4 and the RAMs 383b-1 to 383b-4, thereby generating the data streams of Ch1 to Ch4 of 3G-SDI. Then, the multiplexing unit 384-1 to 384-4 respectively supply the generated data streams of Ch1 to Ch4 of 3G-SDI to the scramble and P/S conversion units 385-1 to 385-4.

The scramble and P/S conversion units 385-1 to 385-4 respectively perform scramble and P/S conversion with respect to the data streams of Ch1 to Ch4 of 3G-SDI. Then, the scramble and P/S conversion units 385-1 to 385-4 respectively supply the processed data streams of Ch1 to Ch4 of 3G-SDI to the signal processing unit 252.

It should be noted that a former part from the RAMs 383a-1 to 383a-4 and the RAMs 383b-1 to 383b-4 of the signal processing unit 352 operates in synchronization with a clock signal of 133.65 MHz. On the other hand, a latter part from the RAMs 383a-1 to 383a-4 and the RAMs 383b-1 to 383b-4 of the signal processing unit 352 operates in synchronization with a clock signal of 148.5 MHz.

Further, hereinafter, in the case where it is unnecessary to identify the data processing units 373-1 to 373-4 individually, the units are simply referred to as data processing unit 373. Further, hereinafter, in the case where it is unnecessary to identify the 8B/10B decoders 381-1 to 381-5, the descramblers 382-1 to 382-4, the RAMs 383a-1 to 383a-4, the RAMs 383b-1 to 383b-4, the multiplexing unit 384-1 to 384-4, and the scramble and P/S conversion units 385-1 to 385-4, those are simply referred to as 8B/10B decoder 381, descrambler 382, RAM 383a, RAM 383b, multiplexing unit 384, and scramble and P/S conversion unit 385, respectively.

(RAW Data Transmission Process)

Figure 25:
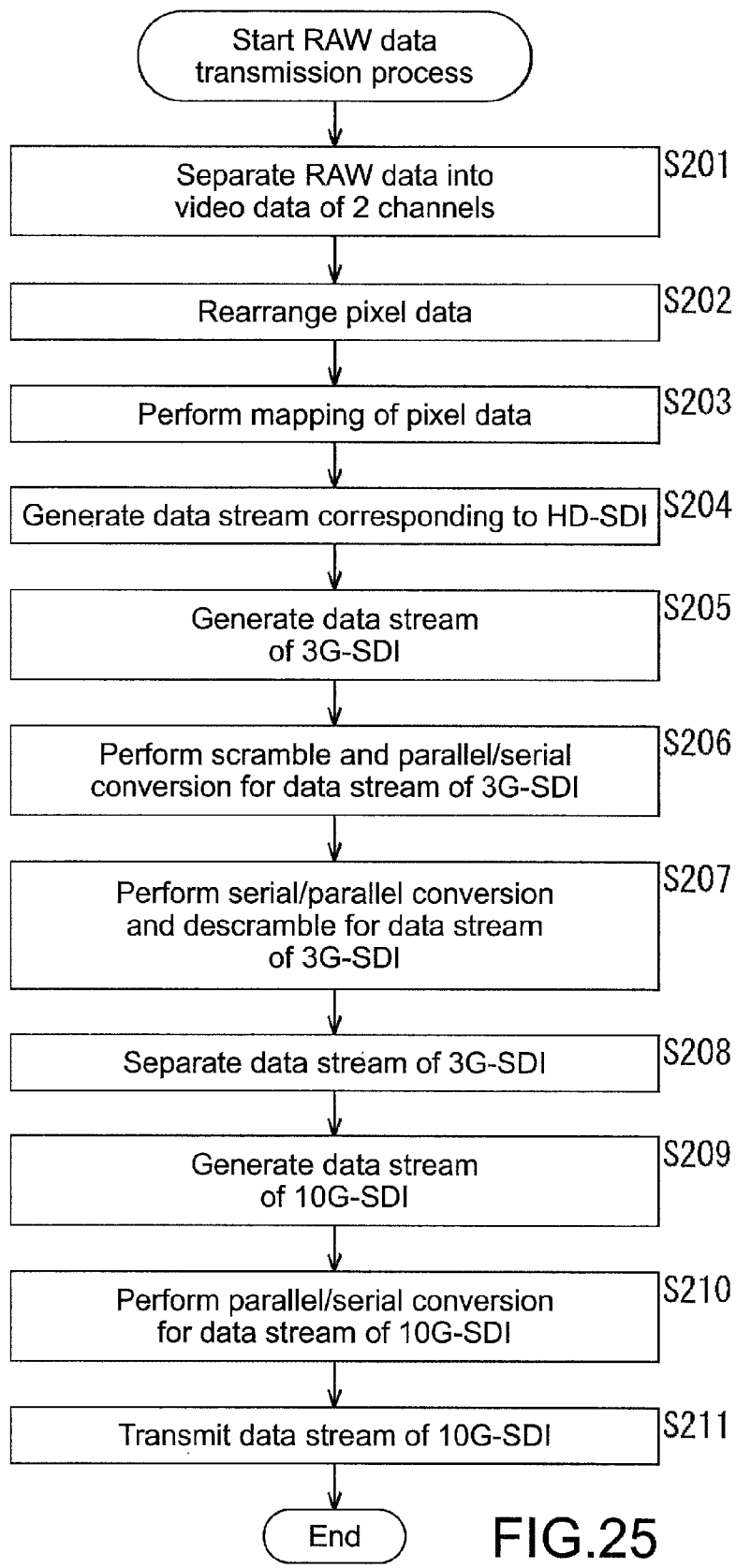
FIG. 25 is a flowchart for explaining the third embodiment of the RAW data transmission process.

Subsequently, with reference to a flowchart shown in FIG. 25, the RAW data transmission process by the broadcast camera 11c will be described. It should be noted that the process indicates a process in the case where the RAW data of two frames is transmitted. When the RAW data of three frames or more is transmitted, the process is repeatedly performed.

Figure 16:
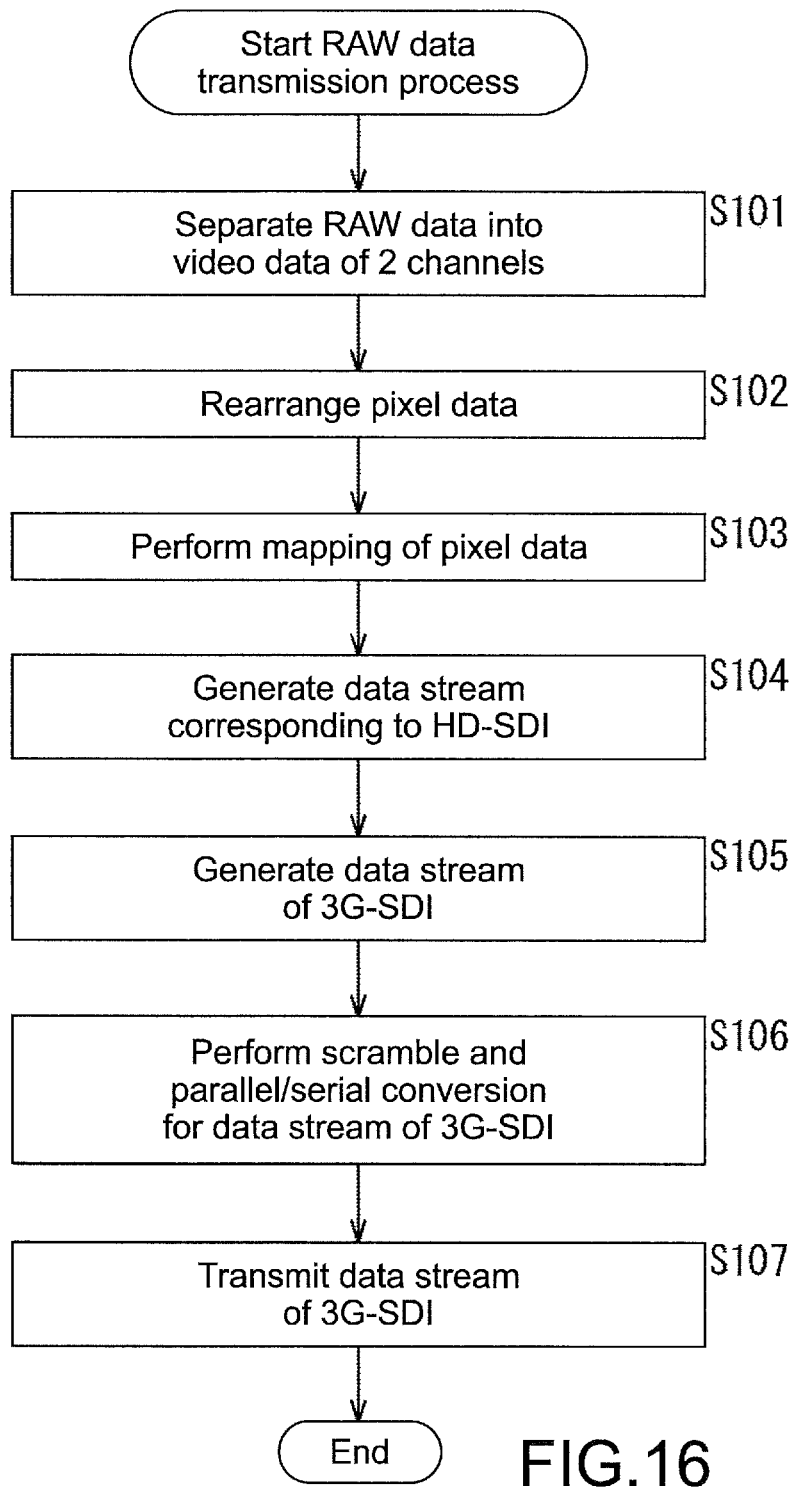
FIG. 16 is a flowchart for explaining the second embodiment of an RAW data transmission process.

In Steps S201 to S206, the same process as in Steps S101 to S106 of FIG. 16 is performed. As a result, the RAW data is multiplexed with respect to the data streams of Ch1 to Ch4 of 3G-SDI, and the data streams of the channels are supplied to the S/P conversion and descramble units 331-1 to 331-4 of the signal processing unit 301.

Figure 20:
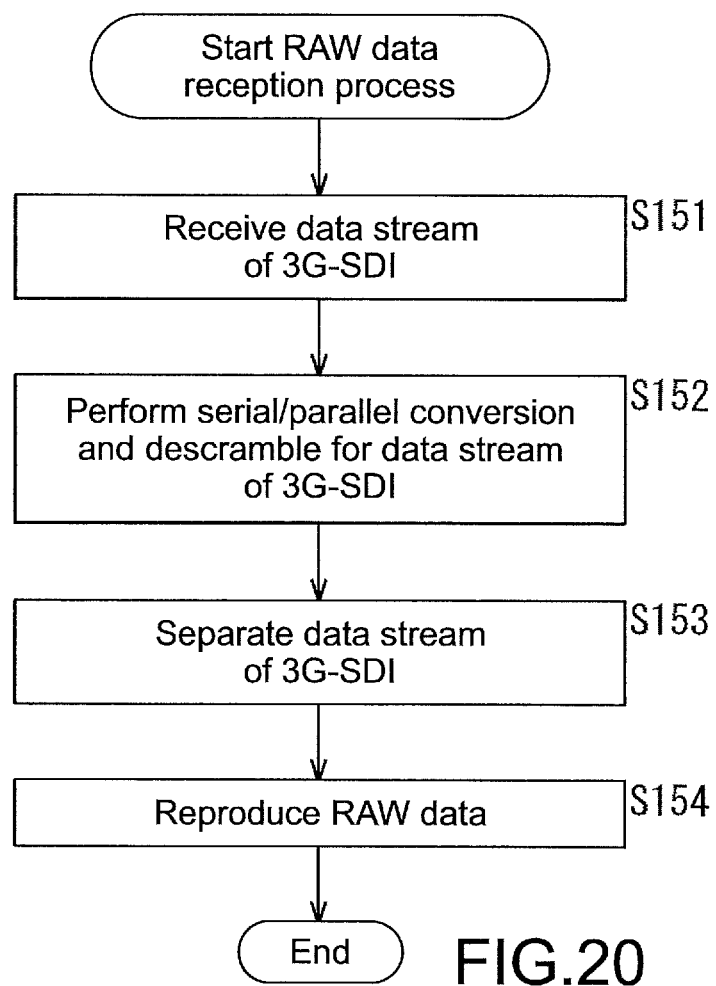
FIG. 20 is a flowchart for explaining the second embodiment of the RAW data reception process.

In Step S207, the S/P conversion and descramble units 331-1 to 331-4 respectively perform S/P conversion and descramble with respect to the data streams of Ch1 to Ch4 of 3G-SDI by the same process as Step S152 of FIG. 20. The S/P conversion and descramble units 331-1 to 331-4 supply the processed data streams of Ch1 to Ch4 to the separation units 332-1 to 332-4, respectively.

In Step S208, by the same process as Step S153 of FIG. 20, the separation units 332-1 to 332-4 separate the data streams of Ch1 to Ch4 of 3G-SDI into the data streams of the link A and the link B shown in FIG. 18 and FIG. 19. Then, the data streams of the link A of Ch1 to Ch4 are stored in the RAM 333a-1, the data streams of the link B of Ch1 to Ch4 are stored in the RAM 333b-1.

It should be noted that, hereinafter, the data stream of the link A of Ch1 of 3G-SDI is also referred to as data stream of Ch1 (of HD-SDI), and the data stream of the link B of Ch1 of 3G-SDI is also referred to as data stream of Ch2 (of HD-SDI). Further, hereinafter, the data stream of the link A of Ch2 of 3G-SDI is also referred to as data stream of Ch3 (of HD-SDI), and the data stream of the link B of Ch2 of 3G-SDI is also referred to as data stream of Ch4 (of HD-SDI). Further, hereinafter, the data stream of the link A of Ch3 of 3G-SDI is also referred to as data stream of Ch5 (of HD-SDI), and the data stream of the link B of Ch3 of 3G-SDI is also referred to as data stream of Ch6 (of HD-SDI). Further, hereinafter, the data stream of the link A of Ch4 of 3G-SDI is also referred to as data stream of Ch7 (of HD-SDI), and the data stream of the link B of Ch4 of 3G-SDI is also referred to as data stream of Ch8 (of HD-SDI).

In Step S209, the signal processing unit 301 generates the data stream of 10G-SDI. First, the 8B/10B encoder 334-1 extracts data, on an 8-bit basis, from an area from a first word of SAV of the data stream of Ch1 stored in the RAM 333a-1 to a last word of EAV/LN/CRC.

Specifically, from an active video data space (H-Active) of the data stream of Ch1, data of 8 bits in total (upper 6 bits (B9-B4) and lower 2 bits (B1-B0)), with respect to which upper 8 bits of the pixel data of the RAW data are multiplexed, are multiplexed. Further, for 3FFh, 000h, 000h, and XYZ of SAV and EAV, lower 2 bits have a reserve=0 or 1, so upper 8 bits are extracted out of data of 10 bits.

Figure 26:
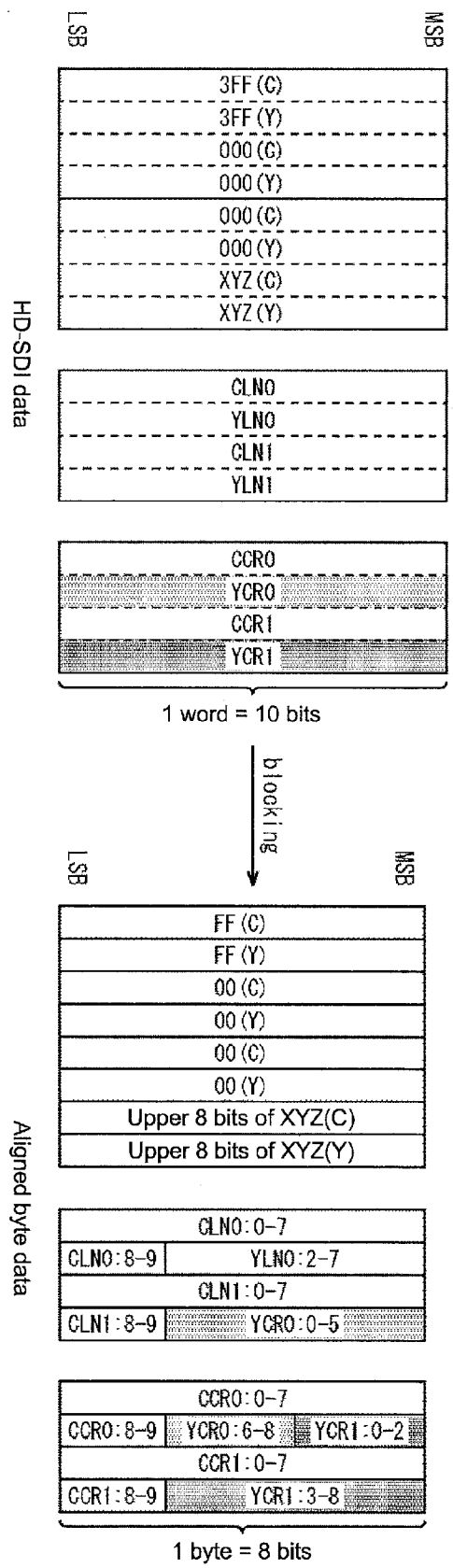
FIG. 26 is a diagram for explaining a method of extracting and arranging data of LN and CRC.

For LN and CRC after EAV, data extraction and arrangement are performed as shown in FIG. 26 in the following procedure. Data of 1 word (10 bits) unit is converted to data of 1 byte (8 bits) unit. It should be noted that CLN represents LN of C channel, and YLN represents LN of Y channel, and CCR represents CRC of C channel, and YCR represents CRC of Y channel.

CLN0: 0-7 (representing 0th bit to 7th bit, the bits are represented in the same way hereinafter), which is lower 8 bits of CLN0

CLN0: 8-9, YLN0: 2-7

CLN1: 0-7

CLN0: 8-9, YCR0: 0-5

CCR: 0-7

CCR: 8-9, YCR0: 6-8, YCR1: 0-2

CCR1: 0-7

CCR1: 8-9, YCR1: 3-8

It should be noted that CLN and YLN are the same data, and YLN is deleted and is not multiplexed basically. Therefore, YLN0: 2-7 is found from CLN0: 2-7, so instead of YLN0: 2-7, data like all 1's may be buried. Further a ninth bit of CRC is an inverted bit of an eighth bit and is thus deleted and not multiplexed. Further, to CCR and YCR, data calculated after the RAW data is multiplexed with respect to the data stream is set.

Figure 27:
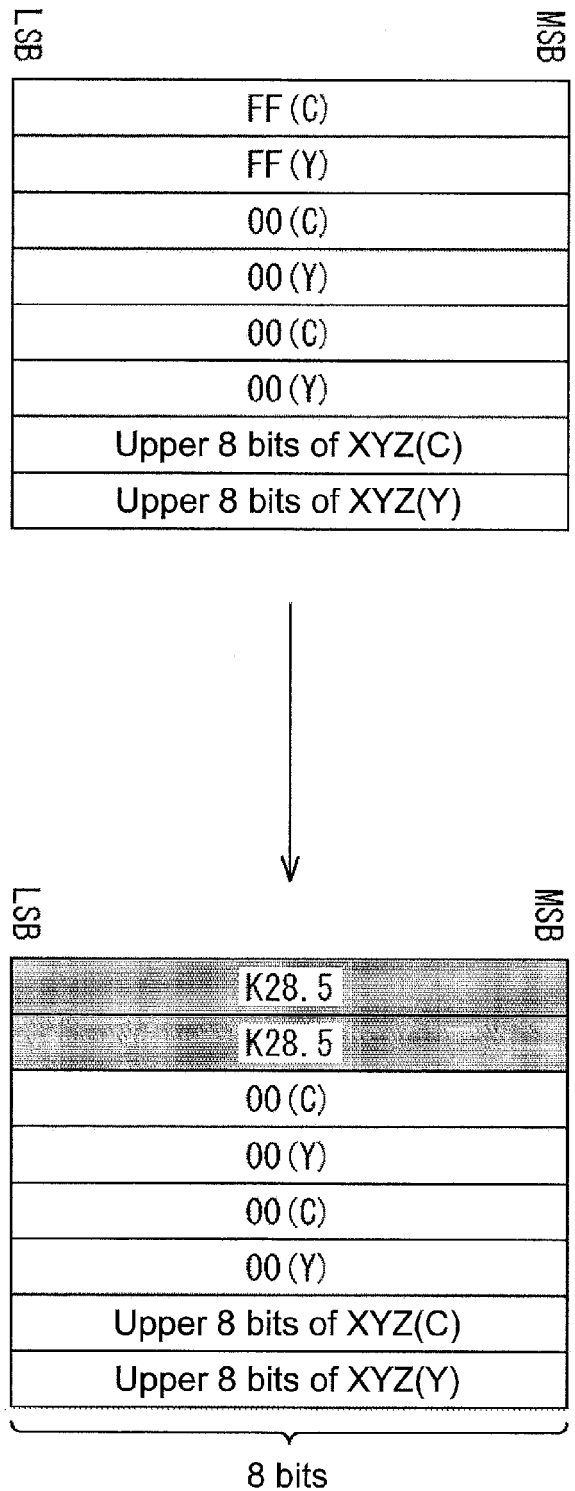
FIG. 27 is a diagram for explaining displacement of SAV data.
Figure 28:
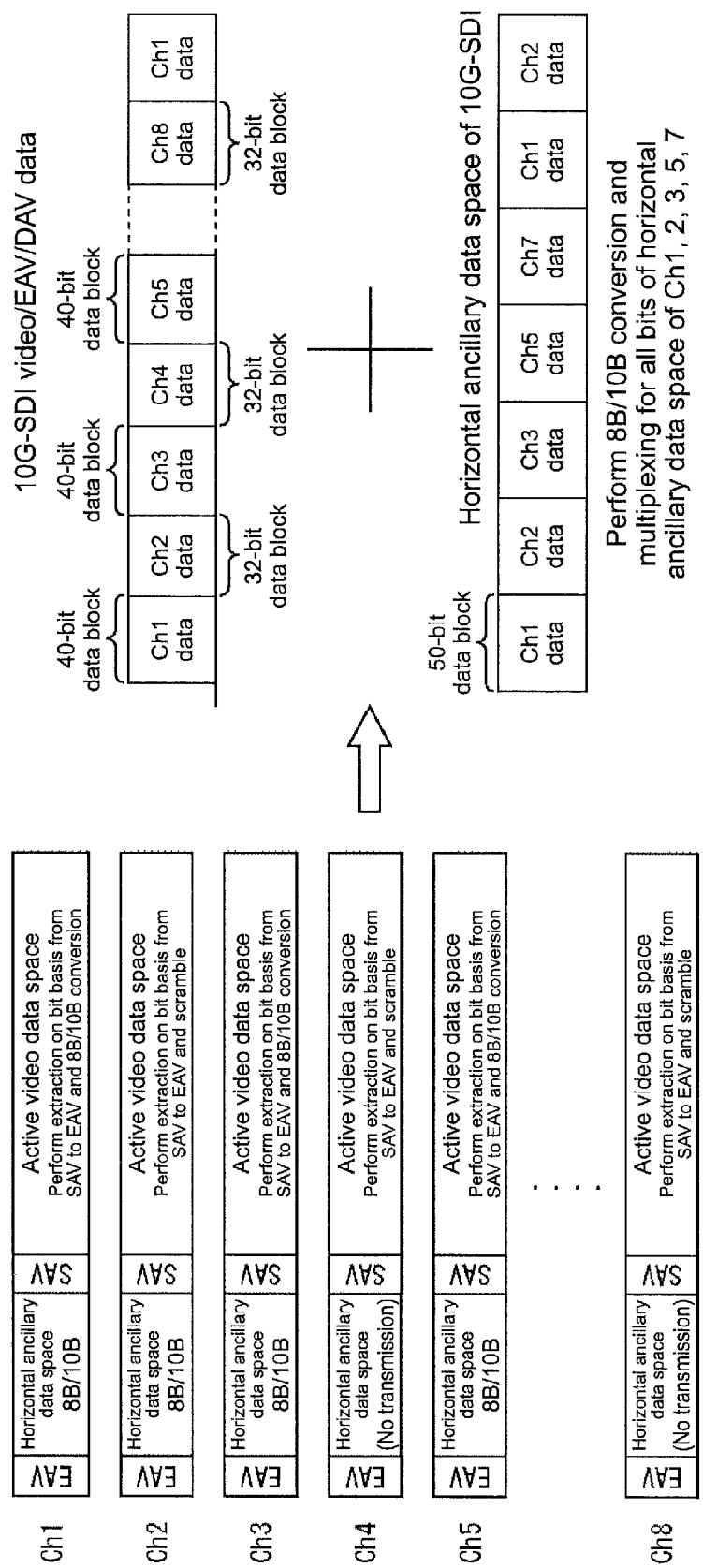
FIG. 28 is a diagram for explaining a generation method for a data stream of 10G-SDI.

Further, as shown in FIG. 27, the 8B/10B encoder 334-1 replaces the first 2 bytes (16 bits) of SAV with K28.5 of 2 bytes. The replaced part is used as a word synchronization signal of an 8 bytes/10 bytes conversion code. It should be noted that the replacement is performed only for the data stream of Ch1.

Then, the 8B/10B encoder 334-1 performs 8B/10B conversion for a data column on an 8-bit basis extracted from the area from SAV of data stream of Ch1 to EAV/LN/CRC (hereinafter, referred to as SAV-EAV area) on a 32-bit (8 bits×4 samples) basis sequentially, generates data blocks of 40 bits, and supplies the data blocks to the multiplexing unit 322.

Further, the 8B/10B encoder 334-1 extracts data on 40-bit (10 bits×4 samples) basis from the horizontal ancillary data space of the data stream of Ch1, generates data blocks of 50 bits by 8B/10B conversion, and supplies the data blocks to the multiplexing unit 322.

In the same way, the 8B/10B encoder 334-2 performs 8B/10B conversion for the data column on 8-bit basis extracted from the SAV-EAV area of the data stream of Ch3 on a 32-bit (8 bits×4 samples) basis sequentially, generates data blocks of 40 bits, and supplies the data blocks to the multiplexing unit 322. Further, the 8B/10B encoder 334-2 extracts, from the horizontal ancillary data space of the data stream of Ch3, data on 40-bit (10 bits×4 samples) basis, generates the data blocks of 50 bits by 8B/10B conversion, and supplies the data blocks to the multiplexing unit 322.

The 8B/10B encoder 334-3 performs 8B/10B conversion for the data column on 8-bit basis extracted from the SAV-EAV area of the data stream of Ch5 on a 32-bit (8 bits×4 samples) basis sequentially, generates data blocks of 40 bits, and supplies the data blocks to the multiplexing unit 322. Further, the 8B/10B encoder 334-3 extracts, from the horizontal ancillary data space of the data stream of Ch5, data on 40-bit (10 bits×4 samples) basis, generates the data blocks of 50 bits by 8B/10B conversion, and supplies the data blocks to the multiplexing unit 322.

The 8B/10B encoder 334-4 performs 8B/10B conversion for the data column on 8-bit basis extracted from the SAV-EAV area of the data stream of Ch7 on a 32-bit (8 bits×4 samples) basis sequentially, generates data blocks of 40 bits, and supplies the data blocks to the multiplexing unit 322. Further, the 8B/10B encoder 334-4 extracts, from the horizontal ancillary data space of the data stream of Ch7, data on 40-bit (10 bits×4 samples) basis, generates the data blocks of 50 bits by 8B/10B conversion, and supplies the data blocks to the multiplexing unit 322.

Further, like the 8B/10B encoder 334-1, the scrambler 335-1 extracts data on the 8-bit basis from the SAV-EAV area of the data stream of Ch2. Then, the scrambler 335-1 performs scramble for the extracted data on the 32-bit basis sequentially, generates data blocks of 32 bits, and supplies the data blocks to the multiplexing unit 322.

In the same way, the scrambler 335-2 extracts data on the 8-bit basis from the SAV-EAV area of the data stream of Ch4. Then, the scrambler 335-2 performs scramble for the extracted data on the 32-bit basis sequentially, generates data blocks of 32 bits, and supplies the data blocks to the multiplexing unit 322.

The scrambler 335-3 extracts data on the 8-bit basis from the SAV-EAV area of the data stream of Ch6. Then, the scrambler 335-3 performs scramble for the extracted data on the 32-bit basis sequentially, generates data blocks of 32 bits, and supplies the data blocks to the multiplexing unit 322.

The scrambler 335-4 extracts data on the 8-bit basis from the SAV-EAV area of the data stream of Ch8. Then, the scrambler 335-4 performs scramble for the extracted data on the 32-bit basis sequentially, generates data blocks of 32 bits, and supplies the data blocks to the multiplexing unit 322.

Further, the 8B/10B encoder 334-5 extracts data on 40-bit (10 bits×4 samples) basis from the horizontal ancillary data space of the data stream of Ch2, performs 8B/10B conversion to generate data blocks of 50 bits, and supplies data blocks to the multiplexing unit 322.

Figure 29:
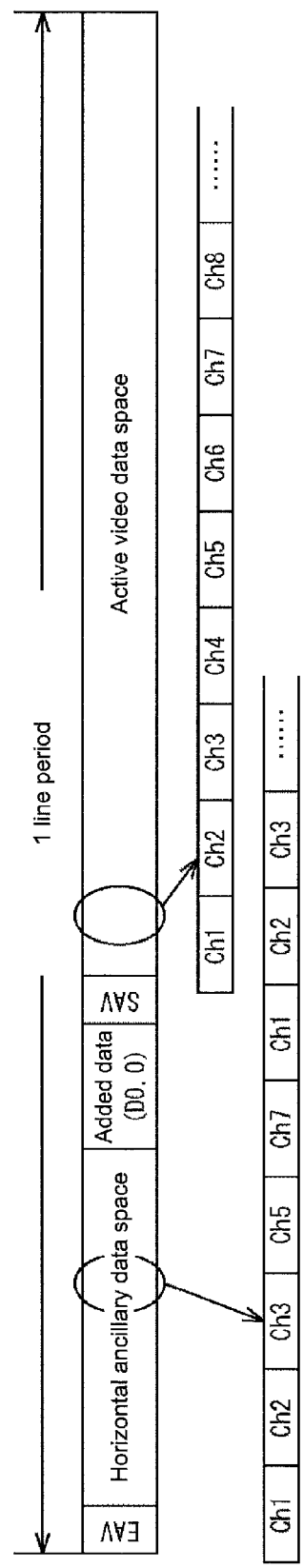
FIG. 29 is a diagram showing a structure example of a data stream of 10G-SDI.

The multiplexing unit 322 multiplexes the data blocks supplied from the data processing units 321-1 to 321-4 as described above, as shown in right side of FIG. 28 and FIG. 29, thereby generating the data stream of 10G-SDI. It should be noted that FIG. 29 shows a structure example of data for 1 line period of the data stream of 10G-SDI.

That is, the multiplexing unit 322 multiplexes the data blocks of 40 bits or 32 bits generated from the SAV-EAV area of the data streams of Ch1 to Ch8 one by one in order of Ch1, Ch2, Ch3, Ch4, Ch5, Ch6, Ch7, Ch8, Ch1, Ch2, . . . . As a result, the area of EAV/LN/CRC, active video data space, and SAV of the data stream of 10G-SDI are generated.

Further, the multiplexing unit 322 multiplexes the data blocks of 50 bits generated from the horizontal ancillary data space of the data streams of Ch1, Ch2, Ch3, Ch5, Ch7 one by one in order of Ch1, Ch2, Ch3, Ch5, Ch7, Ch1, Ch2, . . . . As a result, the horizontal ancillary data space of data stream of 10G-SDI is generated.

Further, to coordinate a period of 1 line, the multiplexing unit 322 multiplexes added data formed of D0.0 of an 8B/10B code to the back of the horizontal ancillary data space.

Then, the multiplexing unit 322 supplies the generated data stream of 10G-SDI to the P/S conversion unit 323.

In Step S210, the P/S conversion unit 323 performs P/S conversion for the data stream of 10G-SDI. That is, the P/S conversion unit 323 performs P/S conversion for the data stream of 10G-SDI supplied from the multiplexing unit 322 and supplies the data stream to the transmission control unit 302.

In Step S211, the transmission control unit 302 transmits the data stream of 10G-SDI. That is, the transmission control unit 302 transmits the data stream of the serial series of 10G-SDI, thereby transmitting the RAW data to the CCU 12c.

FIG. 30 shows a total word count per line of the data stream of 10G-SDI according to the third embodiment, the number of pieces of data of the active video data space, the number of pieces of data of the horizontal ancillary data space, the number of pieces of data of the SAV/EAV/LN/CRC, and the number of pieces of data of the added data, for each format and frame rate of the RAW data transmitted.

(RAW Data Reception Process)

Figure 31:
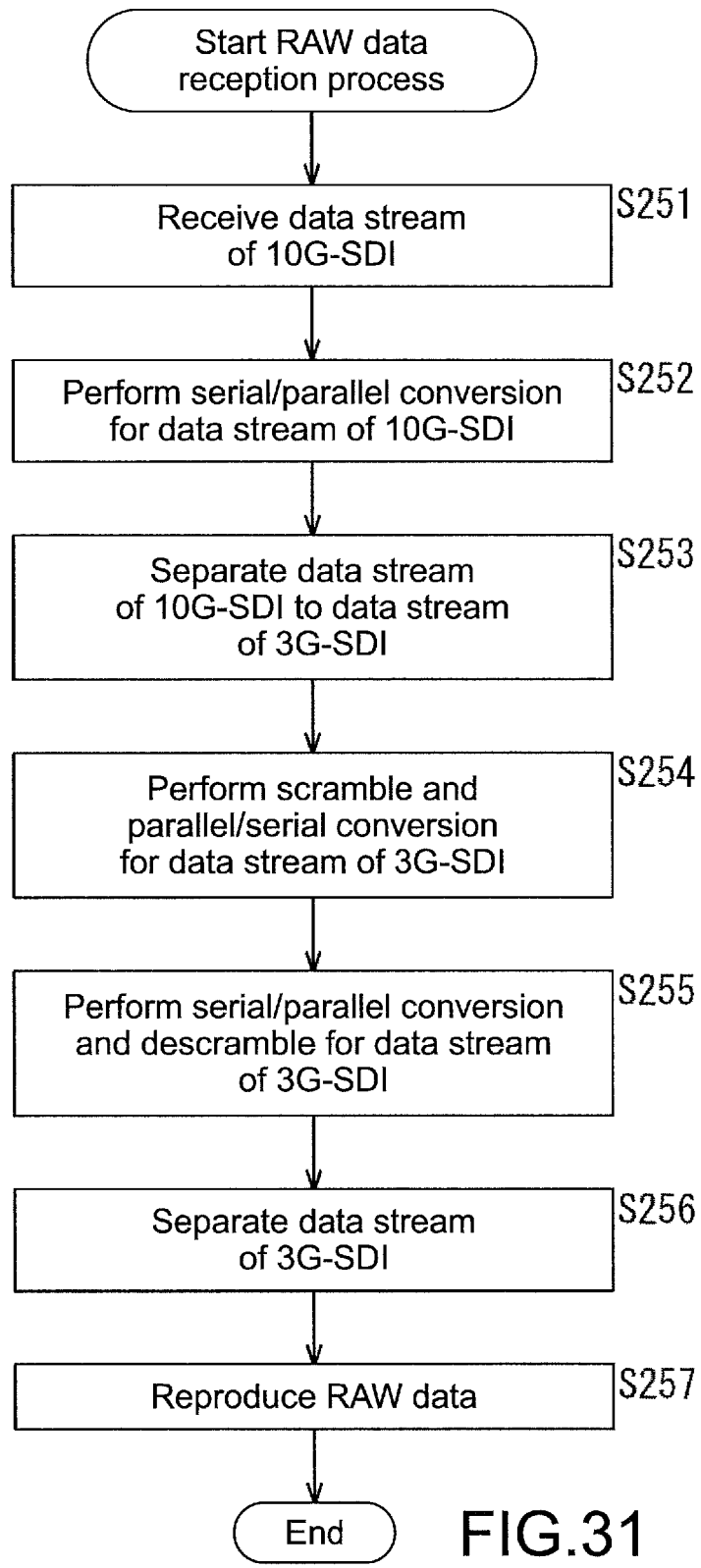
FIG. 31 is a flowchart for explaining a third embodiment of a RAW data reception process.

Subsequently, with reference to a flowchart of FIG. 31, a description will be given on a RAW data reception process performed by the CCU 12c so as to correspond to the RAW data transmission process performed by the broadcast camera 11c shown in FIG. 25.

In Step S251, the reception control unit 351 receives the data stream of 10G-SDI transmitted from the broadcast camera 11c and supplies the data stream to the S/P conversion unit 371.

In Step S252, the S/P conversion unit 371 performs S/P conversion for the data stream of 10G-SDI and supplies the data stream to the separation unit 372.

In Step S253, the signal processing unit 352 separates the data stream of 10G-SDI into the data stream of 3G-SDI. Specifically, by an opposite process to the process performed by the multiplexing unit 322 of the broadcast camera 11, the separation unit 372 separates the data stream of 10G-SDI into the data blocks. Then, separation unit 372 supplies the data blocks of 40 bits formed of the data in the SAV-EAV area of the data streams of Ch1, Ch3, Ch5, Ch7 of HD-SDI to the 8B/10B decoders 381-1 to 381-4, respectively. Further, the separation unit 372 supplies the data blocks of 32 bits formed of the data in the SAV-EAV area of the data streams of Ch2, Ch4, Ch6, and Ch8 of HD-SDI to the descramblers 382-1 to 382-4, respectively.

Further, the separation unit 372 supplies the data blocks of 50 bits formed of the data in the horizontal ancillary data space of the data streams of Ch1, Ch3, Ch5, and Ch7 of HD-SDI to the 8B/10B decoders 381-1 to 381-4, respectively. Further, the separation unit 372 supplies the data blocks of 50 bits formed of the data in the horizontal ancillary data space of the data stream of HD-SDI of Ch2 to the 8B/10B decoder 381-5.

The 8B/10B decoders 381-1 to 381-4 perform 10B/8B conversion for the data blocks supplied from the separation unit 372 and cause the data blocks to be stored in the RAMs 383a-1 to 383a-4.

The descramblers 382-1 to 382-4 perform descramble for the data blocks supplied from the separation unit 372 and cause the data blocks to be stored in the RAMs 383b-1 to 383b-4.

The 8B/10B decoder 381-5 performs 10B/8B conversion for the data blocks supplied from the separation unit 372 and causes the data blocks to be stored in the RAM 383b-1.

By an opposite process to the process performed by the separation unit 332-1 of the broadcast camera 11c, the multiplexing unit 384-1 uses the data blocks stored in the RAM 383a-1 and the RAM 383b-1, thereby generating the data stream of Ch1 of 3G-SDI. The multiplexing unit 384-1 supplies the generated data stream of Ch1 of 3G-SDI to the scramble and P/S conversion unit 385-1.

By an opposite process to the process performed by the separation unit 332-2 of the broadcast camera 11c, the multiplexing unit 384-2 uses the data blocks stored in the RAM 383a-2 and the RAM 383b-2 to generate the data stream of Ch2 of 3G-SDI. The multiplexing unit 384-2 supplies the generated data stream of Ch2 of 3G-SDI to the scramble and P/S conversion unit 385-2.

By an opposite process to the process performed by the separation unit 332-3 of the broadcast camera 11c, the multiplexing unit 384-3 uses the data blocks stored in the RAM 383a-3 and the RAM 383b-3 to generate the data stream of Ch3 of 3G-SDI. The multiplexing unit 384-3 supplies the generated data stream of Ch3 of 3G-SDI to the scramble and P/S conversion unit 385-3.

By an opposite process to the process performed by the separation unit 332-4 of the broadcast camera 11c, the multiplexing unit 384-4 uses the data blocks stored in the RAM 383a-4 and the RAM 383b-4 to generate the data stream of Ch4 of 3G-SDI. The multiplexing unit 384-4 supplies the generated data stream of Ch4 of 3G-SDI to the scramble and P/S conversion unit 385-4.

In Step S254, the scramble and P/S conversion units 385-1 to 385-4 perform scramble and P/S conversion for the data stream of 3G-SDI. That is, the scramble and P/S conversion units 385-1 to 385-4 perform scramble and P/S conversion for the data streams of Ch1 to Ch4 of 3G-SDI as in the process of Step S5 shown in FIG. 6. The scramble and P/S conversion units 385-1 to 385-4 supply the processed data streams of Ch1 to Ch4 of 3G-SDI to the S/P conversion and descramble units 261-1 to 261-4 of the signal processing unit 252.

After that, in Steps S255 to S257, the same process as in Steps S152 to S154 shown in FIG. 20 is performed. As a result, the original RAW data of two frames is restored and supplied to the video processing unit 153.

After that, the RAW data reception process is terminated.

As described above, by using 10G-SDI, it is possible to transmit 4K RAW data with the Bayer arrangement of 47.95P-60P.

8. Modified Example of Third Embodiment

Hereinafter, a modified example of the third embodiment will be described.

For example, it is also possible to supply the data stream of 3G-SDI before being subjected to scramble and P/S conversion from the signal processing unit 202 to the signal processing unit 301 of the broadcast camera 11c. As a result, it becomes possible to remove the scramble and P/S conversion units 215-1 to 215-4 of the signal processing unit 202 to omit the scramble and P/S conversion or remove the S/P conversion and descramble units 331-1 to 331-4 of the signal processing unit 301 to omit the S/P conversion and descramble process.

Further, for example, it is also possible to supply the data stream of HD-SDI before being multiplexed with respect to the data stream of 3G-SDI from the signal processing unit 202 of the broadcast camera 11c to the signal processing unit 301. As a result, it becomes possible to remove the multiplexing units 214-1 to 214-4 of the signal processing unit 202 to omit the multiplexing process with respect to 3G-SDI from HD-SDI or remove the separation units 332-1 to 332-4 of the signal processing unit 301 to omit the separation process from 3G-SDI to HD-SDI.

Further, for example, from the signal processing unit 352 of the CCU 12c to the signal processing unit 252, the data stream of 3G-SDI before being subjected to scramble and P/S conversion can be supplied. As a result, it is possible to omit the scramble and P/S conversion process of the signal processing unit 352 and the S/P conversion and descramble process of the signal processing unit 252.

Further, for example, from the signal processing unit 352 of the CCU 12c to the signal processing unit 252, the data stream of HD-SDI before being multiplexed with respect to the data stream of 3G-SDI may be supplied. As a result, it is possible to omit the multiplexing process of the signal processing unit 352 from HD-SDI to 3G-SDI and the separation process of the signal processing unit 252 from 3G-SDI to HD-SDI.

9. Fourth Embodiment

Subsequently, with reference to FIG. 32 to FIG. 38, a fourth embodiment of the present technology will be described.

The third embodiment described above relates to such a technology that the data stream obtained by multiplexing the RAW data with respect to the data streams of HD-SDI (3G-SDI of 4 channels) of 8 channels is converted to the data stream of 10G-SDI of 1 channel and transmitted. In contrast, in the fourth embodiment, out of the data streams of HD-SDI of 8 channels, the RAW data is multiplexed with respect to 7 channels, data different from the RAW data is multiplexed to the remaining 1 channel (hereinafter, also referred to as a trunk line), and this is converted to the data stream of 10G-SDI of 1 channel and transmitted.

(Circuit Structure Example of Broadcast Camera 11d)

Figure 32:
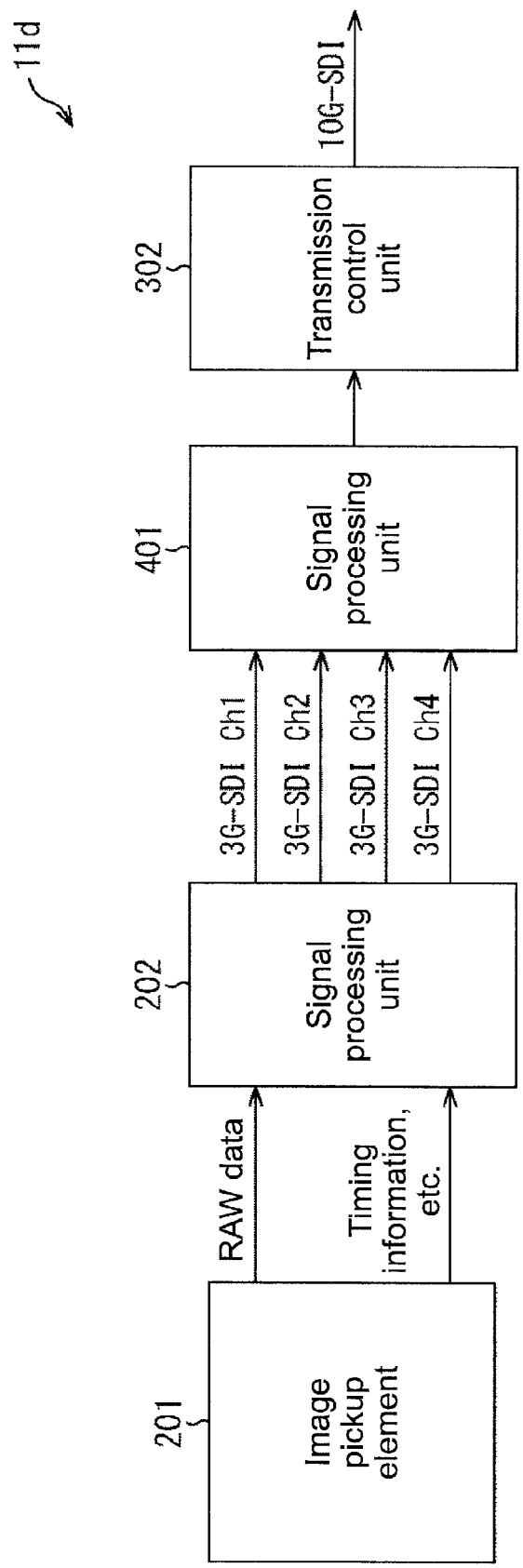
FIG. 32 is a block diagram showing a structure example of functions of a broadcast camera in detail according to a fourth embodiment of the present technology.

FIG. 32 is a block diagram showing a structure example of a function of a part of a broadcast camera 11d according to the fourth embodiment. It should be noted that in the figure, parts corresponding to those of FIG. 21 are denoted by the same symbols, and a description on parts with the same process will be omitted as appropriate to avoid repetition.

The broadcast camera 11d is different from the broadcast camera 11c shown in FIG. 21 in terms of being provided with a signal processing unit 401 instead of the signal processing unit 301.

The signal processing unit 401 generates the data streams of 10G-SDI from the data streams of Ch1 to Ch4 of 3G-SDI supplied from the signal processing unit 202 and supplies the generated data stream of 10G-SDI to the transmission control unit 302.

(Structure Example of Signal Processing Unit 401)

Figure 33:
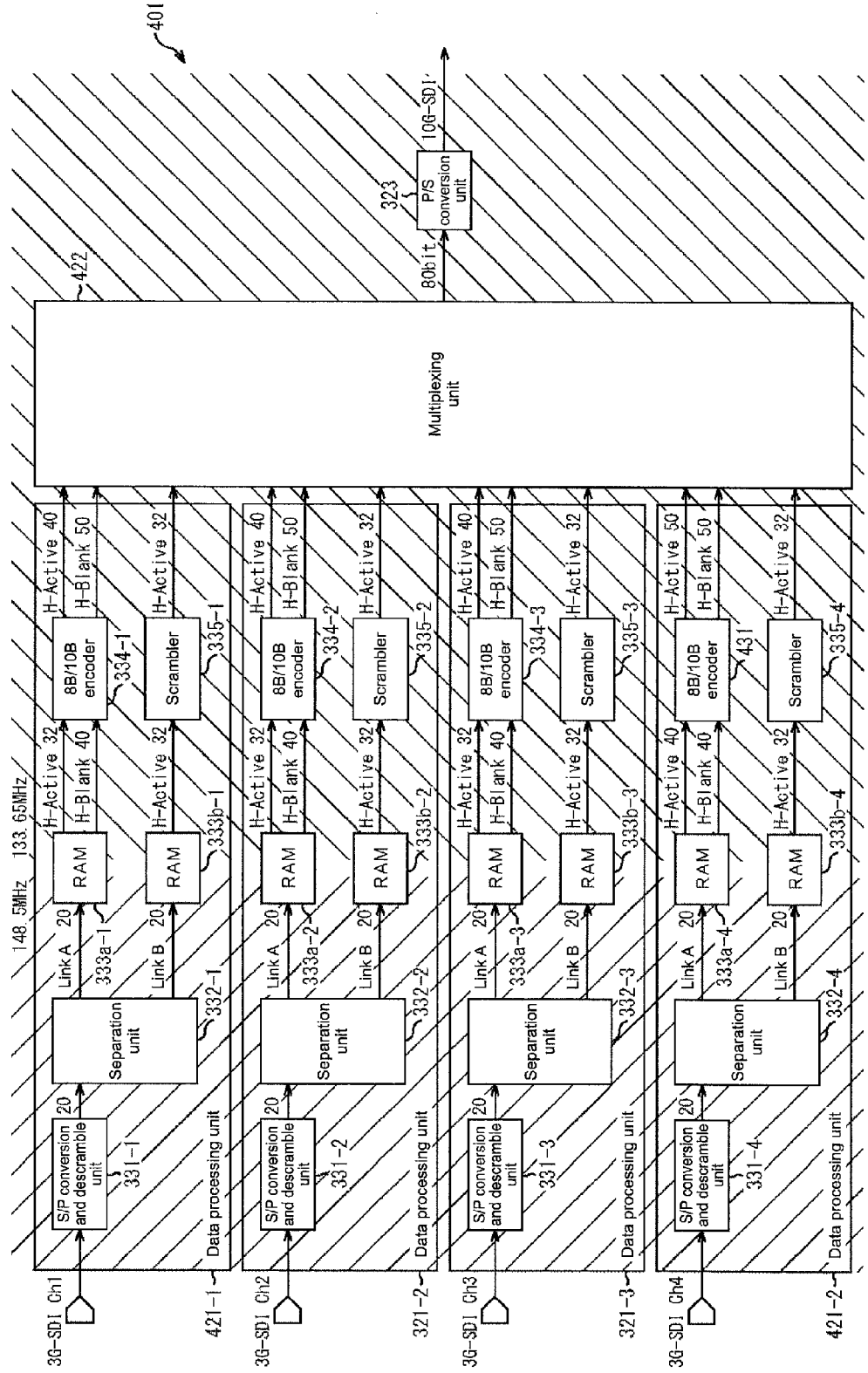
FIG. 33 is a block diagram showing a structure example of functions of a signal processing unit of the broadcast camera in detail.

FIG. 33 is a block diagram showing a structure example of the signal processing unit 401. It should be noted that in the figure, parts corresponding to those in FIG. 22 are denoted by the same symbols, and a description on parts with the same process will be omitted as appropriate to avoid repetition.

The signal processing unit 401 is different from the signal processing unit 301 shown in FIG. 22 in terms of being provided with a data processing unit 421-1, a data processing unit 421-2, and a multiplexing unit 422, instead of the data processing unit 321-1, the data processing unit 321-4, and the multiplexing unit 322.

The data processing unit 421-1 is different from the data processing unit 321-1 of the signal processing unit 301 in that the 8B/10B encoder 334-5 is removed.

The data processing unit 421-2 is different from the data processing unit 321-4 of the signal processing unit 301 in that, instead of the 8B/10B encoder 334-4, an 8B/10B encoder 431 is provided thereto. The 8B/10B encoder 431 subjects the data stream of Ch7 stored in the RAM 333a-4 to 8B/10B (8 bits/10 bits) conversion for each predetermined unit and supplies the obtained data blocks to the multiplexing unit 422.

The multiplexing unit 422 multiplexes the data blocks supplied from the 8B/10B encoders 334-1 to 334-3, the 8B/10B encoder 431, and the scramblers 335-1 to 335-4, thereby generating the data stream of 10G-SDI. The multiplexing unit 422 supplies the generated data stream of 10G-SDI to the P/S conversion unit 323.

(Circuit Structure Example of CCU 12d)

Figure 34:
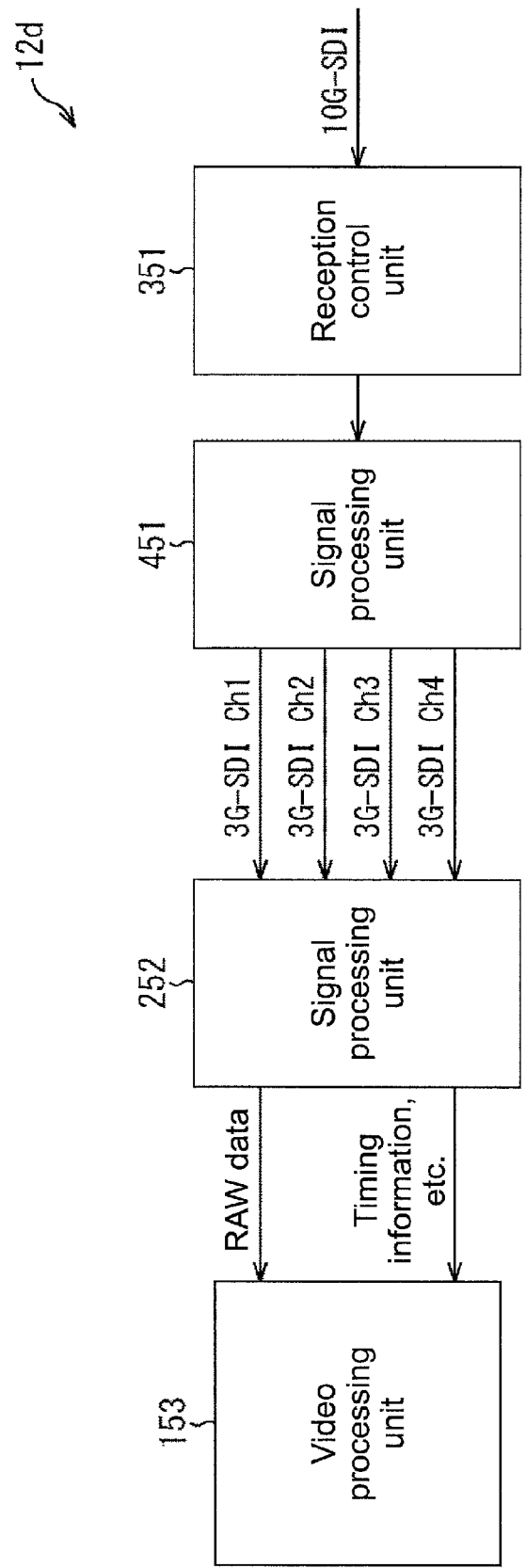
FIG. 34 is a block diagram showing a structure example of functions of a CCU according to the fourth embodiment of the present technology.

FIG. 34 is a block diagram showing a structure example of a function of a part of a CCU 12d according to the fourth embodiment. It should be noted that in the figure, parts corresponding to FIG. 23 are denoted by the same symbols, and a description on parts with the same process will be omitted as appropriate to avoid repetition.

The CCU 12d is different from the CCU 12c shown in FIG. 23 in that a signal processing unit 451 is provided thereto instead of the signal processing unit 352.

The signal processing unit 451 separates the data stream of 10G-SDI into the data streams of Ch1 to Ch4 of 3G-SDI and supplies the data streams to the signal processing unit 252.

(Structure Example of Signal Processing Unit 451)

Figure 35:
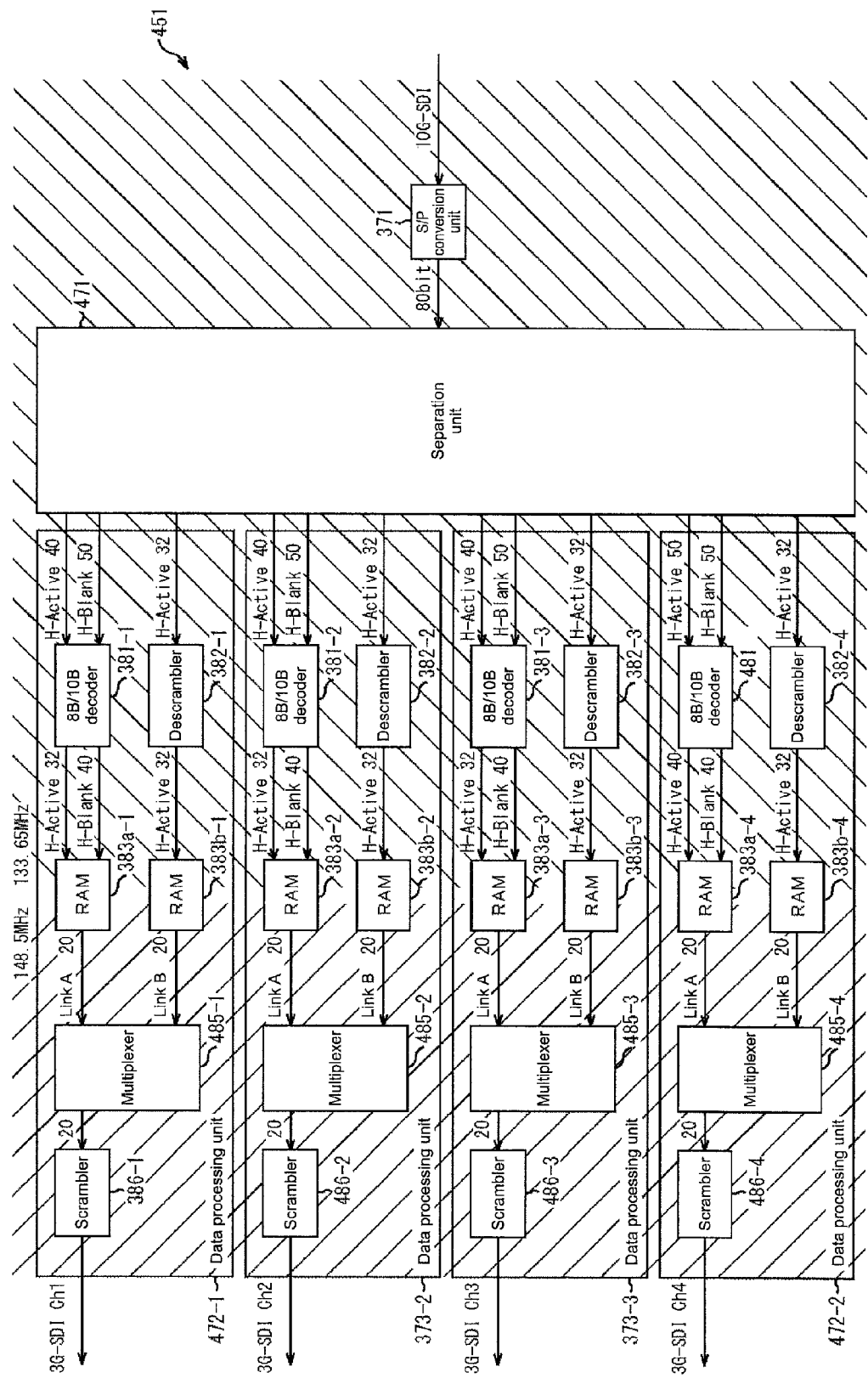
FIG. 35 is a block diagram showing a structure example of functions of a signal processing unit of the CCU in detail.

FIG. 35 is a block diagram showing a structure example of the signal processing unit 451. It should be noted that in the figure, parts corresponding to those in FIG. 24 are denoted by the same symbols, and a description on parts with the same process will be omitted as appropriate to avoid repetition.

The signal processing unit 451 is different from the signal processing unit 352 shown in FIG. 24 in that, instead of the separation unit 372, the data processing unit 373-1, and the data processing unit 373-4, a separation unit 471, a data processing unit 472-1, and a data processing unit 472-2 are provided thereto.

The separation unit 471 performs an opposite process to the process by the multiplexing unit 422 of the signal processing unit 401 shown in FIG. 33, thereby separating the data stream of 10G-SDI into predetermined data blocks. Then, the separation unit 471 supplies the separated data blocks to the 8B/10B decoders 381-1 to 381-3, an 8B/10B decoder 481, and the descramblers 382-1 to 382-4.

The data processing unit 472-1 is different from the data processing unit 373-1 of the signal processing unit 352 in that the 8B/10B decoder 381-5 is removed.

The data processing unit 472-2 is different from the data processing unit 373-4 of the signal processing unit 352 in that, instead of the 8B/10B decoder 381-4, the 8B/10B decoder 481 is provided thereto. The 8B/10B decoder 481 performs 10B/8B conversion for the data blocks supplied from the separation unit 471 and causes the RAM 383a-4 to store the data blocks.

(Data Structure of Data Stream of 10G-SDI)

The RAW data transmission process by the broadcast camera 11d can be carried out by the same process as the RAW data transmission process according to the third embodiment described above with reference to FIG. 25. Further, the RAW data reception process by the CCU 12d can be carried out by the same process as the RAW data reception process according to the fourth embodiment described above with reference to FIG. 31.

However, in the fourth embodiment, as compared to the third embodiment, the data structure of the data stream of 10G-SDI which is transmitted between the broadcast camera 11d and the CCU 12d is different. Here, with reference to FIG. 36 and FIG. 37, a description will be given on an example of the data structure of the data stream of 10G-SDI according to the fourth embodiment.

Figure 36:
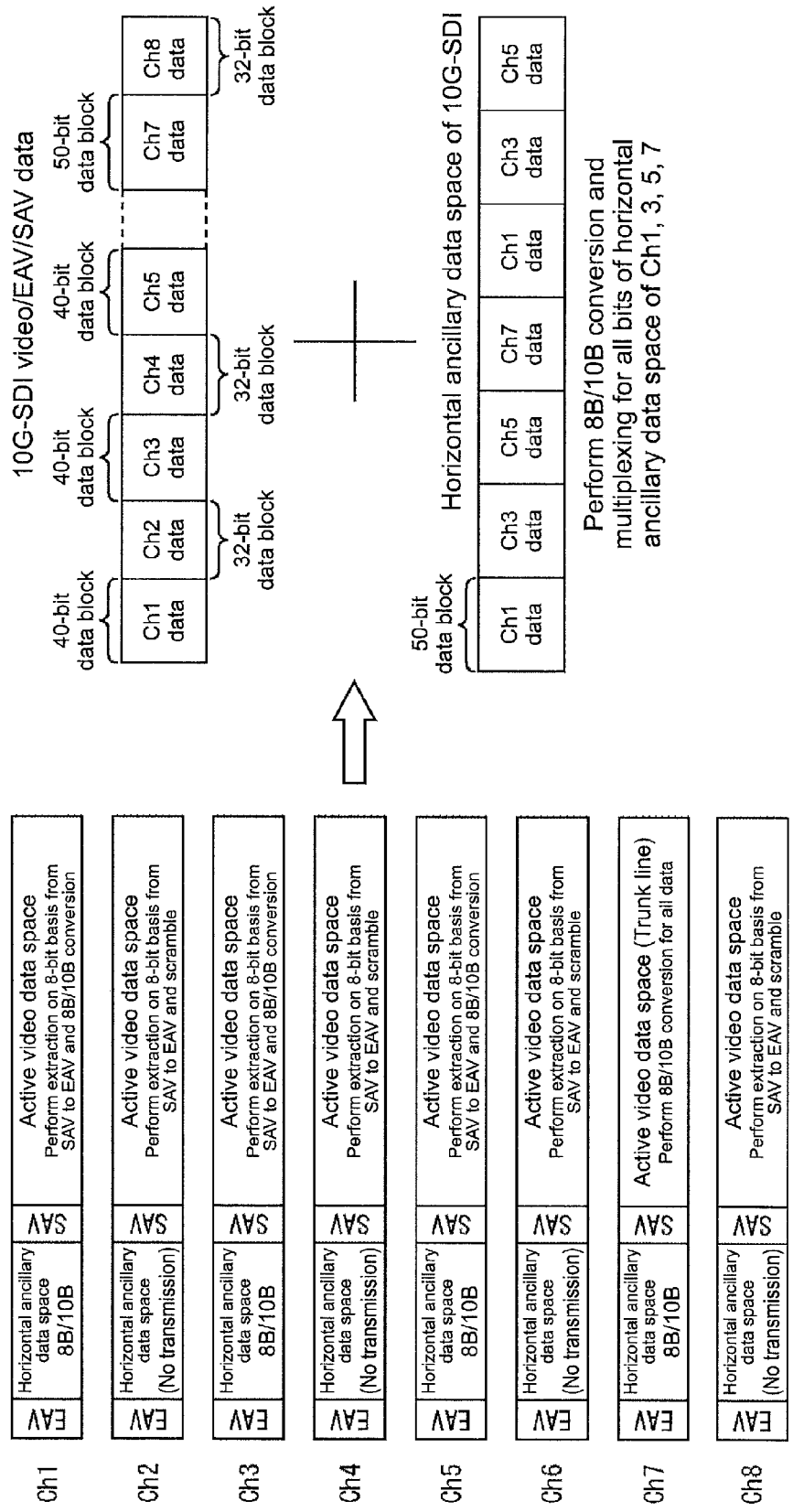
FIG. 36 is a diagram for explaining a generation method of a data stream of 10G-SDI.
Figure 37:
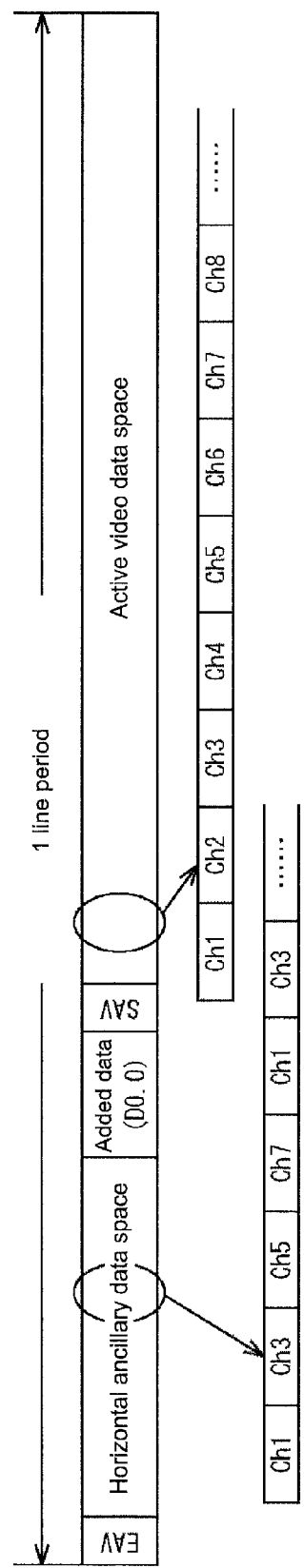
FIG. 37 is a diagram showing a structure example of the data stream of 10G-SDI.

In FIG. 36, an example is given in which, out of the data streams of Ch1 to Ch8 of HD-SDI, Ch7 is set as the trunk line. In this case, with respect to the data streams of Ch1 to Ch6 and Ch8, the data extraction, rearrangement, and data blocking are performed by the same method as described above with reference to FIG. 26 and FIG. 27.

On the other hand, for the data stream of Ch7, the data is extracted from the SAV-EAV area sequentially on 40-bit (10 bits×4 samples) basis, and 8B/10B conversion is performed therefor, thereby generating data blocks of 50 bits. Further, in the same way, from the horizontal ancillary data space, sequentially, the data is extracted on 40-bit (10 bits×4 samples) basis, and 8B/10B conversion is performed, thereby generating data blocks of 50 bits.

Then, the data blocks of 40 bits, 32 bits, or 50 bits generated from the data in the SAV-EAV area of the data streams of Ch1 to Ch8 are multiplexed sequentially in order of Ch1, Ch2, Ch3, Ch4, Ch5, Ch6, Ch7, Ch8, Ch1, Ch2, . . . on an individual basis. As a result, the area of EAV/LN/CRC, the active video data space, and SAV of the data streams of 10G-SDI are generated.

Further, the data blocks of 50 bits generated from the data of the horizontal ancillary data space of the data streams of Ch1, Ch3, Ch5, and Ch7 are multiplexed in order of Ch1, Ch3, Ch5, Ch7, Ch1, Ch2, . . . on an individual basis. As a result, the horizontal ancillary data space of the data stream of 10G-SDI is generated.

Further, to coordinate a period of 1 line, added data formed of D0.0 of an 8B/10B code is multiplexed with respect to the back of the horizontal ancillary data space of the data stream of 10G-SDI.

Then, the data stream of 10G-SDI thus generated is subjected to P/S conversion and transmitted from the broadcast camera 11d to the CCU 12d.

In this way, for example, it is possible to multiplex video data or the like different from a control command, voice data, and the RAW data with respect to the data stream of 10G-SDI and transmit the data along with the RAW data.

FIG. 38 shows a total word count per line of the data stream of 10G-SDI according to the fourth embodiment, the number of pieces of data of the active video data space, the numbers of pieces of data of the horizontal ancillary data space and SAV/EAV/LN/CRC, and the number of pieces of data of the added data, for each format and frame rate of the RAW data transmitted. It should be noted that as shown in the figure, in the case where the format of the RAW data is 2048 samples×1080 lines, unlike the examples of FIG. 36 and FIG. 37, for only Ch1 and Ch7, the data of the horizontal ancillary data space is multiplexed with respect to the data stream of 10G-SDI and transmitted.

10. Modified Example of Fourth Embodiment

In the above description, the example is given in which the data stream of Ch7 of HD-SDI is set as the trunk line. However, the data stream of another channel may be set as the trunk line. Further, for example, the number of trunk lines can be set to 2 channels or more.

11. Fifth Embodiment

Figure 39:
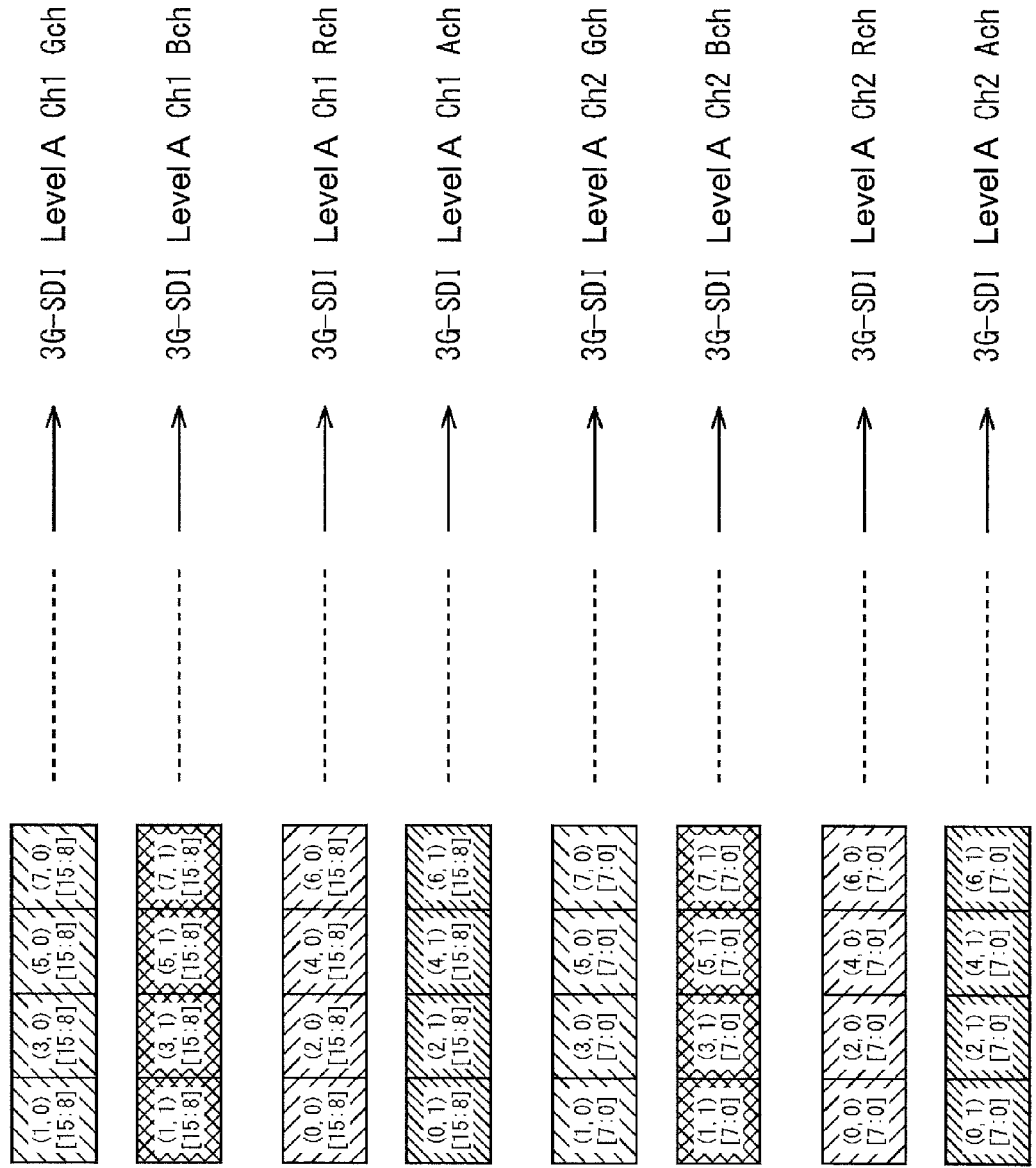
FIG. 39 is a diagram for explaining a fifth embodiment of the present technology.

Subsequently, with reference to FIG. 39, a fifth embodiment of the present technology will be described.

The first embodiment described above relates to the technology of transmitting the 4K RAW data with the Bayer arrangement of 23.98P-30P by the data streams of 2 channels in accordance with the requirements of level B of 3G-SDI prescribed in SMPTE 425-1. In contrast, according to the fifth embodiment, 4K RAW data with the Bayer arrangement of 23.98P-30P can be transmitted by the data streams of 2 channels in accordance with the requirements of level A of 3G-SDI prescribed in SMPTE 425-1.

It should be noted that, in the fifth embodiment, it is possible to use a broadcast camera and a CCU which have the same structure as the broadcast camera 11a and the CCU 12a in the first embodiment, respectively. Therefore, a description on those will be omitted.

As described above with reference to FIG. 13 in the first embodiment, in the RAW data of FIG. 2, the numbers of samples of Gb, Gr, B, and R are the same. When the Bayer arrangement unit conversion is performed, the data can be regarded as video data of 2048 samples×1080 lines. Therefore, as shown in FIG. 39, it is possible to transmit the RAW data by being multiplexed with respect to the data stream of 3G-SDI in accordance with the requirements in the case where video data of 4:4:4:4(RGB+A) shown in FIG. 2 and the like of SMPTE 425-1 is transmitted by level A of 3G-SDI.

Specifically, upper 8 bits of the pixel data of the RAW data are multiplexed with respect to the data stream of Ch1 of 3G-SDI, and lower 8 bits are multiplexed with respect to the data stream of Ch2. Further, the data streams of 2 channels follow the format of FIG. 2 of SMPTE 425-1.

More specifically, upper 8 bits of the pixel data of the Gr sample of the RAW data are multiplexed with respect to the G channel of the data stream of Ch1 of level A of 3G-SDI, and lower 8 bits are multiplexed with respect to the G channel of the data stream of Ch2 of level A of 3G-SDI.

The upper 8 bits of the pixel data of the B sample of the RAW data are multiplexed with respect to the B channel of the data stream of Ch1 of level A of 3G-SDI, and the lower 8 bits are multiplexed with respect to the B channel of the data stream of Ch2 of level A of 3G-SDI.

The upper 8 bits of the pixel data of the R sample of the RAW data are multiplexed with respect to the R channel of data stream of Ch1 of level A of 3G-SDI, and the lower 8 bits are multiplexed with respect to the R channel of the data stream of Ch2 of level A of 3G-SDI.

The upper 8 bits of the pixel data of the Gr sample of the RAW data are multiplexed with respect to the A (Auxiliary) channel of the data stream of Ch1 of level A of 3G-SDI, and the lower 8 bits are multiplexed with respect to the A channel of the data stream of Ch2 of level A of 3G-SDI.

It should be noted that the channels with respect to which the Gr sample and the Gb sample are multiplexed may be interchanged. That is, the pixel data of the Gr sample is multiplexed with respect to the A channel, and the pixel data of the Gb sample is multiplexed with respect to the G channel.

Further, the bit multiplexing method for the pixel data of the RAW data are the same as the method described above with reference to FIG. 8 and FIG. 9.

Then, in accordance with the requirements of FIG. 2 and the like of SMPTE 425-1, the word multiplexing is performed for the data streams of the R channel and the G channel of Ch1, thereby generating a data stream 1 (data stream one) of Ch1. The data stream is obtained by multiplexing upper 8 bits of the pixel data of the R sample and the Gr sample of the RAW data.

Further, by performing word multiplexing for the data streams of B channel and A channel of Ch1, a data stream 2 (data stream two) of Ch1 is generated. The data stream is obtained by multiplexing upper 8 bits of the pixel data of the B sample and the Gb sample of the RAW data.

In this way, upper 8 bits of the pixel data of the samples of Gr, Gb, B, and R of the RAW data are separated into two data streams on a pixel (sample) basis and multiplexed.

In the same way, by performing word multiplexing for the data streams of the R channel and the G channel of Ch2, a data stream 1 (data stream one) of Ch2 is generated. The data stream is obtained by multiplexing lower 8 bits of the pixel data of the R sample and the Gr sample of the RAW data.

Further, by performing word multiplexing for the data streams of the A channel and the B channel of Ch2, a data stream 2 (data stream two) of Ch2 is generated. The data stream is obtained by multiplexing lower 8 bits of the pixel data of the B sample and the Gr sample of the RAW data.

In this way, the lower 8 bits of the pixel data of the samples of Gr, Gb, B, and R of the RAW data are separated into two data streams on a pixel (sample) basis and multiplexed.

Subsequently, in accordance with the requirements of SMPTE 424M/425-1, horizontal blanking data (H-Blank), vertical blanking data (V-Blank), SAV, EAV, LN, and CRCC are added to the data streams.

Subsequently, in accordance with the requirements of SMPTE 424M, the data stream 1 and the data stream 2 of Ch1 are subjected to the word multiplexing and scramble and P/S conversion, thereby generating the data stream of Ch1 of level A of 3G-SDI. The data stream is obtained by multiplexing upper 8 bits of the pixel data of the samples of Gr, Gb, B, and R of the RAW data.

In the same way, the data stream 1 and the data stream 2 of Ch2 are subjected to the word multiplexing and scramble and P/S conversion, thereby generating the data stream of Ch2 of level A of 3G-SDI. The data stream is obtained by multiplexing the lower 8 bits of the pixel data of the samples of Gr, Gb, B, and R of the RAW data.

Then, the data streams of Ch1 and Ch2 are transmitted.

In this way, in accordance with the requirements of level A of 3G-SDI, for example, by using the existing IC or apparatus for 3G-SDI, it is possible to transmit the 4K RAW data with the Bayer arrangement of 23.98P-30P. Further, with respect to the data stream of Ch1, upper 8 bits of the pixel data of RAW data are multiplexed. Therefore, for example, by using the observation apparatus for 3G-SDI, it is possible to visually confirm the video of the RAW data by the data stream of Ch1. Further, by using the CRCC added to the data streams, it is possible to monitor an error in a transmission system by the observation apparatus for 3G-SDI.

12. Sixth Embodiment

Subsequently, with reference to FIG. 40 to FIG. 44, a sixth embodiment of the present technology will be described.

The second embodiment described above relates to such a technology that in accordance with the requirements of level B of 3G-SDI prescribed in SMPTE 372 and SMPTE 425-1, the 4K RAW data with the Bayer arrangement of 47.95P-60P is transmitted by the data streams of 4 channels. In contrast, according to the fifth embodiment, it is possible to transmit the 4K RAW data with the Bayer arrangement of 23.98P-30P by data streams of 4 channels or 2 channels in accordance with the requirements of level A of 3G-SDI prescribed in SMPTE 425-1.

It should be noted that in the sixth embodiment, a broadcast camera and a CCU having the same structure as the broadcast camera 11*b* and the CCU 12*b* in the second embodiment can be used, so a description on those will be omitted.

First, with reference to FIG. 40, a first system (hereinafter, referred to as system 1) of the sixth embodiment will be described. In the system 1, as in the first embodiment, the pixels of the RAW data are thinned alternately by 1 sample in the Bayer arrangement unit in the horizontal direction, separated into two pieces of RAW data, and transmitted.

Figure 40:
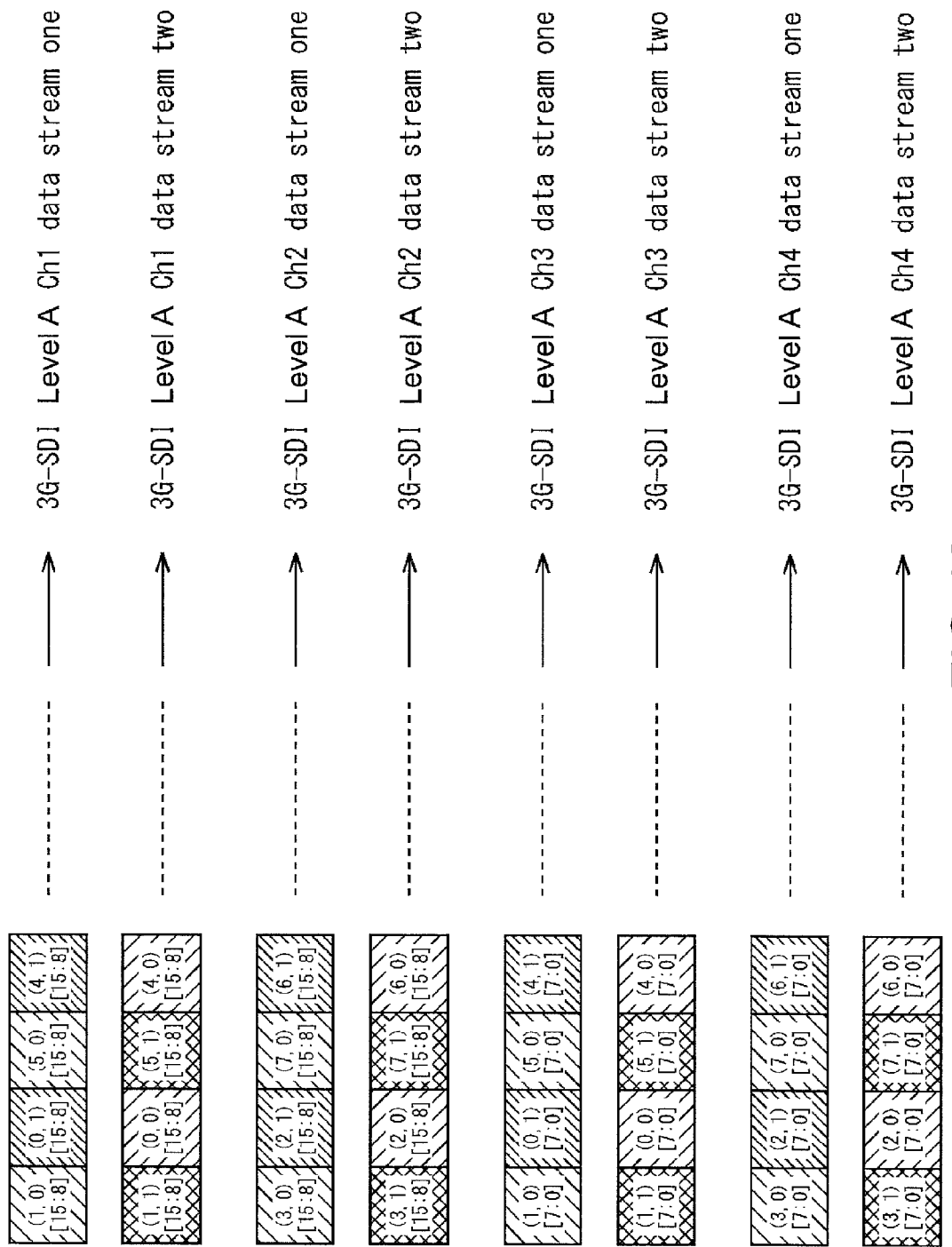
FIG. 40 is a diagram for explaining system 1 in a sixth embodiment of the present technology.

First, as shown in the left side of FIG. 40, by the same method as shown in FIG. 7, rearrangement of the pixel data of the RAW data is performed. Therefore, the first to eighth data columns shown in FIG. 40 are the same as the first to eighth data columns shown in FIG. 7.

Then, the pixel data of the first data column is multiplexed with respect to the active video data space of the data stream 1 (data stream one) of level A of 3G-SDI prescribed in FIG. 1 of SMPTE 425-1, thereby generating the data stream 1 of Ch1.

The pixel data of the second data column is multiplexed with respect to the active video data space of the data stream 2 (data stream two) of level A of 3G-SDI prescribed in FIG. 1 of SMPTE 425-1, thereby generating the data stream 2 of Ch1.

The pixel data of the third data column is multiplexed with respect to the active video data space of the data stream 1 (data stream one) of level A of 3G-SDI prescribed in FIG. 1 of SMPTE 425-1, thereby generating the data stream 1 of Ch2.

The pixel data of the fourth data column is multiplexed with respect to the active video data space of the data stream 2 (data stream two) of level A of 3G-SDI prescribed in FIG. 1 of SMPTE 425-1, thereby generating the data stream 2 of Ch2.

The pixel data of the fifth data column is multiplexed with respect to the active video data space of the data stream 1 (data stream one) of level A of 3G-SDI prescribed in FIG. 1 of SMPTE 425-1, thereby generating the data stream 1 of Ch3.

The pixel data of the sixth data column is multiplexed with respect to the active video data space of the data stream 2 (data stream two) of level A of 3G-SDI prescribed in FIG. 1 of SMPTE 425-1, thereby generating the data stream 2 of Ch3.

The pixel data of the seventh data column is multiplexed with respect to the active video data space of the data stream 1 (data stream one) of level A of 3G-SDI prescribed in FIG. 1 of SMPTE 425-1, thereby generating the data stream 1 of Ch4.

The pixel data of the eighth data column is multiplexed with respect to the active video data space of the data stream 2 (data stream two) of level A of 3G-SDI prescribed in FIG. 1 of SMPTE 425-1, thereby generating the data stream 2 of Ch4.

It should be noted that the bit multiplexing method of the pixel data of the RAW data is the same as described above with reference to FIG. 8 and FIG. 9.

Subsequently, in accordance with the requirements of SMPTE 424M/425-1, horizontal blanking data (H-Blank), vertical blanking data (V-Blank), SAV, EAV, LN, and CRCC are added to the data streams.

Subsequently, in accordance with the requirements of SMPTE 424M, the data stream 1 and the data stream 2 of Ch1 are subjected to word multiplexing and scramble and P/S conversion, thereby generating the data stream of Ch1 of level A of 3G-SDI. The data stream is obtained by multiplexing upper 8 bits of the pixel data of the samples of Gr, Gb, B, and R included in the even samples of the Bayer arrangement unit of the RAW data.

In the same way, the data stream 1 and the data stream 2 of Ch2 are subjected to word multiplexing and scramble and P/S conversion, thereby generating the data stream of Ch2 of level A of 3G-SDI. The data stream is obtained by multiplexing upper 8 bits of the pixel data of the samples of Gr, Gb, B, and R included in the odd samples of the Bayer arrangement unit of the RAW data.

In this way, the upper 8 bits of the pixel data of the samples of Gr, Gb, B, and R of the RAW data are separated into two data streams on a pixel (sample) basis (more precisely, in the Bayer arrangement unit) and multiplexed.

Further, the data stream 1 and data stream 2 of Ch3 are subjected to word multiplexing and scramble and P/S conversion, thereby generating the data stream of Ch3 of level A of 3G-SDI. The data stream is obtained by multiplexing the lower 8 bits of the samples of Gr, Gb, B, and R included in the even samples in the Bayer arrangement unit of the RAW data.

Further, the data stream 1 and data stream 2 of Ch4 are subjected to word multiplexing and scramble and P/S conversion, thereby generating the data stream of Ch4 of level A of 3G-SDI. The data stream is obtained by multiplexing the lower 8 bits of the samples of Gr, Gb, B, and R included in the odd samples in the Bayer arrangement unit of the RAW data.

In this way, the lower 8 bits of the pixel data of the samples of Gr, Gb, B, and R of the RAW data are separated into the two data streams on a pixel (sample) basis (more precisely, in the Bayer arrangement unit) and multiplexed.

Then, the data streams of Ch1 to Ch4 are transmitted.

As described above, in accordance with the requirements of level A of 3G-SDI, for example, by using the existing IC or apparatus for 3G-SDI, it is possible to transmit the 4K RAW data with the Bayer arrangement of 47.95P-60P. Further, with respect to the data streams of Ch1 and Ch2, the upper 8 bits of the pixel data of the RAW data are multiplexed. Therefore, for example, by using the observation apparatus for 3G-SDI, it is possible to visually confirm the video of the RAW data by the data stream of Ch1 or Ch2. Further, by using the CRCC added to the data streams, it is possible to monitor an error in the transmission system by the observation apparatus for 3G-SDI.

Subsequently, with reference to FIG. 41, a second system (hereinafter, referred to as system 2) of the sixth embodiment will be described.

Figure 41:
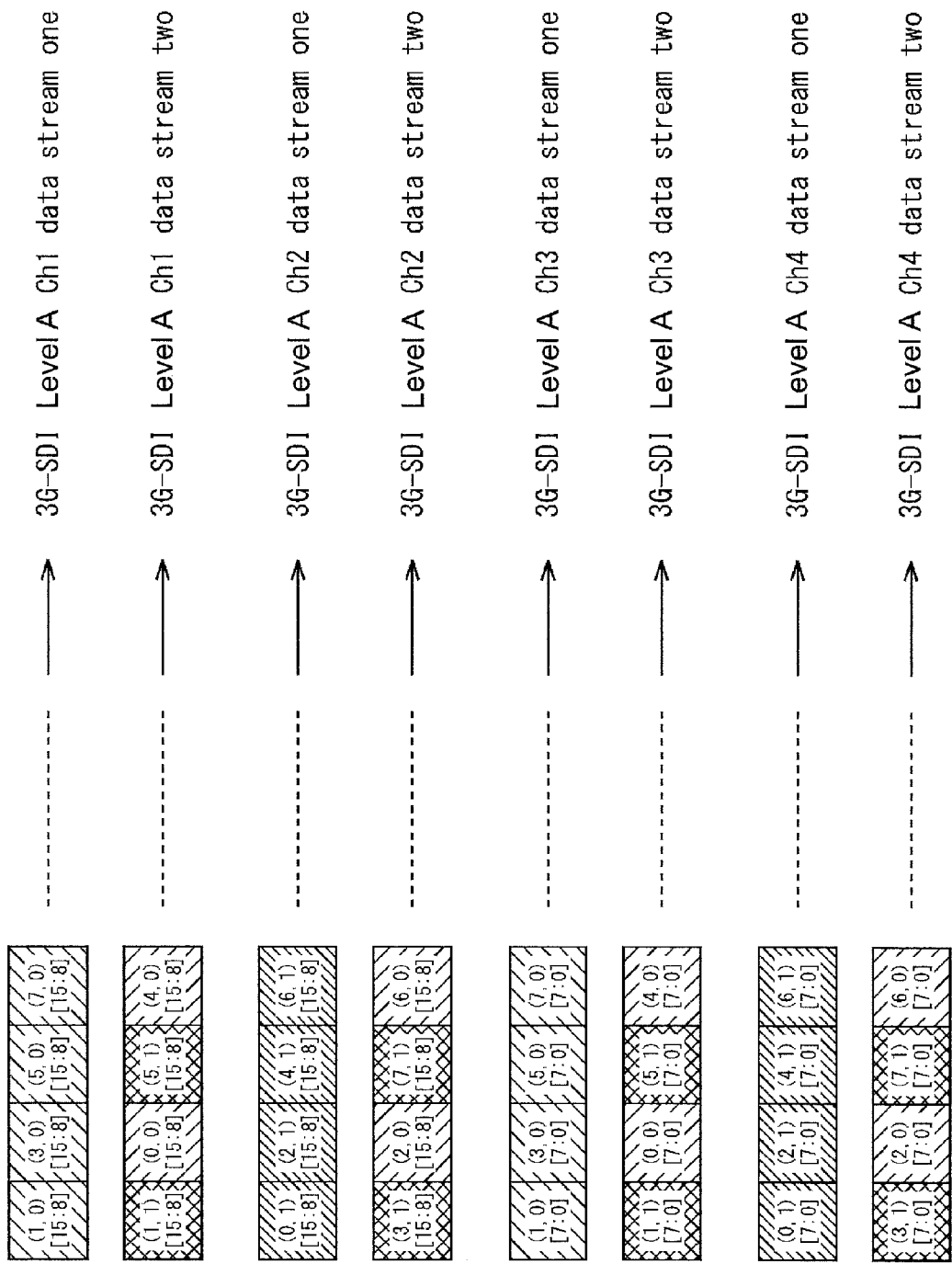
FIG. 41 is a diagram for explaining system 2 in the sixth embodiment of the present technology.

When FIG. 41 and FIG. 40 are compared with each other, the multiplexing methods for the pixel data of the B and R samples are the same, while the multiplexing methods for the pixel data of the Gr and Gb samples are different. That is, the upper 8 bits of the pixel data of the Gr sample are multiplexed with respect to the data stream 1 of Ch1 of level A of 3G-SDI. The lower 8 bits are multiplexed with respect to the data stream 1 of Ch3 of level A of 3G-SDI. Further, the upper 8 bits of the pixel data of the Gr sample are multiplexed with respect to the data stream 1 of Ch2 of level A of 3G-SDI. The lower 8 bits are multiplexed with respect to the data stream 1 of Ch4 of level A of 3G-SDI.

Figure 42:
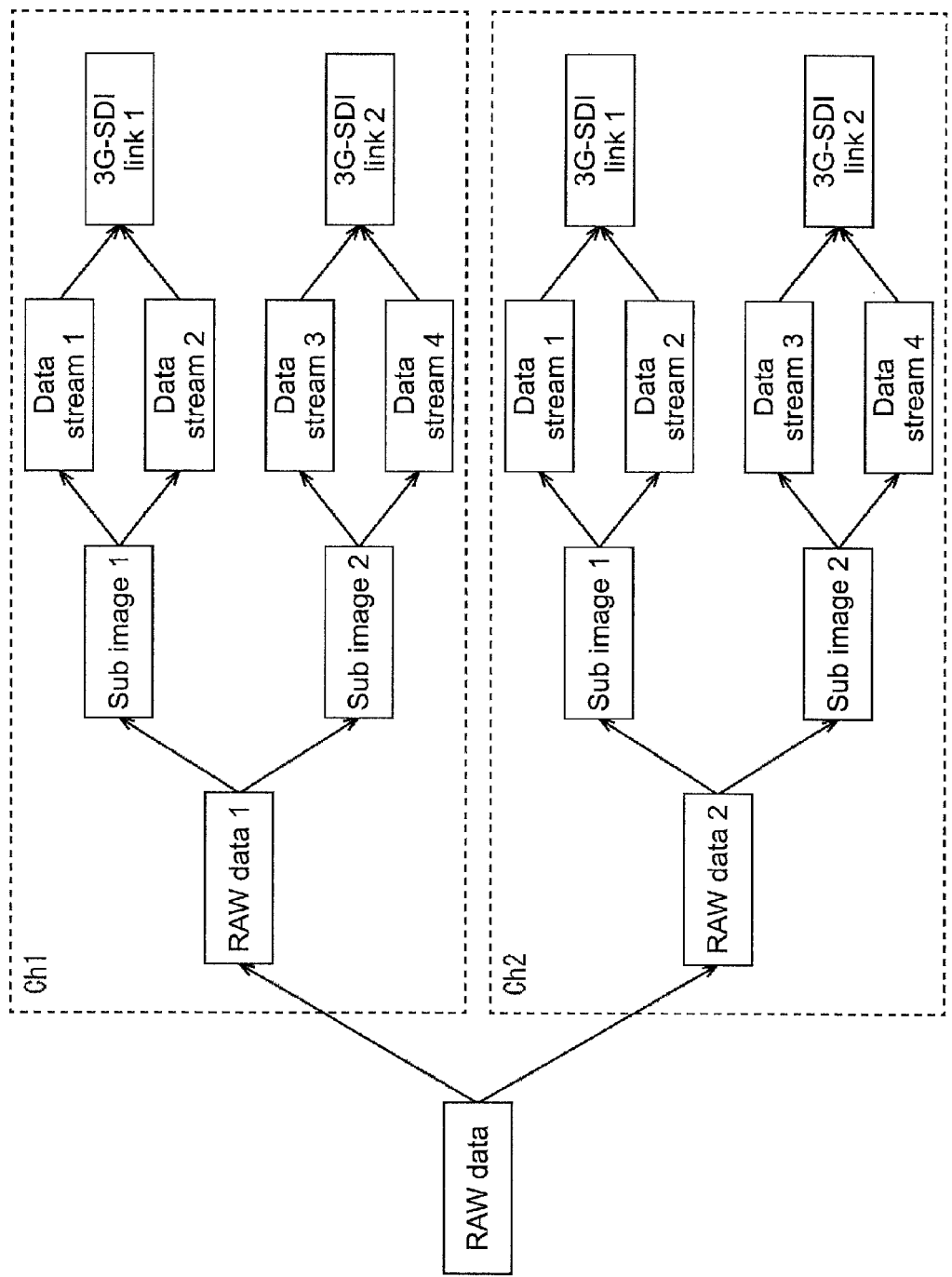
FIG. 42 is a diagram for explaining system 3 in the sixth embodiment of the present technology.

Subsequently, with reference to FIG. 42 to FIG. 44, a third system (hereinafter, referred to as system 3) of the sixth embodiment will be described.

As described above, in the RAW data of FIG. 2, the numbers of samples of Gb, Gr, B, and R are the same, and when the Bayer arrangement unit conversion is performed, the data can be regarded as video data of 2048 samples× 1080 lines. Therefore, it is possible to multiplex the RAW data with respect to the data stream of 3G-SDI and transmitted, in accordance with the requirements in the case where the video data of 4:4:4:4 (RGB+A) is transmitted with level A of 3G-SDI.

Here, with reference to FIG. 42, the outline of the system 3 of the sixth embodiment will be described.

First, RAW data 1 formed of upper 8 bits of the pixel data of the RAW data is separated into a sub image 1 and a sub image 2 of Ch1. Further, from the sub image 1 of Ch1, a data stream 1 (data stream one) and a data stream 2 (data stream two) of Ch1 are generated. Further, from the sub image 2 of Ch1, a data stream 3 (data stream three) and a data stream 4 (data stream four) of Ch1 are generated. Then, the data stream 1 and the data stream 2 of Ch1 are multiplexed, thereby generating the data stream of link 1 of Ch1 of 3G-SDI. Further, the data stream 3 and the data stream 4 of Ch1 are multiplexed, thereby generating the data stream of link 2 of Ch1 of 3G-SDI.

In the same way, RAW data 2 formed of lower 8 bits of the pixel data of the RAW data is separated into a sub image 1 and a sub image 2 of Ch2. Further, from the sub image 1 of Ch2, a data stream 1 (data stream one) and a data stream 2 (data stream two) of Ch2 are generated. Further, from the sub image 2 of Ch2, a data stream 3 (data stream three) and a data stream 4 (data stream four) of Ch2 are generated. Then, the data stream 1 and the data stream 2 of Ch2 are multiplexed, thereby generating the data stream of link 1 of Ch2 of 3G-SDI. Further, the data stream 3 and the data stream 4 of Ch2 are multiplexed, thereby generating the data stream of link 2 of Ch2 of 3G-SDI.

Figure 43:
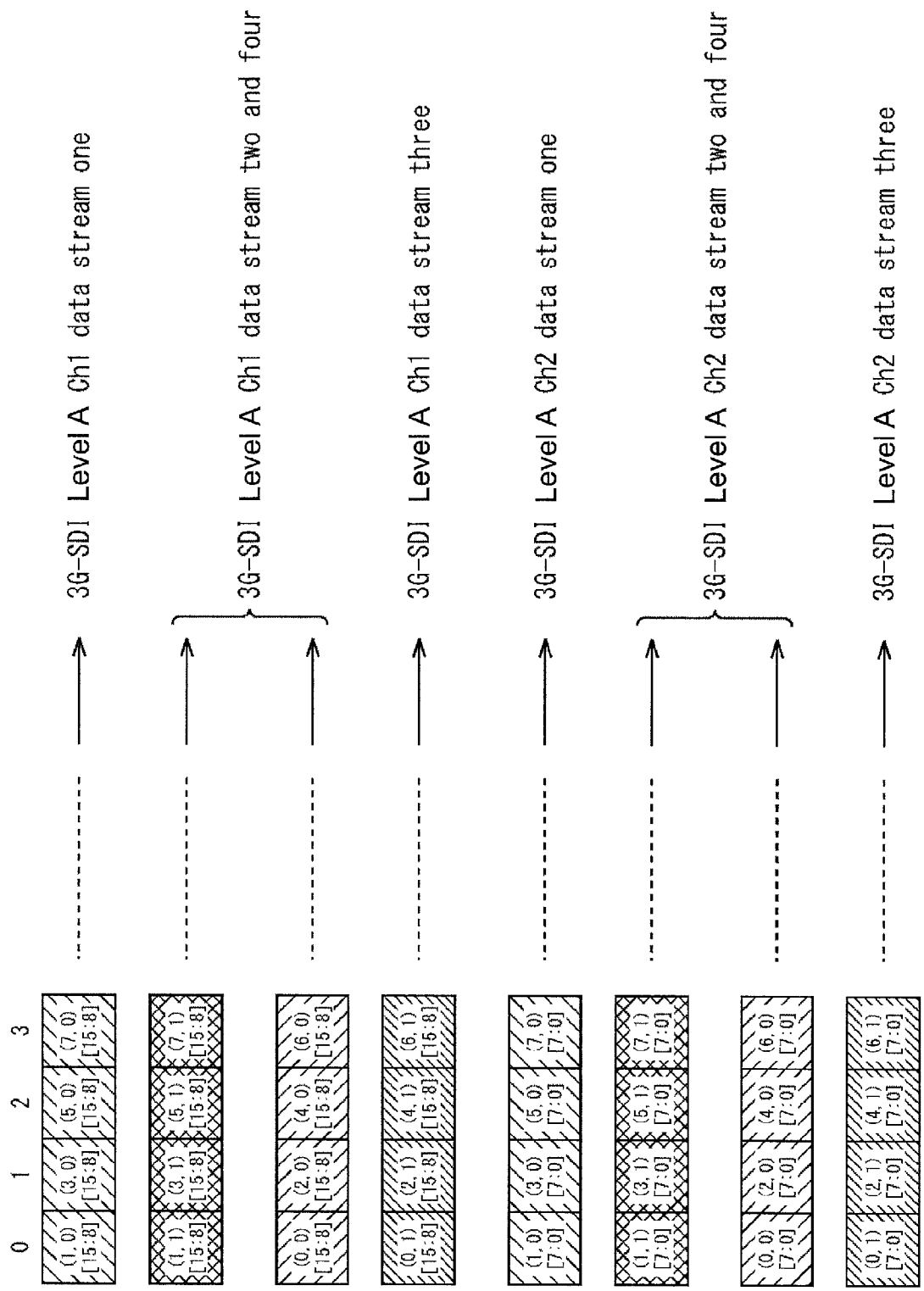
FIG. 43 is a diagram for explaining system 3 in the sixth embodiment of the present technology.

More specifically, first, as shown in the left side of FIG. 43, by the same method as shown in FIG. 7, rearrangement of the pixel data of the RAW data is performed. That is, the pixel data that forms the RAW data 1 is rearranged as the first to fourth data columns of FIG. 43, and the pixel data that forms the RAW data 2 is rearranged as the fifth to eighth data columns of FIG. 43.

Figure 44:
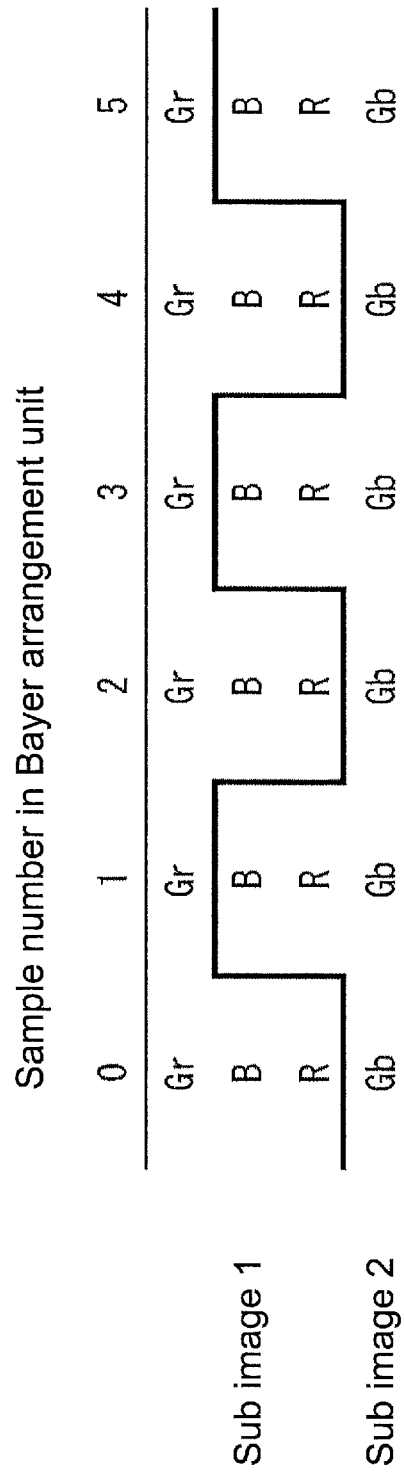
FIG. 44 is a diagram for explaining system 3 in the sixth embodiment of the present technology.

Subsequently, by the method as shown in FIG. 44, the RAW data 1 is separated into the sub image 1 and the sub image 2 of Ch1. The sub image 1 of Ch1 is constituted of the Gr sample of the RAW data 1 and the B sample and the R sample included in the even sample in the Bayer arrangement unit of the RAW data 1. The sub image 2 of Ch1 is constituted of the Gb sample of the RAW data 1 and the B sample and the R sample included in the odd sample in the Bayer arrangement unit of the RAW data 1.

Then, the pixel data of the Gr sample of the sub image 1 of Ch1 is multiplexed with respect to a Y channel of the active video data space of the data stream one of level A of 3G-SDI shown in FIG. 1 of SMPTE 425-1 or FIG. 3 of SMPTE 424M, thereby generating the data stream 1 of Ch1. Thus, the data stream 1 of Ch1 is obtained by multiplexing upper 8 bits of the pixel data of the Gr sample of the RAW data.

Further, the pixel data of the B sample and R sample of the sub image 1 of Ch1 is multiplexed with respect to the Cb channel and the Cr channel of the active video data space of the data stream 2 of level A of 3G-SDI shown in FIG. 1 of SMPTE 425-1 or FIG. 3 of SMPTE 424M, thereby generating the data stream 2 of Ch1. Thus, the data stream 2 of Ch1 is obtained by multiplexing upper 8 bits of the pixel data of the B sample and R sample included in the even sample in the Bayer arrangement unit of the RAW data.

Further, the pixel data of the Gb sample of the sub image 2 of Ch1 is multiplexed with respect to the Y channel of the active video data space of the data stream one of level A of 3G-SDI shown in FIG. 1 of SMPTE 425-1 or FIG. 3 of SMPTE 424M, thereby generating the data stream 3 of Ch1. Thus, the data stream 3 of Ch1 is obtained by multiplexing upper 8 bits of the pixel data of the Gb sample of the RAW data.

Further, the pixel data of the B sample and R sample of the sub image 2 of Ch1 is multiplexed with respect to the Cb channel and the Cr channel of the active video data space of the data stream 2 of level A of 3G-SDI shown in FIG. 1 of SMPTE 425-1 or FIG. 3 of SMPTE 424M, thereby generating the data stream 4 of Ch1. Thus, the data stream 4 of Ch1 is obtained by multiplexing upper 8 bits of the pixel data of the B sample and R sample included in the odd sample in the Bayer arrangement unit of the RAW data.

Further, by performing the same process with respect to the RAW data 2, the data streams 1 to 4 of Ch2 are generated. It should be noted that data stream 1 of Ch2 is obtained by multiplexing the lower 8 bits of the pixel data of the Gr sample of the RAW data. The data stream 2 of Ch2 is obtained by multiplexing the lower 8 bits of the pixel data of the B sample and R sample included in the even sample in the Bayer arrangement unit of the RAW data. The data stream 3 of Ch2 is obtained by multiplexing the lower 8 bits of the pixel data of the Gb sample of the RAW data. The data stream 4 of Ch2 is obtained by multiplexing the lower 8 bits of the pixel data of the B sample and R sample included in the odd sample in the Bayer arrangement unit of the RAW data.

It should be noted that the bit multiplexing method of the RAW data is the same as described above with reference to FIG. 8 and FIG. 9.

Subsequently, in accordance with the requirements of SMPTE 424M/425-1, horizontal blanking data (H-Blank), vertical blanking data (V-Blank), SAV, EAV, LN, and CRCC are added to the data streams 1 to 4 of Ch1 and the data streams 1 to 4 of Ch2.

Then, in accordance with the requirements of SMPTE 424M, the data stream 1 and the data stream 2 of Ch1 are subjected to word multiplexing and scramble and P/S conversion, thereby generating the data stream of link 1 of Ch1 of level A of 3G-SDI. In the same way, the data stream 3 and the data stream 4 of Ch1 are subjected to word multiplexing and scramble and P/S conversion, thereby generating the data stream of link 2 of Ch1 of level A of 3G-SDI.

In this way, the upper 8 bits of the pixel data of the samples of Gr, Gb, B, and R of the RAW data are separated into the two data streams on a pixel (sample) basis and multiplexed.

Further, the data stream 1 and the data stream 2 of Ch2 are subjected to word multiplexing and scramble and P/S conversion, thereby generating the data stream of link 1 of Ch2 of level A of 3G-SDI. The data stream 3 and the data stream 4 of Ch2 are subjected to word multiplexing and scramble and P/S conversion, thereby generating the data stream of link 2 of Ch2 of level A of 3G-SDI.

In this way, the lower 8 bits of the pixel data of the samples of Gr, Gb, B, and R of the RAW data are separated into the two data streams on the pixel (sample) basis and multiplexed.

Then, the data streams of 4 channels of the link A and the link B of Ch1 and Ch2 are transmitted. Alternatively, the data streams of the link A and the link B of Ch1 can be transmitted by dual link, and the data streams of the link A and the link B of Ch2 can be transmitted by the dual link.

In this way, in accordance with the requirements of level A of 3G-SDI, for example, by using the existing IC or apparatus for 3G-SDI, it is possible to transmit the 4K RAW data with the Bayer arrangement of 47.95P-60P. Further, with respect to the data streams of the link A and the link B of Ch1, upper 8 bits of the pixel data of RAW data are multiplexed. Thus, for example, by using the observation apparatus for 3G-SDI, by the data stream of the link A or the link B of Ch1, it is possible to visually confirm the video of the RAW data. Further, by using the CRCC added to the data streams, it is possible to monitor an error in the transmission system by the observation apparatus for 3G-SDI.

13. Modified Examples

Hereinafter, in the embodiments of the present technology, modified examples other than the modified examples described above will be described.

In the above description, the example in which the data stream is formed on a 10-bit basis (word length: 10 bits) is given, the data stream can be set to arbitrary N bits equal to or larger than 10 bits.

Further, in the case where data having the same value for upper m bits (8≤m≤N−2) out of the N bits is set as a forbidden code, the pixel data of the RAW data is multiplexed with respect to upper m−2 bits and lower N-m bits out of the N bits, and lower 2 bits out of upper m bits may be set to different values from each other. In this regard, in the above embodiments, N=10 bits and m=8 bits are set.

Further, in the case where N is set to a value other than 10 (bits), and the data length of the pixel data of the RAW data is larger than N−2 bits and 2N−4 bits or less, in the same way as the above embodiments, the pixel data is separated into upper N−2 bits and remaining bits and can be multiplexed with respect to a different data stream of HD-SDI.

Further, in the above description, the example in which the 4K RAW data is transmitted is given. However, the present technology can also be applied to the case where RAW data with a resolution other than 4K is transmitted. That is, as in the example described above, pixel data of G sample, B sample, and R sample of the RAW data with the resolution other than 4K can be multiplexed with respect to Y channel, Cb channel, and Cr channel of the data stream of SDI, or G channel, A channel, B channel, and R channel and transmitted. Further, 4K is not necessarily limited to the 4096 samples×2140 lines described above, and includes a resolution of around 4000 samples×2000 lines (for example, 3840 samples×2160 lines or the like).

Further, in the above description, the example in which the RAW data with the Bayer arrangement is transmitted is given. The present technology can also be applied to the case where video data in which pixels are arranged on a block (2×2 pixels) basis other than the Bayer arrangement. More specifically, for example, the present technology can also be applied to the case where video data in which pixels corresponding to three different colors are arranged in the proportion of 2:1:1 in a block of 2×2 pixels is transmitted, as in the case of the Bayer arrangement. In this case, by the same method as in the case where the RAW data with the Bayer arrangement is transmitted, it is possible to transmit the video data.

Figure 45:
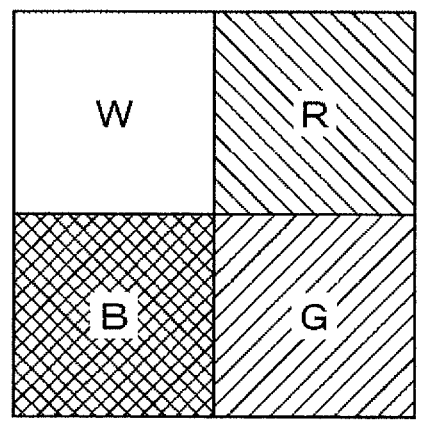
FIG. 45 is a diagram showing the structure of an RGBW arrangement.

Alternatively, for example, as in an RGBW arrangement shown in FIG. 45, to the case where video data in which pixels corresponding to four different colors are arranged in a block of 2×2 pixels is transmitted, the present technology can also be applied. In this case, the same method as in the case where the RAW data with the Bayer arrangement is transmitted by the method of transmitting the video data of 4:4:4:4 (RGB+A) can be applied. For example, in the case of the video data of the RGBW arrangement, pixel data of R sample, G sample, B sample, and W sample may be multiplexed with respect to R channel, G channel, B channel, and A (Auxiliary) channel of the data stream of SDI, respectively and transmitted. Further, in this case, for example, it is possible to use a dual-link transmission method of 3G-SDI or HD-SDI.

(Structure Example of Computer)

The series of processes described above can be executed by hardware or software. When the series of processes are executed by software, a program that forms the software is installed in a computer. Here, the computer includes a computer incorporated into dedicated hardware, a general-purpose personal computer capable of implementing various functions by installing various programs, or the like.

Figure 46:
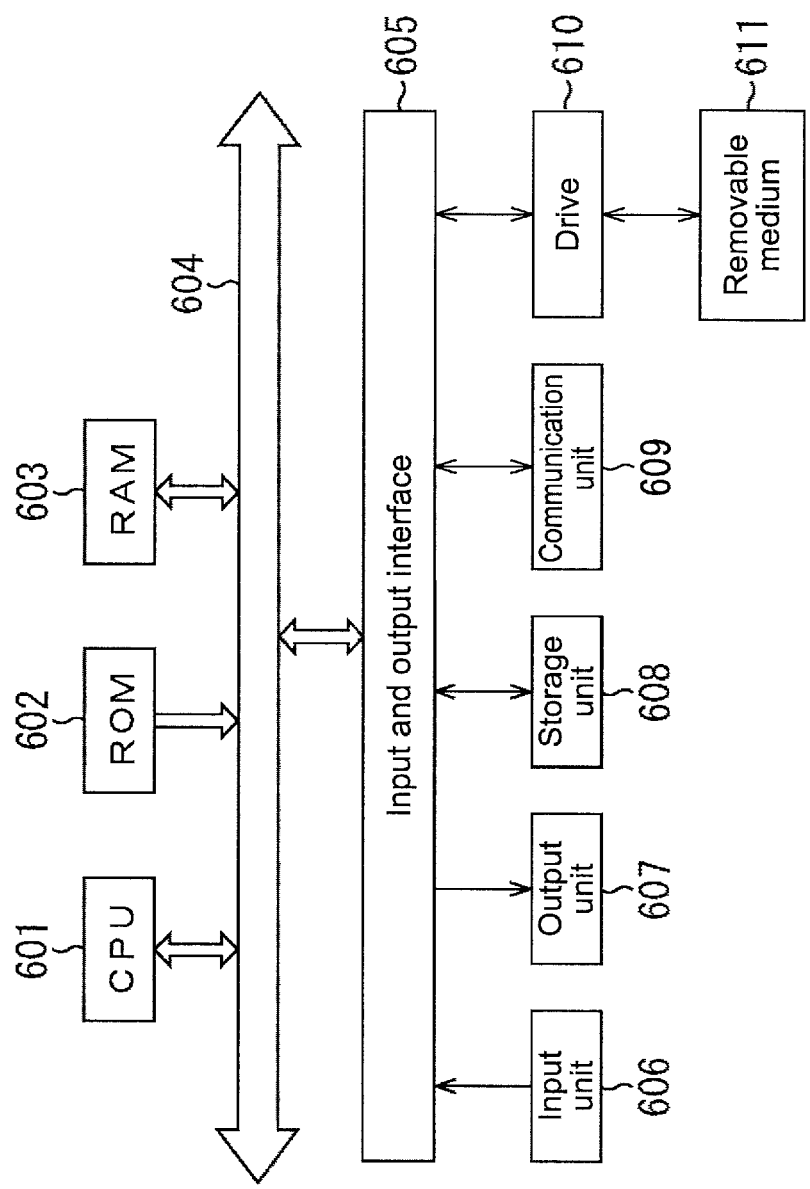
FIG. 46 is a block diagram showing a structure example of a computer.

FIG. 46 is a block diagram showing a structure example of hardware of a computer that executes the series of processes described above by using a program.

In the computer, a CPU (Central Processing Unit) 601, a ROM (Read Only Memory) 602, and a RAM (Random Access Memory) 603 are connected to each other via a bus 604.

To the bus 604, an input and output interface 605 is further connected. To the input and output interface 605, an input unit 606, an output unit 607, a storage unit 608, a communication unit 609, and a drive 610 are connected.

The input unit 606 is formed of a keyboard, a mouse, a microphone, or the like. The output unit 607 is formed of a display, a speaker, or the like. The storage unit 608 is formed of a hard disk, a nonvolatile memory, or the like. The communication unit 609 is formed of a network interface or the like. The drive 610 drives a removable medium 611 such as a magnetic disk, an optical disk, a magneto-optical disk, and a semiconductor memory.

In the computer structured as described above, the CPU 601 loads, for example, a program stored in the storage unit 608 into the RAM 603 through the input and output interface 605 and the bus 604 and executes the program, thereby executing the series of processes described above.

The program executed by the computer (CPU 601) can be recorded in a removable medium 611 as a package medium or the like and provided, for example. Further, the program can be provided via a wired or wireless transmission medium such as a local area network, the Internet, and a digital satellite broadcast.

In the computer, by loading the removable medium 611 to the drive 610, the program can be installed to the storage unit 608 through the input and output interface 605. Further, the program can be received by the communication unit 609 via a wired or wireless transmission medium and installed to the storage unit 608. In addition, the program can be installed in advance to the ROM 602 or the storage unit 608.

It should be noted that the program executed by the computer may be a program which is performed in a chronological order of the description in this specification, in parallel, or at necessary timing, for example, when being called.

Further, in this specification, the system refers to a set of a plurality of components (apparatuses, modules (parts), or the like), and all the components may be provided in the same casing or not. Therefore, both of a plurality of apparatuses stored in different casings and connected to each other via a network and one apparatus in which a plurality of modules are stored in one casing are systems.

Further, the present technology is not limited to the embodiments described above and can be variously modified without departing from the gist of the present technology.

For example, the steps described in the above flowcharts can be executed by one apparatus or can be shared by a plurality of apparatuses.

Further, in the case where one step includes a plurality of processes, the plurality of processes included in the one step can be performed by one apparatus or shared by a plurality of apparatuses.

It should be noted that the present technology can take the following configurations.

(1) A signal processing apparatus, including
a mapping unit configured to multiplex first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

(2) The signal processing apparatus according to Item (1), in which when the data stream is formed with N bits (N≥10) as a unit, and data in which upper m (8≤m≤N−2) bits out of the N bits are the same value is set to a forbidden code, the mapping unit multiplexes the pixel data of the video data with respect to upper m−2 bits and lower N-m bits out of the N bits of the data stream and sets lower 2 bits out of the upper m bits of the data stream to different values.

(3) The signal processing apparatus according to Item (2), in which when the pixel data of the video data has a data length of more than N−2 bits and equal to or less than 2N−4 bits, the mapping unit multiplexes upper N−2 bits and remaining bits of the pixel data with respect to different data streams.

(4) The signal processing apparatus according to Item (3), in which the mapping unit multiplexes the upper N−2 bits of the pixel data of the video data separately with respect to a first data stream and a second data stream on a pixel basis, and multiplexes the remaining bits of the pixel data of the video data separately with respect to a third data stream and a fourth data stream on a pixel basis.

(5) The signal processing apparatus according to Item (4), further including a multiplexing unit configured to multiplex the first data stream and the second data stream, thereby generating a first 3G-SDI data stream prescribed in a 3G-SDI (3G-Serial Digital Interface) format, and multiplex the third data stream and the fourth data stream, thereby generating a second 3G-SDI data stream.

(6) The signal processing apparatus according to Item (4), in which the mapping unit multiplexes, out of a first video data and a second video data generated by alternately thinning the pixel of the video data horizontally on the block basis, upper N−2 bits of pixel data of the first video data with respect to the first data stream, multiplexes remaining bits of the pixel data of the first video data with respect to the third data stream, multiplexes upper N−2 bits of pixel data of the second video data with respect to the second data stream, and multiplexes remaining bits of the pixel data of the second video data with respect to the fourth data stream.

(7) The signal processing apparatus according to Item (3), further including a separation unit configured to alternately thin a line in a horizontal direction on the block basis of the video data, thereby separating the data into a first video data and a second video data, in which the mapping unit multiplexes upper N−2 bits of pixel data of the first video data separately with respect to a first data stream and a second data stream on a pixel basis, multiplexes remaining bits of the pixel data of the first video data separately with respect to a third data stream and a fourth data stream on the pixel basis, multiplexes upper N−2 bits of pixel data of the second video data separately with respect to a fifth data stream and a sixth data stream on the pixel basis, and multiplexes remaining bits of the pixel data of the second video data separately with respect to a seventh data stream and an eighth data stream on the pixel basis.

(8) The signal processing apparatus according to Item (7), further including a first multiplexing unit configured to multiplex the first data stream and the second data stream, thereby generating a first 3G-SDI data stream prescribed in a 3G-SDI (3G-Serial Digital Interface) format, multiplex the third data stream and the fourth data stream, thereby generating a second 3G-SDI data stream, multiplex the fifth data stream and the sixth data stream, thereby generating a third 3G-SDI data stream, and multiplex the seventh data stream and the eighth data stream, thereby generating a fourth 3G-SDI data stream.

(9) The signal processing apparatus according to Item (8), further including a second multiplexing unit configured to multiplex the first to fourth 3G-SDI data streams, thereby generating a data stream prescribed in an SDI format of 10.692 Gbps.

(10) The signal processing apparatus according to Item (7), further including a multiplexing unit configured to multiplex the first to eighth data streams, thereby generating a data stream prescribed in an SDI format of 10.692 Gbps.

(11) The signal processing apparatus according to any one of Items (1) to (3), in which the mapping unit multiplexes the pixel data of the video data separately with respect to a first data stream and a second data stream on a pixel basis.

(12) The signal processing apparatus according to any one of Items (1) to (3), further including a separation unit configured to alternately thin a line in a horizontal direction on the block basis of the video data, thereby separating the data into a first video data and a second video data, in which the mapping unit multiplexes pixel data of the first video data separately with respect to a first data stream and a second data stream on a pixel basis, and multiplexes pixel data of the second video data separately with respect to a third data stream and a fourth data stream on the pixel basis.

(13) The signal processing apparatus according to any one of Items (1) to (12), in which when the video data has pixels arranged in accordance with a Bayer arrangement, and when the first color and the second color are green, the third color is blue, and the fourth color is red, the first to fourth signals are determined in such a manner that the first signal and the second signal are Y signals, the third signal is a Cb signal, and the fourth signal is a Cr signal, or that the first signal is a G signal, the second signal is an A (Auxiliary) signal, the third signal is a B signal, and the fourth signal is an R signal.

(14) The signal processing apparatus according to any one of Items (1) to (12), in which when the video data has pixels arranged in accordance with an RGBW arrangement, and when the first color is red, the second color is green, the third color is blue, and the fourth color is white, the first signal is an R signal, the second signal is a G signal, the third signal is a B signal, and the fourth signal is an A (Auxiliary) signal.

(15) A signal processing method, including multiplexing, by a signal processing apparatus, first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

(16) A program for causing a computer to execute a process including multiplexing first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

(17) A signal processing apparatus, including a reproduction unit configured to extract first to fourth pixel data from a data stream in which the first to fourth pixel data are multiplexed with respect to areas of first to fourth signals of the data stream prescribed in a predetermined SDI (Serial Digital Interface) format, respectively, and restore video data in which pixels are arranged on a block basis with 2×2 pixels as the block, the first to fourth pixel data respectively corresponding to first to fourth colors of the video data, the 2×2 pixels respectively corresponding to the first to fourth colors.

(18) A signal processing method, including extracting, by a signal processing apparatus, first to fourth pixel data from a data stream in which the first to fourth pixel data are multiplexed with respect to areas of first to fourth signals of the data stream prescribed in a predetermined SDI (Serial Digital Interface) format, respectively, and restoring video data in which pixels are arranged on a block basis with 2×2 pixels as the block, the first to fourth pixel data respectively corresponding to first to fourth colors of the video data, the 2×2 pixels respectively corresponding to the first to fourth colors.

(19) A program for causing a computer to execute a process including extracting first to fourth pixel data from a data stream in which the first to fourth pixel data are multiplexed with respect to areas of first to fourth signals of the data stream prescribed in a predetermined SDI (Serial Digital Interface) format, respectively, and restoring video data in which pixels are arranged on a block basis with 2×2 pixels as the block, the first to fourth pixel data respectively corresponding to first to fourth colors of the video data, the 2×2 pixels respectively corresponding to the first to fourth colors.

(20) A signal transmission system, including:

a signal transmission apparatus including a mapping unit that multiplexes first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors, and a transmission control unit that controls transmission of the data stream; and a signal reception apparatus including a reception control unit that controls reception of the data stream, and a reproduction unit that extracts the first to fourth pixel data from the data stream and restores the video data.

It should be understood by those skilled in the art that various modifications, combinations, sub-combinations and alterations may occur depending on design requirements and other factors insofar as they are within the scope of the appended claims or the equivalents thereof.

What is claimed is:

1. A signal processing apparatus, comprising:
mapping circuitry configured to multiplex first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

2. The signal processing apparatus according to claim 1, wherein when the data stream is formed with N bits (N≥10) as a unit, and data in which upper m (8≤m≤N−2) bits out of the N bits are the same value is set to a forbidden code, the mapping circuitry multiplexes the pixel data of the video data with respect to upper m-2 bits and lower N-m bits out of the N bits of the data stream and sets lower 2 bits out of the upper m bits of the data stream to different values.

3. The signal processing apparatus according to claim 2, wherein when the pixel data of the video data has a data length of more than N-2 bits and equal to or less than 2N-4 bits, the mapping circuitry multiplexes upper N-2 bits and remaining bits of the pixel data with respect to different data streams.

4. The signal processing apparatus according to claim 3, wherein the mapping circuitry multiplexes the upper N-2 bits of the pixel data of the video data separately with respect to a first data stream and a second data stream on a pixel basis, and multiplexes the remaining bits of the pixel data of the video data separately with respect to a third data stream and a fourth data stream on a pixel basis.

5. The signal processing apparatus according to claim 4, further comprising:

a multiplexer configured to multiplex the first data stream and the second data stream, thereby generating a first 3G-SDI data stream prescribed in a 3G-SDI (3G-Serial Digital Interface) format, and multiplex the third data stream and the fourth data stream, thereby generating a second 3G-SDI data stream.

6. The signal processing apparatus according to claim 4, wherein the mapping circuitry multiplexes, out of a first video data and a second video data generated by alternately thinning the pixel of the video data horizontally on the block basis, upper N-2 bits of pixel data of the first video data with respect to the first data stream, multiplexes remaining bits of the pixel data of the first video data with respect to the third data stream, multiplexes upper N-2 bits of pixel data of the second video data with respect to the second data stream, and multiplexes remaining bits of the pixel data of the second video data with respect to the fourth data stream.

7. The signal processing apparatus according to claim 3, further comprising:

separation circuitry configured to alternately thin a line in a horizontal direction on the block basis of the video data, thereby separating the data into a first video data and a second video data, wherein the mapping circuitry multiplexes upper N-2 bits of pixel data of the first video data separately with respect to a first data stream and a second data stream on a pixel basis, multiplexes remaining bits of the pixel data of the first video data separately with respect to a third data stream and a fourth data stream on the pixel basis, multiplexes upper N-2 bits of pixel data of the second video data separately with respect to a fifth data stream and a sixth data stream on the pixel basis, and multiplexes remaining bits of the pixel data of the second video data separately with respect to a seventh data stream and an eighth data stream on the pixel basis.

8. The signal processing apparatus according to claim 7, further comprising:
a first multiplexer configured to multiplex the first data stream and the second data stream, thereby generating a first 3G-SDI data stream prescribed in a 3G-SDI (3G-Serial Digital Interface) format, multiplex the third data stream and the fourth data stream, thereby generating a second 3G-SDI data stream, multiplex the fifth data stream and the sixth data stream, thereby generating a third 3G-SDI data stream, and multiplex the seventh data stream and the eighth data stream, thereby generating a fourth 3G-SDI data stream.

9. The signal processing apparatus according to claim 8, further comprising:
a second multiplexer configured to multiplex the first to fourth 3G-SDI data streams, thereby generating a data stream prescribed in an SDI format of 10.692 Gbps.

10. The signal processing apparatus according to claim 7, further comprising:
a multiplexer configured to multiplex the first to eighth data streams, thereby generating a data stream prescribed in an SDI format of 10.692 Gbps.

11. The signal processing apparatus according to claim 1, wherein
the mapping circuitry multiplexes the pixel data of the video data separately with respect to a first data stream and a second data stream on a pixel basis.

12. The signal processing apparatus according to claim 1, further comprising:
separation circuitry configured to alternately thin a line in a horizontal direction on the block basis of the video data, thereby separating the data into a first video data and a second video data, wherein
the mapping circuitry multiplexes pixel data of the first video data separately with respect to a first data stream and a second data stream on a pixel basis, and multiplexes pixel data of the second video data separately with respect to a third data stream and a fourth data stream on the pixel basis.

13. The signal processing apparatus according to claim 1, wherein
when the video data has pixels arranged in accordance with a Bayer arrangement, and when the first color and the second color are green, the third color is blue, and the fourth color is red, the first to fourth signals are determined in such a manner that the first signal and the second signal are Y signals, the third signal is a Cb signal, and the fourth signal is a Cr signal, or that the first signal is a G signal, the second signal is an A (Auxiliary) signal, the third signal is a B signal, and the fourth signal is an R signal.

14. The signal processing apparatus according to claim 1, wherein
when the video data has pixels arranged in accordance with an RGBW arrangement, and when the first color is red, the second color is green, the third color is blue, and the fourth color is white, the first signal is an R signal, the second signal is a G signal, the third signal is a B signal, and the fourth signal is an A (Auxiliary) signal.

15. A signal processing method, comprising:
multiplexing, by a signal processing apparatus, first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

16. A non-transitory computer readable medium storing program code executable by a computer to perform operations comprising:
multiplexing first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors.

17. A signal processing apparatus, comprising:
reproduction circuitry configured to extract first to fourth pixel data from a data stream in which the first to fourth pixel data are multiplexed with respect to areas of first to fourth signals of the data stream prescribed in a predetermined SDI (Serial Digital Interface) format, respectively, and restore video data in which pixels are arranged on a block basis with 2×2 pixels as the block, the first to fourth pixel data respectively corresponding to first to fourth colors of the video data, the 2×2 pixels respectively corresponding to the first to fourth colors.

18. A signal processing method, comprising:
extracting, by a signal processing apparatus, first to fourth pixel data from a data stream in which the first to fourth pixel data are multiplexed with respect to areas of first to fourth signals of the data stream prescribed in a predetermined SDI (Serial Digital Interface) format, respectively, and restoring video data in which pixels are arranged on a block basis with 2×2 pixels as the block, the first to fourth pixel data respectively corresponding to first to fourth colors of the video data, the 2×2 pixels respectively corresponding to the first to fourth colors.

19. A non-transitory computer readable medium storing program code executable by a computer to perform operations comprising:
extracting first to fourth pixel data from a data stream in which the first to fourth pixel data are multiplexed with respect to areas of first to fourth signals of the data stream prescribed in a predetermined SDI (Serial Digital Interface) format, respectively, and restoring video data in which pixels are arranged on a block basis with 2×2 pixels as the block, the first to fourth pixel data respectively corresponding to first to fourth colors of the video data, the 2×2 pixels respectively corresponding to the first to fourth colors.

20. A signal transmission system, comprising:
a signal transmission apparatus including
mapping circuitry that multiplexes first to fourth pixel data with respect to areas of first to fourth signals of a data stream prescribed in a predetermined SDI (Serial Digital Interface) format, respectively, the first to fourth pixel data respectively corresponding to first to fourth colors of video data in which pixels are arranged on a block basis with 2×2 pixels as the block, the 2×2 pixels respectively corresponding to the first to fourth colors, and transmission control circuitry that controls transmission of the data stream; and a signal reception apparatus including reception control circuitry that controls reception of the data stream, and reproduction circuitry that extracts the first to fourth pixel data from the data stream and restores the video data.

\* \* \* \* \*